(12) United States Patent
Lange et al.

(10) Patent No.: US 10,344,164 B2
(45) Date of Patent: Jul. 9, 2019

(54) COMPOSITIONS CONTAINING ROSIN ESTERS AND ETHYLENE POLYMERS

(71) Applicant: Arizona Chemical Company, LLC, Jacksonville, FL (US)

(72) Inventors: Jos H. M. Lange, Almere (NL); Mark C Schaapman, Almere (NL); Justyna J. Hinc, Almere (NL)

(73) Assignee: Kraton Chemical, LLC, Jacksonville, FL (US)

( * ) Notice: Subject to any disclaimer, the term of this patent is extended or adjusted under 35 U.S.C. 154(b) by 0 days.

(21) Appl. No.: 15/561,395

(22) PCT Filed: Mar. 24, 2016

(86) PCT No.: PCT/US2016/024056
§ 371 (c)(1),
(2) Date: Sep. 25, 2017

(87) PCT Pub. No.: WO2016/154456
PCT Pub. Date: Sep. 29, 2016

(65) Prior Publication Data
US 2018/0105693 A1    Apr. 19, 2018

Related U.S. Application Data

(60) Provisional application No. 62/138,697, filed on Mar. 26, 2015.

(51) Int. Cl.
| | |
|---|---|
| C08L 93/04 | (2006.01) |
| C09F 1/04 | (2006.01) |
| C09J 123/08 | (2006.01) |
| C09J 193/04 | (2006.01) |
| C08L 23/08 | (2006.01) |
| C08K 5/00 | (2006.01) |
| C08L 91/06 | (2006.01) |

(52) U.S. Cl.
CPC .............. *C08L 93/04* (2013.01); *C08K 5/005* (2013.01); *C08L 23/0853* (2013.01); *C08L 23/0869* (2013.01); *C08L 91/06* (2013.01); *C09F 1/04* (2013.01); *C09J 123/0853* (2013.01); *C09J 123/0869* (2013.01); *C09J 193/04* (2013.01)

(58) Field of Classification Search
CPC .. C08L 93/04; C08L 23/0869; C08L 23/0853; C08L 91/06; C09J 123/0869; C09J 123/0853; C09J 193/04; C08K 5/005; C09F 1/04
See application file for complete search history.

(56) References Cited

U.S. PATENT DOCUMENTS

| | | | |
|---|---|---|---|
| 2,369,125 A | 1/1945 | Anderson | |
| 4,758,379 A | 7/1988 | Johnson, Jr. | |
| 5,969,092 A * | 10/1999 | Karvo | C09F 1/04 530/215 |
| 6,117,945 A | 9/2000 | Mehaffy et al. | |
| 7,166,662 B2 | 1/2007 | Haner et al. | |
| 8,076,407 B2 | 12/2011 | Ellis et al. | |
| 2011/0034669 A1 | 2/2011 | Dallavia | |
| 2013/0197152 A1 | 8/2013 | Herve et al. | |
| 2015/0018470 A1 * | 1/2015 | Nakatani | C08L 23/0815 524/274 |

FOREIGN PATENT DOCUMENTS

| | | | |
|---|---|---|---|
| EP | 2824154 | 1/2015 | |
| WO | 2000/06657 | 2/2000 | |
| WO | 2012/141675 | 10/2012 | |
| WO | WO2013133407 A1 * | 9/2013 | C09J 123/08 |

OTHER PUBLICATIONS

Ambrosini, Michael J.. Heat-stress resistance of hot-melt adhesives. Tappi Journal. Sep. 1993. pp. 166-170. IoPP Adhesion Committee, IoPP Technical J. X(1): 7-9(1992).

* cited by examiner

*Primary Examiner* — Robert S Jones
(74) *Attorney, Agent, or Firm* — Ramesh Krishnamurti

(57) ABSTRACT

Disclosed are compositions which include an ethylene polymer derived from at least one polar monomer with one or more ester groups, which polymerize with ethylene, (e.g., a copolymer, or low molecular weight copolymer having a relatively high melt index, derived from ethylene and vinyl acetate and/or a copolymer, or low molecular weight copolymer having a relatively high melt index, derived from ethylene and «-buty! acrylate) and a rosin ester. The rosin ester can have a low hydroxy! number (e.g., a hydroxy! number six or five or less), a low acid number (e.g., an acid number of ten or less), a relatively low PAN number (e.g., a PAN number less than twenty-two or in between eight and twenty), a relatively high third moment or third power average molecular weight (Mz), (e.g., an Mz value in between 2500 and 12000 g/mol), a low sulfur content (e.g., a sulfur content lower than 600 ppm prior to antioxidant addition) or combinations thereof. The compositions can exhibit a high heat stress resistance (e.g., a heat stress pass temperature value higher than 52° C. or in between 48° C. and 60° C.) and/or improved viscosity stability and/or color stability upon thermal aging and/or improved compatibility.

19 Claims, 10 Drawing Sheets

COMPOSITIONS CONTAINING ROSIN ESTERS AND ETHYLENE POLYMERS

CROSS REFERENCE TO RELATED APPLICATIONS

This application is a 371 of international application No. PCT/US2016/024056 which claims the benefit of priority to the U.S. Provisional Application No. 62/138,697 filed Mar. 26, 2015, incorporated herein in its entirety.

TECHNICAL FIELD

This application relates generally to compositions comprising rosin ester derivatives and ethylene polymers, derived from at least one polar monomer with one or more ester groups, which polymerize with ethylene, as well as methods of making and using thereof.

BACKGROUND

Ethylene polymers derived from at least one polar monomer with one or more ester groups, which polymerize with ethylene (e.g., polymers derived from vinyl acetate or other vinyl esters of monocarboxylic acids such as poly(ethylene-co-vinyl acetate) (EVA) or copolymers derived from ethylene and an acrylate ester or methacrylate ester such as ethylene n-butyl acrylate (EnBA)), are used in a wide range of applications. For example, EVA is commonly employed in hot-melt adhesives for use in papers and packaging, in conjunction with non-woven materials, in adhesive tapes, in electrical and electronic bonding, in general wood assembly, in road marking and pavement marking applications, and in other industrial assembly. EnBA is used in various hot-melt adhesive applications, including low application temperature hot-melt adhesives. EnBA has a relatively low glass transition temperature $T_g$ as compared to EVA. EnBA based hot-melt adhesives can offer higher adhesion even to difficult substrates, better thermal resistance, increased adhesion to metals and glass, and can offer beneficial low temperature use properties. Hot-melt adhesive comprising a mixture of relatively low molecular weight ethylene copolymers, have also found utility as hot-melt adhesives that can be applied at temperatures of from about 100° C. to about 150° C. which have good bond strength with exceptional toughness, good heat resistance and acceptable application viscosity. Examples are relatively low molecular weight EnBA copolymers having a high melt flow index value, or blends derived from an EnBA copolymer such as a blend with an EVA copolymer, that can lead to hot-melt adhesives which can be applied at temperatures of from about 100° C. to about 150° C., having good bond strength with exceptional toughness, good heat resistance and acceptable application viscosity.

Many commercially available hot-melt adhesives require temperatures of 177° C. or greater to ensure complete melting of all the components and also to achieve a satisfactory application viscosity. The high temperatures increase safety risks such as burns and residual volatiles inhalation. In addition, the use of high temperatures requires more energy. Adhesive formulations have been developed that can be applied at temperatures below 150° C., preferably below about 140° C., more preferably below about 135° C., even more preferably at about 120° C. down to about 100° C. Typically, low molecular weight polymers or copolymers having a relatively high melt flow index, also often referred to as melt index (MI), e.g. having MI values of e.g. 400 grams/10 minutes or higher, or alternatively having MI values of 750 grams/10 minutes or higher, are applied therein. Examples of applied polymers in such low temperature application hot-melt adhesives are EnBA copolymers, or EVA copolymers, having MI values of e.g. 400 grams/10 minutes or higher, or having MI values of 750 grams/10 minutes or higher, or blends thereof. While not bound by any particular theory, it is believed that in order to prevent a loss of adhesive properties such as toughness, heat resistance and specific adhesion to a substrate in such low temperature application hot-melt adhesives, a tackifier or resin such as a rosin ester with a relatively high average molecular weight and relatively high softening point can be applied to render acceptable adhesive properties, such as heat stress resistance (HSR). Tackifiers or resins such as rosin esters with increased average molecular weight values ($M_n$, $M_w$ and in particular higher power average molecular weights such as $M_z$ and $M_{z+1}$ expressed as gram/mol) offer an advantage by contributing to better adhesive properties, such as heat resistance performance of the low application temperature hot-melt adhesives derived from them. Low temperature application hot-melt adhesives in general will also contain a wax such as a low melting Fischer-Tropsch wax or a paraffin wax.

It can be deduced e.g. by applying statistical mechanics that in general the mixing of higher molecular weight components will more likely lead to a less favorable free energy of mixing ($\Delta G_m$) which can be attributed to the resulting less favorable entropy of mixing contribution ($\Delta S_m$). The free energy of mixing is related to the entropy of mixing: $\Delta G_m = \Delta H_m - T \cdot \Delta S_m$, wherein $\Delta H_m$ represents the enthalpy of mixing and T represents the absolute temperature. The $\Delta S_m$ term will be greater than zero upon mixing molecules from different components such as rosin ester molecules and polymer molecules but the value of $\Delta S_m$ will generally decrease with increasing molecular weight values of the mixed components, i.e., the $T \cdot \Delta S_m$ term in the thermodynamic $\Delta G_m = \Delta H_m - T \cdot \Delta S_m$ equation will in such a case become relatively smaller.

This relatively smaller entropy of mixing ($\Delta S_m$) contribution to the free energy of mixing ($\Delta G_m$) in the case of mixing larger molecular entities will generally result in a worsened degree of compatibility of the components in the resulting mixture. The detrimental effect of increasing resin molecular weight above a critical $M_w$ value on resin-polymer compatibility has been reported e.g. in J. B. Class and S. G. Chu. The viscoelastic properties of rubber-resin blends. II. The effect of resin molecular weight. *Journal of Applied Polymer Science* 1985, 30, 815-824, which is incorporated herein by reference in its entirety.

Ethylene copolymers, as exemplified by ethylene and vinylalkanoate monomer based polymers, e.g. EVA, or ethylene and acrylate or methacrylate monomer based polymers, e.g. EnBA, in general do not contain aromatic rings or aromatic moieties in their chemical structure. A popular aphorism, well known to a person skilled in the art, which relates to the solubility or compatibility performance in mixing different chemical components, is 'like dissolves like'. Essentially, this 'like dissolves like' expression is related to the enthalpy of mixing ($\Delta H_m$) contribution in the thermodynamics equation of the free energy of mixing ($\Delta G_m$): $\Delta G_m = \Delta H_m - T \cdot \Delta S_m$. Therefore, it can be rationalized that the degree of aromaticity of a rosin ester preferably should be as low as possible in order to contribute to a low positive enthalpy of mixing ($\Delta H_m$) value, or even more preferably to a negative value of $\Delta H_m$ in the hot-melt adhesive formulating process, when being mixed with a polymer having a low aromatic content or with a non-aromatic polymer component. A relatively low degree of rosin ester aromaticity is thereby anticipated to contribute to a more optimal, i.e. negative, free energy of mixing ($\Delta G_m$) value and thereby can exert a positive impact on the resulting degree of hot-melt adhesive compatibility. Aromaticity is defined as the relative number of aromatic carbon atoms and aromatic hydrogen atoms attached to an aromatic ring. Aromaticity can be analyzed via nuclear magnetic resonance (NMR) spectroscopy, e.g. by determining the relative number of hydrogen atoms attached to an aromatic ring, or via cloud point determination using an appropriately chosen solvent system. More information on the effect of tackifier aromaticity on adhesive performance can be found in O'Brien, E. P.; Germinario, L. T.; Robe, G. R.; Williams, T.; Atkins, D. G.; Moroney, D. A.; Peters, M. A. Fundamentals of hot-melt pressure-sensitive adhesive tapes: the effect of tackifier aromaticity. *J. Adhesion Sci. Technol.* 2007, 21, 637-661, which is incorporated herein by reference in its entirety.

These enthalpic and entropic contributions to the free energy of mixing especially can become a critical technical issue in relation to low application temperature hot-melt adhesive compatibility since the resin molecular weights that are applied in such low application temperature hot-melt adhesives in general will have to be increased to a higher level in order to adjust the hot-melt adhesives HSR performance to a higher level which is needed for industrially applicable low application temperature hot-melt adhesives. In such industrially applicable low application temperature hot-melt adhesives, the resulting compatibility can be expected to easily approach or exceed the limit of incompatibility. Besides the impact of the molecular weight distribution of the resin, the softening point of the resin as well as hot-melt adhesive viscosity can be considered as relevant factors with regard to adhesive heat stress resistance performance. The underlying structure-property relationships are complex and not fully understood as is for example outlined in a publication authored by Ambrosini, Heat stress resistance of hot-melt adhesives, pp. 166-170, September 1993 *Tappi Journal*, which is incorporated herein by reference in its entirety.

While not bound by any particular theory, it is believed that an increase in hot-melt adhesive viscosity will generally be associated with a gradual increase in the average molecular weight of the chemical components in the hot-melt adhesive.

In cases wherein compatibility is already near the critical threshold like will be the case in many low application temperature hot-melt adhesive applications it can be expected that such an increase in molecular weight of the chemical components in the hot-melt adhesive can aggravate incompatibility and thereby lead to a lower degree of adhesive performance of the hot-melt adhesive.

It can be important that the degree of viscosity stability of hot-melt adhesives within the applied application temperature range of 100° C. and higher, is high. It can be expected that a high degree of thermal viscosity stability will contribute to improved hot-melt adhesive compatibility and thereby can prevent a detrimental adhesive performance of the hot-melt adhesive.

In many cases, for example when used in hot-melt adhesive formulations, ethylene polymers derived from at least one polar monomer with one or more ester groups, which polymerize with ethylene are processed at elevated temperatures of 100° C. or higher. In these applications, it is important that the polymers exhibit viscosity stability at elevated processing temperatures and remain stable and compatible in the hot-melt tank during processing and in between different processing runs. For example, in the case of hot-melt adhesive formulations, changes in the viscosity of the adhesive upon incubation at an elevated processing temperature jeopardize the quality of an adhesive bond or joint formed using the hot-melt adhesive. In addition, an increase in hot-melt adhesive viscosity can be associated with an increase in molecular weight and with gelling. Gelling in the hot-melt adhesive formulation can negatively impact hot-melt adhesive clean running properties. This can lead to hot-melt equipment nozzle obstruction or can aggravate such an obstruction which can increase hot-melt equipment downtime. Unfortunately, ethylene copolymers which are copolymers with one or more polar monomers which contain an ester group and which polar monomers can polymerize with ethylene, such as EVA or EnBA, can exhibit limited viscosity stability at elevated temperatures such as in the case of hot-melt adhesive formulations. While not bound by any particular theory, it is known that ethylene polymers derived from at least one polar monomer with one or more ester groups, which polymerize with ethylene can be thermally unstable such as in the case of hot-melt adhesive formulations. At elevated temperatures, they can degrade, which can lead to crosslinking of the copolymer and an increase in viscosity. By stabilizing the viscosity of ethylene polymers derived from at least one polar monomer with one or more ester groups, which polymerize with ethylene (e.g., copolymers derived from ethylene and vinyl acetate or n-butyl acrylate) at elevated temperatures, but also at relatively lower application temperatures such as in the range of 100° C. to 150° C., in hot-melt adhesive formulations, the processing of such materials can be greatly improved.

Low application temperature hot-melt adhesives based on maleic anhydride fortified rosin esters are known (EP 1,522, 566 A2 to Haner, which is incorporated herein by reference in its entirety). The production of such Diels-Alder or Ene reaction fortified rosin esters requires an additional reaction step, viz. the reaction of a dienophile such as maleic acid (or maleic anhydride) or fumaric acid with rosin prior to the esterification reaction in order to increase molecular weight and carboxyl group functionality. Therefore, the application of an additional Diels-Alder or Ene reaction step on top of rosin esterification can add additional complexity and cycle time to the rosin ester production process as compared to a plain rosin ester production process which is primarily based on esterification. The rosin esters in the present invention lack such a Diels-Alder or Ene reaction step and are based on esterification as the main chemical reaction type to achieve the required rosin ester molecular weight distribution and softening point. Rosin esters based on a rosin, a polyol and aromatic dicarboxylic acids, so-called aromatic dibasic acids, such as isophthalic acid or terephthalic acid can also be used in hot-melt adhesive applications. Such rosin esters are described in U.S. Pat. No. 5,120,781 to Johnson, which is incorporated herein by reference in its entirety. Rosin esters based on rosin, a polyol and aromatic dicarboxylic acids such as isophthalic acid or phthalic acid will have a higher relative aromatic content than corresponding rosin esters devoid of such an incorporated aromatic moiety. The resulting higher relative aromatic content can go at the expense of ethylene-vinyl acetate (EVA) or ethylene-n-butyl acrylate copolymer (EnBA) copolymer compatibility as these two copolymer structures lack aromaticity. As a result, the heat stress performance contribution of such rosin esters, as exemplified by SYLVALITE™ RE 110L and SYLVALITE™ RE 105L, in a low temperature hot-melt adhesive application, which have to remain EVA and EnBA compatible, can become insufficient for demanding industrial adhesive applications. Rosin esters, to be used in hot-melt adhesives, can have food contact approval. The monomeric components that can be used in the production of such food contact approved rosin esters preferably are listed on the EU Plastics Regulation (Regulation (EU) No. 10/2011 on plastic materials and articles intended to come into contact with food).

Based on considerations as outlined above there exists still a clear commercial and industrial need for rosin ester resins to be applied in low temperature application hot-melt adhesives which rosin esters positively contribute to important hot-melt adhesive properties in terms of performance (for example heat stress resistance, adhesive (co)polymer compatibility, thermal oxidative-, color-, and viscosity stability, shelf life and adhesion) and which on top of that align to regulatory requirements, including food contact approval associated regulations. In addition, there is a commercial and industrial need for rosin ester resins to be applied as a binder in high quality thermoplastic traffic line compounds that can permit higher filler loading in screed/extrusion applied thermoplastic formulations or which can serve as a binder for spray applied compounds and which can substantially increase the performance through improved adhesion to (mixed-in and drop-on) glass beads, non-skid aggregates and the road. In addition, there is a further need for rosin ester resins that may be utilized as additives for tires, e.g. as tread enhancement additives or as tackifying additives, which provide improved performance properties. In the tire industry, a tackifier such as a high softening point rosin ester can be useful during the tire forming process wherein parts such as the tread and side wall of a tire are attached together by the tackifier. There is a need to replace petroleum-based tackifiers in tires and other rubber compositions by environmental friendly resins like rosin esters as is for example described in: *Physical Chemistry of Macromolecules: Macro to Nanoscales*: Eds.: C. H. Chan, C. H. Chia, S. Thomas. Apple Academic Press/CRC Press, Taylor & Francis group, 2014, Chapter 17, p. 476-502, which is incorporated herein by reference in its entirety

SUMMARY

Provided herein are compositions that include a rosin ester and ethylene polymers derived from at least one polar monomer with one or more ester groups, which polymerize with ethylene, and a rosin ester. Low molecular weight ethylene polymers, derived from at least one polar monomer with one or more ester groups, which polymerize with ethylene include copolymers derived, at least in part, from polymerization of vinyl alkanoate monomers or acrylate ester monomers or methacrylate ester monomers with ethylene. Examples of vinyl alkanoate monomers include vinyl acetate, vinyl propionate, and vinyl laurate and other vinyl esters of monocarboxylic acids. For example, the copolymer derived from a vinyl alkanoate can be a copolymer of vinyl acetate with ethylene (i.e., poly(ethylene-co-vinyl acetate), EVA). Examples of acrylate ester monomers or methacrylate ester monomers with ethylene include, but are not limited to, acrylic acid derived esters with methanol, ethanol, propanol, butanol or other alcohols, or methacrylic ester derived esters with methanol, ethanol, butanol or other alcohols. Examples of acrylate or methacrylate derived monomers include but are not limited to n-butyl acrylate, methyl acrylate, ethyl acrylate, 2-ethyl hexyl acrylate, methyl methacrylate, and ethyl methacrylate. Random and block copolymers, as well as blends thereof may be used in the practice of the invention. Ethylene-Acrylic esters-Maleic Anhydride derived terpolymers or Ethylene-Vinyl Acetate-Maleic Anhydride derived terpolymers or ethylene acrylic ester terpolymers based or acrylic esters, ethylene and glycidyl methacrylate may be used in the practice of the invention. Hot-melt adhesive comprising a mixture of relatively low molecular weight ethylene copolymers, e.g., having a MI value of 400 grams/10 minutes or higher, e.g., having an MI value of 750 grams/10 minutes or higher, or having an MI value of 900 grams/10 minutes or higher, have also found utility as hot-melt adhesives that can be applied at temperatures of from about 100° C. to about 150° C. which have good bond strength with exceptional toughness, good heat resistance and acceptable application viscosity. Examples of low molecular weight ethylene polymers, e.g., having a high melt index value of 750 grams/10 minutes or higher, include EnBA and EVA copolymers and blends thereof. MI values are generally determined according to ASTM D 1238, measurement of the rate of extrusion of molten polymer, in grams, flowing in ten minutes through a capillary of a specific diameter and length by an applied pressure, 2.16 kg weight at 190° C.

In one embodiment, the composition of the present invention includes a rosin ester having a low hydroxyl number (e.g., a hydroxyl number seven, six, five, four, three, two, one or less), a low acid number (e.g., an acid number of twelve, eleven, ten, five or less), a PAN number of twenty-five or less (e.g., a PAN number of twenty-two, twenty, eighteen, fifteen or less), or combinations thereof. In another embodiment, the rosin ester has a number average molar mass ($M_n$) (sometimes referred to as number average molecular weight) in between 1,100 and 2,000 gram/mol (Dalton). In further embodiment, the rosin ester has a mass average molar mass ($M_w$) (sometimes referred to as weight average molecular weight) in between 1,700 and 4,000 Dalton. In an even further embodiment, the rosin ester has a third moment or third power average molar mass ($M_z$) in between 2,500 and 12,000 Dalton. In another embodiment, the rosin ester has a color less than Gardner 10 (neat). In a further embodiment, the rosin ester has a high softening point (e.g., a softening point higher than 100° C., or a softening point higher than 105.3° C., or a softening point higher than 110° C., or a softening point higher than 115° C., or a softening point higher than 120° C.). In an even further embodiment, the rosin ester has a high glass transition temperature ($T_g$), (e.g., an $T_g$ higher than 50° C., or an $T_g$ higher than 55° C., or an $T_g$ higher than 60° C., or an $T_g$ higher than 65° C., or an $T_g$ higher than 70° C., or an $T_g$ higher than 75° C., or an $T_g$ higher than 80° C.). In an even further embodiment, the rosin ester containing hot-melt adhesive that can be applied at temperatures of from about 100° C. to about 150° C. has a high heat stress resistance pass temperature, e.g., a heat stress resistance pass temperature value that amounts to about the same value or is higher as compared to the heat stress resistance pass temperatures of rosin esters such as SYLVALITE™ RE 118, or SYLVALITE™ RE 110L, or SYLVALITE™ RE 105L, which are or have been commercially available from Arizona Chemical Company, LLC. In an even further embodiment, the thermally aged rosin ester containing hot-melt adhesive that can be applied at temperatures of from about 100° C. to about 150° C. has a good compatibility in terms of degree of light transmission through a molten hot-melt adhesive sample at a certain temperature, e.g., at a temperature of 130° C. or higher, or at 100° C. or higher, or at 80° C. or higher. In another embodiment, the rosin ester is the result of a chemical reaction procedure, primarily based on esterification, wherein no Diels-Alder reaction step or Ene reaction step with rosin has been applied. In another embodiment, the rosin ester is the result of a chemical reaction procedure wherein no disproportionation catalyst is used. In another embodiment, the rosin ester is the result of a chemical reaction procedure wherein a relatively low amount of disproportionation catalyst is used, e.g. less than 0.2%, or less than 0.15%, or less than 0.10%, or less than 0.05%, or less than 0.02%, or less than 0.01%, by weight of all reactants. In another embodiment, the rosin ester is the result of a chemical reaction procedure wherein a relatively low amount of sulfur containing disproportionation catalyst is used, e.g. less than 0.2%, or less than 0.15%, or less than 0.10%, or less than 0.05%, or less than 0.02%, or less than 0.01%, by weight of all reactants. In another embodiment, the stripped rosin ester after the esterification reaction, prior to adding any sulfur-containing antioxidant or sulfur containing additive, has a first sulfur ppm content value, and the applied rosin reactant has a second sulfur ppm content value, and the first sulfur ppm content value minus the second sulfur ppm content value is, e.g. lower than 200, or lower than 100, or the first sulfur ppm content value is equal to the second sulfur ppm content value, or the first sulfur ppm content value is lower than the second sulfur ppm content value, or the first sulfur ppm content value divided by the second sulfur ppm content value is equal or lower than 0.92, or first sulfur ppm content value divided by the second sulfur ppm content value is equal or lower than 0.82, or the first sulfur ppm content value divided by the second sulfur ppm content value is equal or lower than 0.77, or the first sulfur ppm content value divided by the second sulfur ppm content value is equal or lower than 0.75, or the first sulfur ppm content value divided by the second sulfur ppm content value is equal or lower than 0.73, or the first sulfur ppm content value divided by the second sulfur ppm content value is equal or lower than 0.70 or the first sulfur ppm content value divided by the second sulfur ppm content value is equal or lower than 0.65. It should be noted that the addition of a sulfur containing antioxidant to a rosin ester will increase the sulfur content of the resulting rosin ester/antioxidant mixture. An example of a common sulfur containing antioxidant is Irganox® 565. Irganox® 565 has molecular formula $C_{33}H_{56}N_4OS_2$ and has consequently a sulfur content of approximately 10.9% (w/w). This enables the calculation of the resulting increase in sulfur content by addition of sulfur containing additives and antioxidants, such as Irganox® 565, to a rosin ester batch. Antioxidants are often added to rosin esters in order to improve their oxidative stability, color stability or to increase product shelf life. It should also be noted that gum rosins and hydrogenated gum rosins in general have low or negligible sulfur content (e.g. less than 10 ppm sulfur content) whereas tall oil rosins typically have higher sulfur content. It will clear to a person skilled in the art that by starting from a low or negligible rosin sulfur value (e.g. <10 ppm which represents the detection limit of the applied Antek sulfur determination method), a sulfur content decrease in the obtained stripped rosin ester after the esterification reaction has to be small or negligible in quantitative terms. Under the preferred conditions of the present invention, i.e. by using relatively small amounts of sulfur containing disproportionation catalyst or by using no sulfur containing disproportionation catalyst, in case of such gum rosins or hydrogenated gum rosins, a very low or negligible rosin ester sulfur content will result which will be similar or equal to the sulfur content value of the applied rosin reactant(s). It will be clear to a person skilled in the art that a considerable decrease in sulfur content in the obtained stripped rosin ester after the esterification reaction can only be expected in cases where sulfur containing rosins or rosin derivatives are used such as tall oil rosins or certain polymerized rosins (such as Dymerex™), preferably in the absence of a sulfur containing disproportionation catalyst.

In another embodiment, the obtained rosin ester has a first sum of palladium, nickel and platinum ppm content value, and the rosin has a second sum of palladium, nickel and platinum ppm content value, and the first sum of palladium, nickel and platinum ppm content value is lower than or equal to the second sum of palladium, nickel and platinum ppm content value. In another embodiment, the obtained rosin ester has a first iodine ppm content value, and the rosin has a second iodine ppm content value, and the first iodine ppm content value is lower than or equal to the second iodine ppm content value. In one embodiment, the rosin ester is the result of a chemical reaction procedure wherein no enophile or dienophile has been applied as one of the reactants. In another embodiment, the rosin ester is the result of a chemical reaction procedure wherein no alpha,beta-unsaturated carboxylic acid, or ester derived therefrom, has been applied as one of the reactants. In a further embodiment, the rosin ester is the result of a chemical reaction procedure wherein no fumaric acid or maleic acid or maleic anhydride or citraconic acid or mesaconic acid or itaconic acid or acrylic acid has been applied as one of the reactants with rosin prior to esterification. In an even further embodiment, the rosin ester is not derived from maleic anhydride modified Chinese gum rosin. A dienophile is the substrate that reacts with the diene in a Diels-Alder reaction. An enophile is the substrate that reacts with the alkene in an Ene reaction. Reactive dienopiles such as maleic anhydride can also react as an enophile in an Ene reaction. More comprehensive information on the Diels-Alder reaction, Ene reaction, enophiles and dienophiles can be found in: M. B. Smith and J. March: Advanced organic chemistry, p. 1103-1105 and p. 1194-1215, $6^{th}$ ed., (2007) John Wiley & Sons, New Jersey which is incorporated herein by reference in its entirety. In an embodiment, the rosin ester is the result of a chemical reaction procedure wherein no formaldehyde has been applied as one of the reactants. In another embodiment, the rosin ester is the result of a chemical reaction procedure wherein no phenol has been applied as one of the reactants. In a further embodiment, the rosin ester is a rosin ester which is not phenolic-modified. In another embodiment, the rosin ester is the result of a chemical reaction procedure wherein no aromatic dicarboxylic acid such as isophthalic acid or terephthalic acid or phthalic acid or an ester derived therefrom or phthalic anhydride has been applied as one of the reactants.

The rosin ester can be derived from tall oil rosin, gum rosin, wood rosin, or a combination thereof. In certain embodiments, the rosin ester has a Gardner color of ten or less. Blends of more than one rosin ester may be used in the practice of the invention. Blends of one or more rosin esters with one or more other resins which are known as tackifiers in the adhesives industry may be used in the practice of the invention. Such tackifiers are for example described in U.S. Pat. No. 6,117,945 to Mehaffy et al., and in U.S. Pat. No. 8,921,464 B2 to Liu, and are described in EP 1,522,566 A2 to Haner et al. Such tackifiers include, but are not limited, to rosin, rosin derivatives, rosin esters, aliphatic hydrocarbon resins, aromatic hydrocarbon resins, terpene phenolics, aromatically modified aliphatic hydrocarbons, and resins derived from styrene, alpha-methylstyrene, vinyltoluene and polymers, copolymers and terpolymers thereof. In another embodiment, the rosin ester is synthesized by a method comprising contacting a rosin and other optional reactants which contain at least one carboxylic acid moiety with an alcohol at a temperature of for example about 170° C., or higher than 170° C., and esterifying at a maximum temperature of 290-300° C. in the absence or presence of an esterification catalyst and in the absence of a disproportionation catalyst, or with a maximum amount of 0.05% by weight of all reactants of a disproportionation catalyst, wherein the rosin ester is derived from tall oil rosin (e.g. from tall oil rosin comprising SYLVAROS® 85, SYLVAROS® 90, SYLVAROS® HYR and SYLVAROS® NCY, or a partially hydrogenated tall oil rosin, or a highly hydrogenated tall oil rosin), gum rosin (e.g. comprising *Pinus* species, including *Pinus elliottii, Pinus merkusii, Pinus Tropicana*, and *Pinus massoniana*, or a partially hydrogenated gum rosin, or an highly hydrogenated gum rosin), wood rosin or a partially hydrogenated wood rosin, or an highly hydrogenated wood rosin, or a combination thereof, including methods wherein the final reactant mixture prior to the start of the rosin ester synthesis contains a stoichiometric excess of carboxylic acid functionality as compared to the total stoichiometric amount of hydroxyl functionality.

In certain embodiments, the composition is a hot-melt adhesive, such as an EVA-based hot-melt adhesive. In one embodiment, the hot-melt includes ethylene polymers that are derived from at least one polar monomer with one or more ester groups, which polymerize with ethylene (e.g., a polymer derived from ethylene and vinyl acetate or a polymer derived from ethylene and n-butyl acrylate). In an embodiment, the ethylene polymer(s) may be present in an amount of from about 20% by weight to about 60% by weight of the hot-melt adhesive composition (or from about 30% by weight to about 40% by weight of the hot-melt adhesive composition), and the rosin ester can be from about 10% by weight to about 60% by weight of the hot-melt adhesive composition (or from about 30% by weight to about 40% by weight of to the hot-melt adhesive composition). The hot-melt adhesive can further include one or more additional components, including additional tackifiers, waxes, stabilizers (e.g., antioxidants), and fillers. In some embodiments, the hot-melt adhesive further comprises a wax or more than one wax. Examples of waxes are Sasolwax® C80 and Sasolwax® 6805. In certain embodiments, the composition is a hot-melt adhesive and the polymer having a MI value of 750 grams/10 minutes or higher, derived from a vinyl alkanoate is EVA, such as EVA derived from about 10% by weight to about 40% by weight vinyl acetate (or from about 17% by weight to about 34% by weight vinyl acetate based upon the weight of the EVA). In certain embodiments, the composition is a hot-melt adhesive and the polymer derived from a vinyl alkanoate is EVA, such as EVA derived from about 10% by weight to about 40% by weight vinyl acetate (or from about 17% by weight to about 34% by weight vinyl acetate) based upon the weight of the EVA. In certain embodiments, the composition is a hot-melt adhesive and the polymer derived from ethylene and acrylate is EnBA. In certain embodiments, the composition is a hot-melt adhesive containing a polymer blend of EVA and EnBA. In certain embodiments the applied polymers in such low temperature application hot-melt adhesives are EnBA copolymers having MI values of e.g. 750 grams/10 minutes or higher or EVA copolymers having MI values of e.g. 750 grams/10 minutes or higher, or blends thereof. The compositions can exhibit improved viscosity stability on aging at elevated temperatures such as temperatures higher than 100° C. (thermal aging) such as a temperature of 177° C. For example, in some embodiments, the compositions exhibit less than a 20% change in viscosity upon incubation at 177° C. for 96 hours (e.g., less than a 15% change in viscosity, or less than a 10% change in viscosity). The demonstrated by measuring oxidative stability using differential scanning calorimetry (DSC). In some embodiments, the composition has a Gardner color of fourteen or less after incubation at 177° C. for 96 hours (e.g., twelve or less, ten or less, eight or less, or five or less). The compositions can also exhibit improved viscosity stability upon incubation at lower aging temperatures such as 140° C., 120° C. or 100° C. for a more prolonged aging time such as 8 or more days. The compositions can also exhibit improved compatibility upon incubation at lower aging temperatures than 177° C., such as 110° C., 130° C. or 150° C. for 4 or more days. The compositions can also exhibit improved compatibility upon incubation at 177° C. for a shorter time period than 4 days, such as zero hours, 2 hours, 5 hours, 10 hours, 16 hours, or 48 hours.

Also provided are methods for preparing polymer compositions, including hot-melt adhesives. Methods for preparing polymer compositions can include mixing ethylene polymers, derived from at least one polar monomer with one or more ester groups, which polymerize with ethylene and one or more rosin esters having a hydroxyl number of seven, six, five or less. Methods can further include blending one or more additional components to the composition, such as one or more additional compatible polymers, copolymers or terpolymers, grafted polymers, functionalized polymers, grafted copolymers, grafted terpolymers, functionalized copolymers, or functionalized terpolymers. An example of a grafted polymer is a maleic anhydride grafted polymer. Methods can further include adding one or more additional components to the composition, such as one or more additional tackifiers or resins, such as a rosin ester or a mixture of more than one rosin ester, one or more waxes, a stabilizer (e.g., one or more antioxidants), one or more plasticizers, one of more fillers, one or more templating agents, pigments and dyestuffs, or a combination thereof. Methods can further include esterifying a rosin to obtain a rosin ester having a hydroxyl number of seven, six, five or less, which can then be mixed with the copolymer.

It has been reported that hot-melt adhesives having an excellent balance of high and low temperature performance can also be obtained using ethylene-2-ethylhexyl acrylate (EEHA) copolymer. EEHA has a lower glass transition temperature ($T_g$<−50° C.), higher melting point temperature ($T_m$>70° C.), and less polarity than EVA and EnBA, respectively (U.S. Pat. No. 7,208,541 B2 to Gong et al., which is incorporated herein by reference in its entirety). EEHA may be used in the practice of the invention.

DETAILED DESCRIPTION

Figure 1:
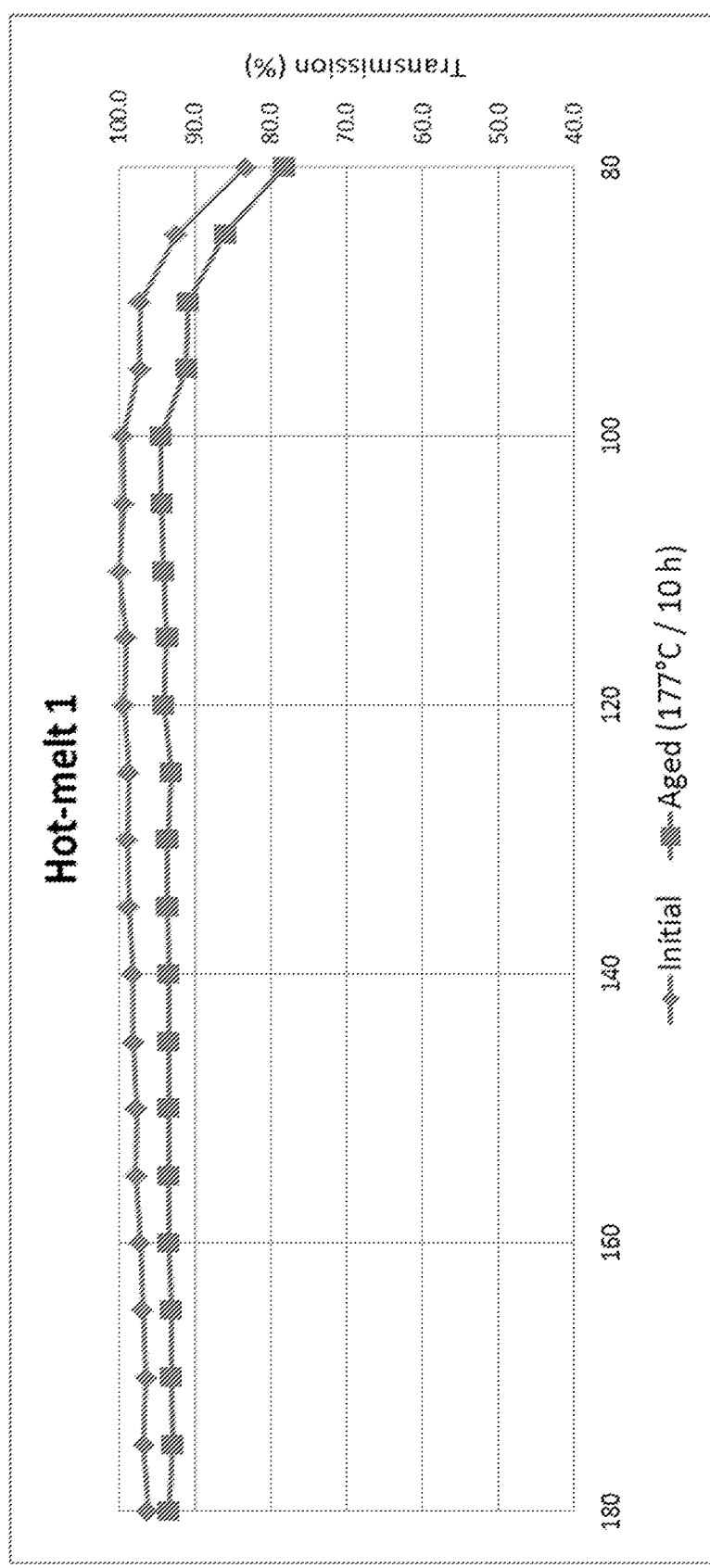
FIG. 1 depicts a graph of the turbidity over time of hot-melt adhesive 1 prepared with rosin ester 1 according to the present invention.
Figure 2:
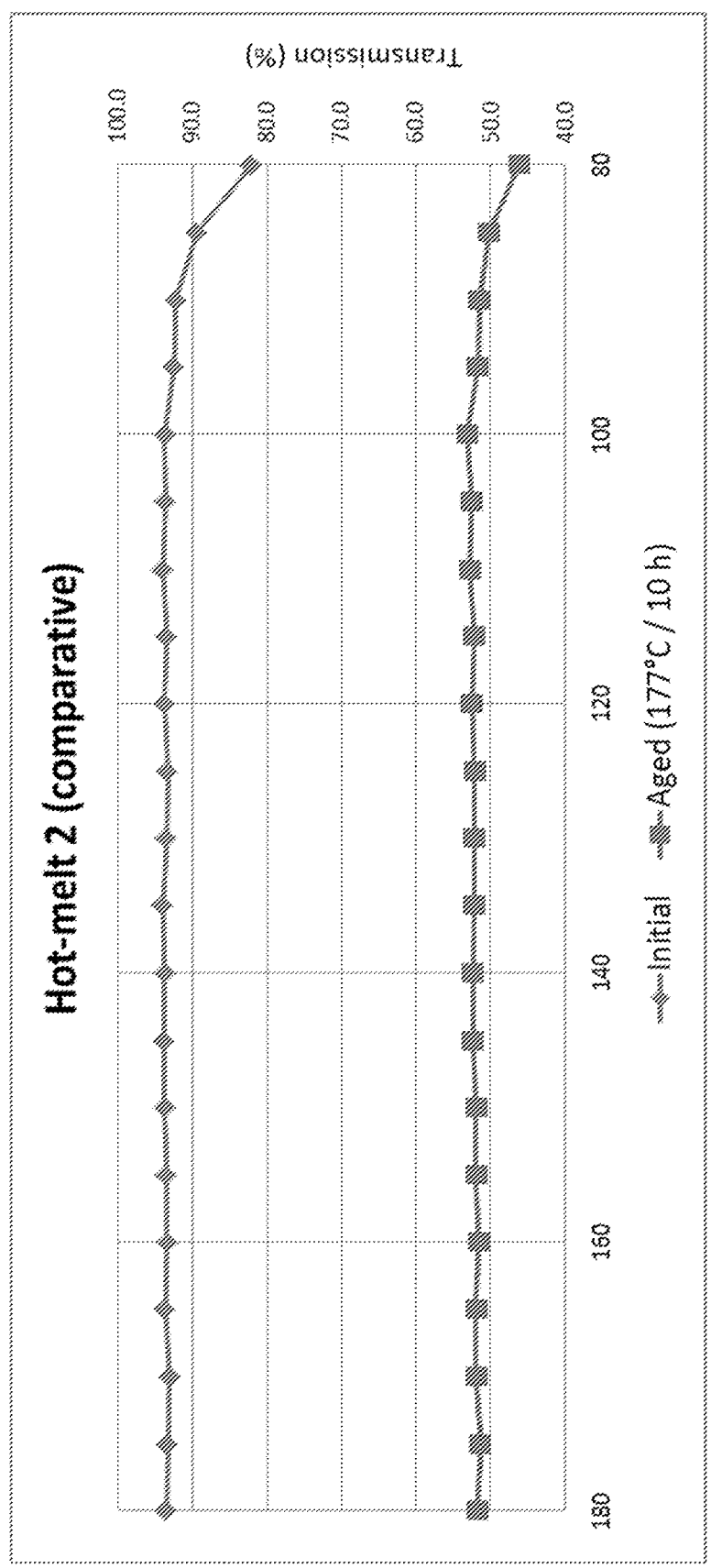
FIG. 2 depicts a graph of the turbidity over time of comparative hot-melt adhesive 2 prepared with rosin ester 2.
Figure 3:
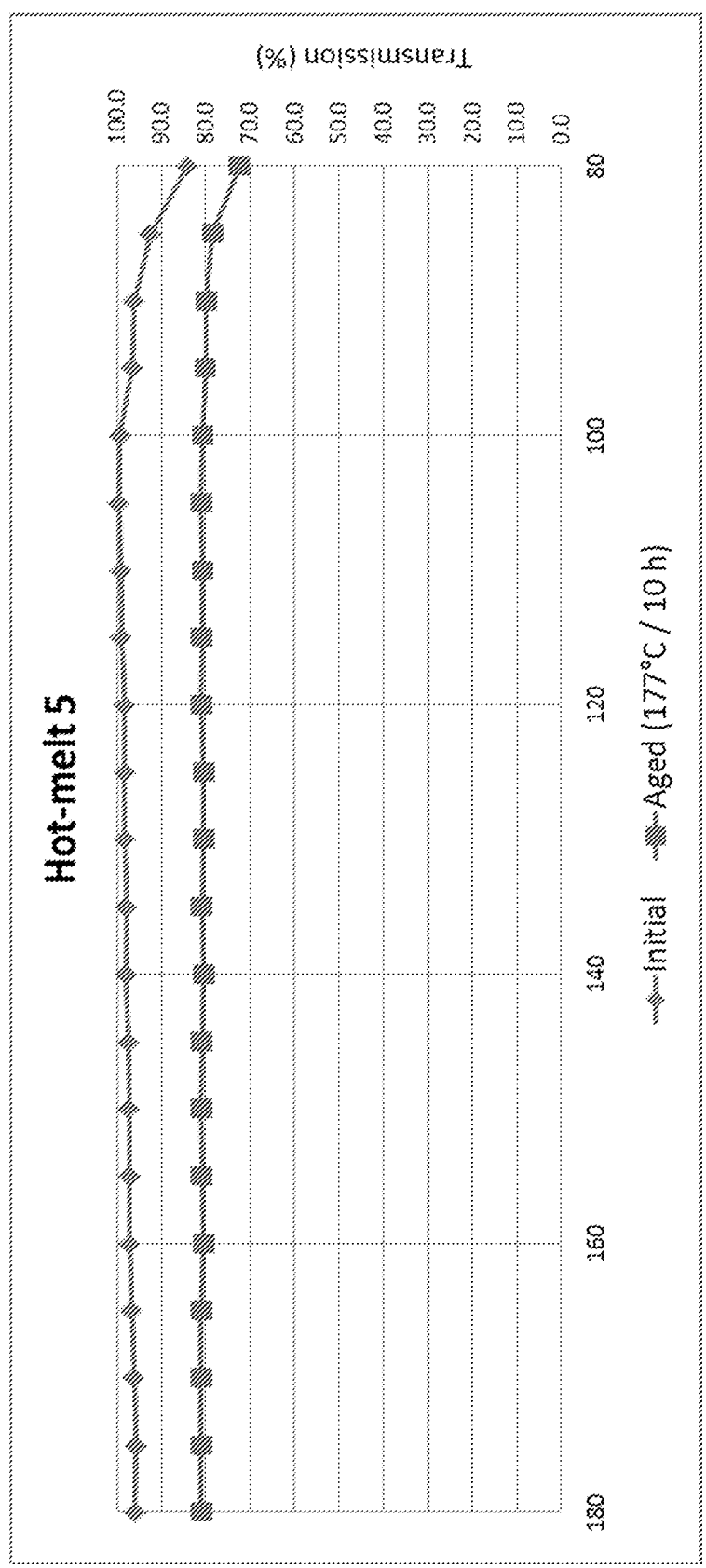
FIG. 3 depicts a graph of the turbidity over time of hot-melt adhesive 5 prepared with rosin ester 3 according to the present invention.
Figure 4:
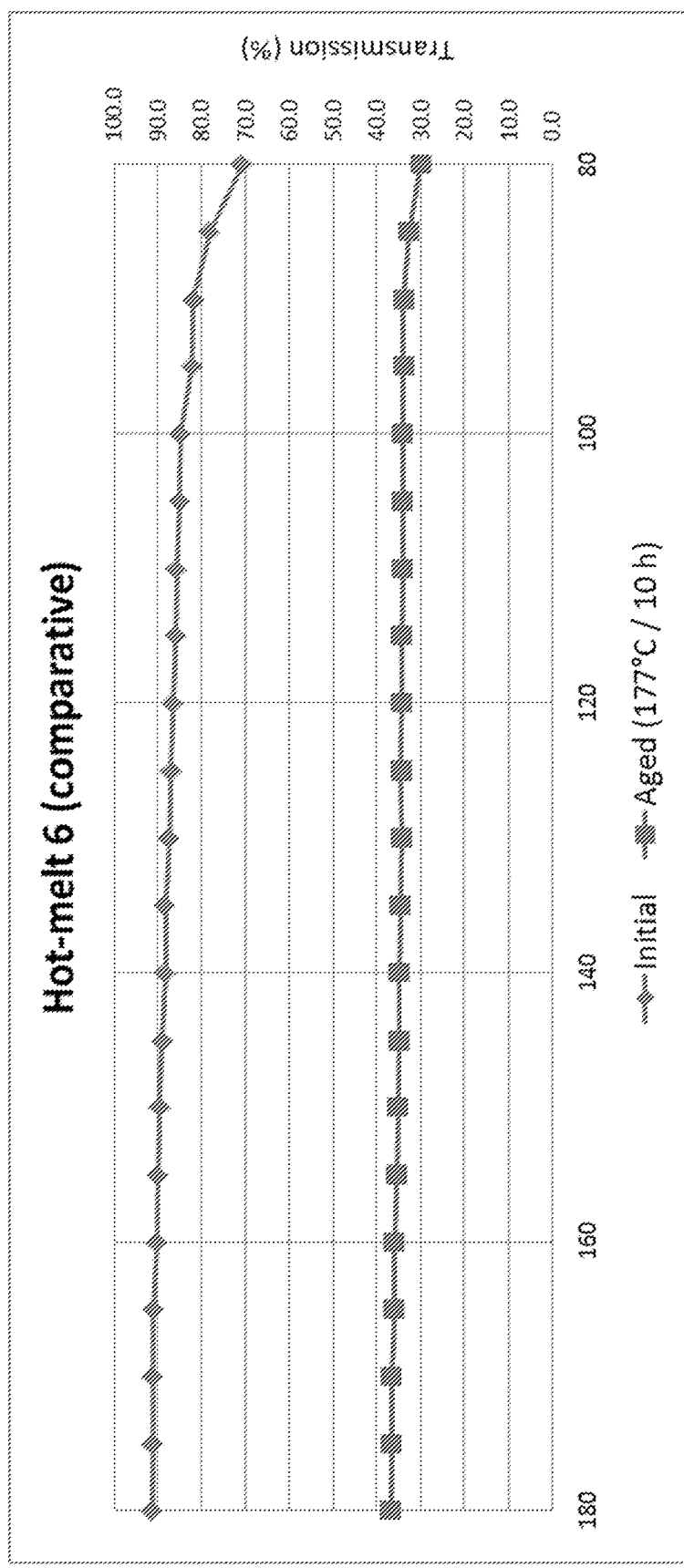
FIG. 4 depicts a graph of the turbidity over time of comparative hot-melt adhesive 6 prepared with rosin ester 4.
Figure 5:
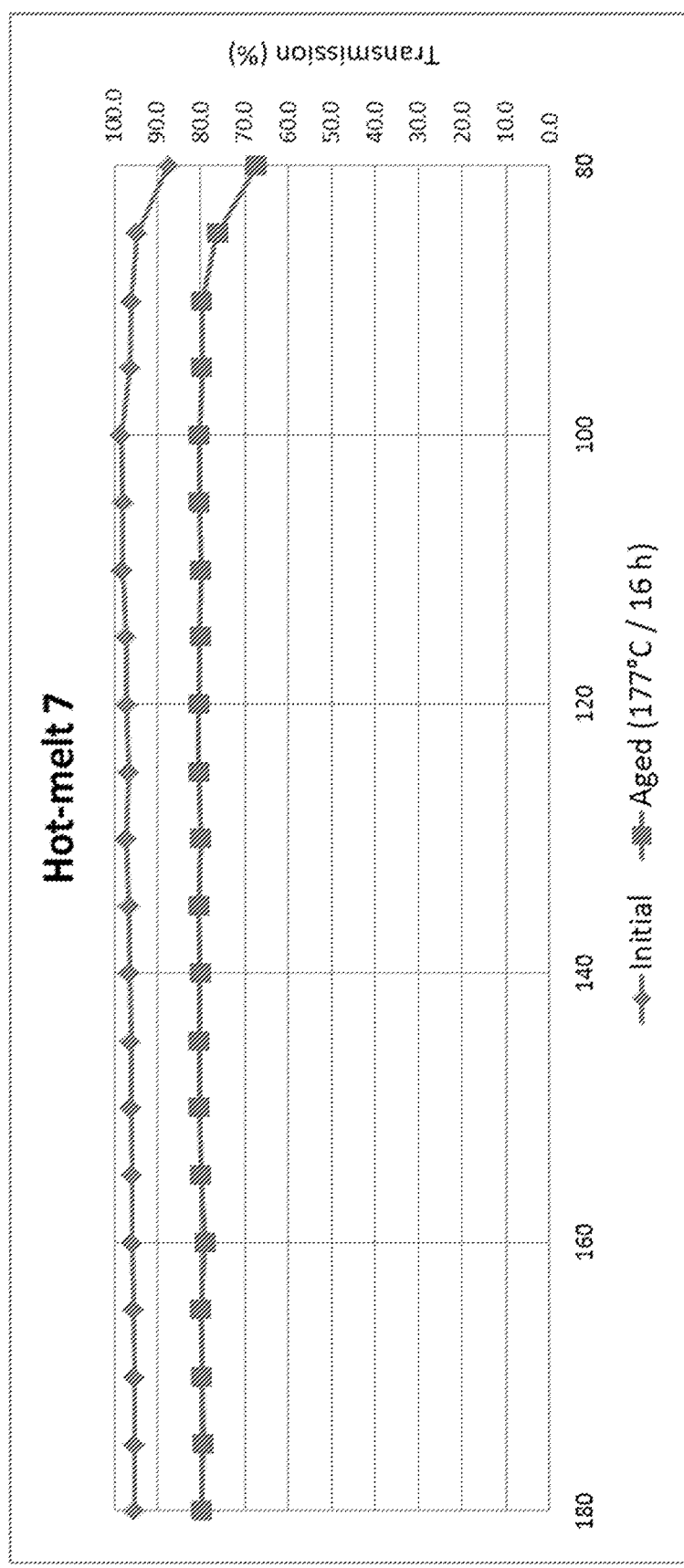
FIG. 5 depicts a graph of the turbidity over time of hot-melt adhesive 7 prepared with rosin ester 6 according to the present invention.
Figure 6:
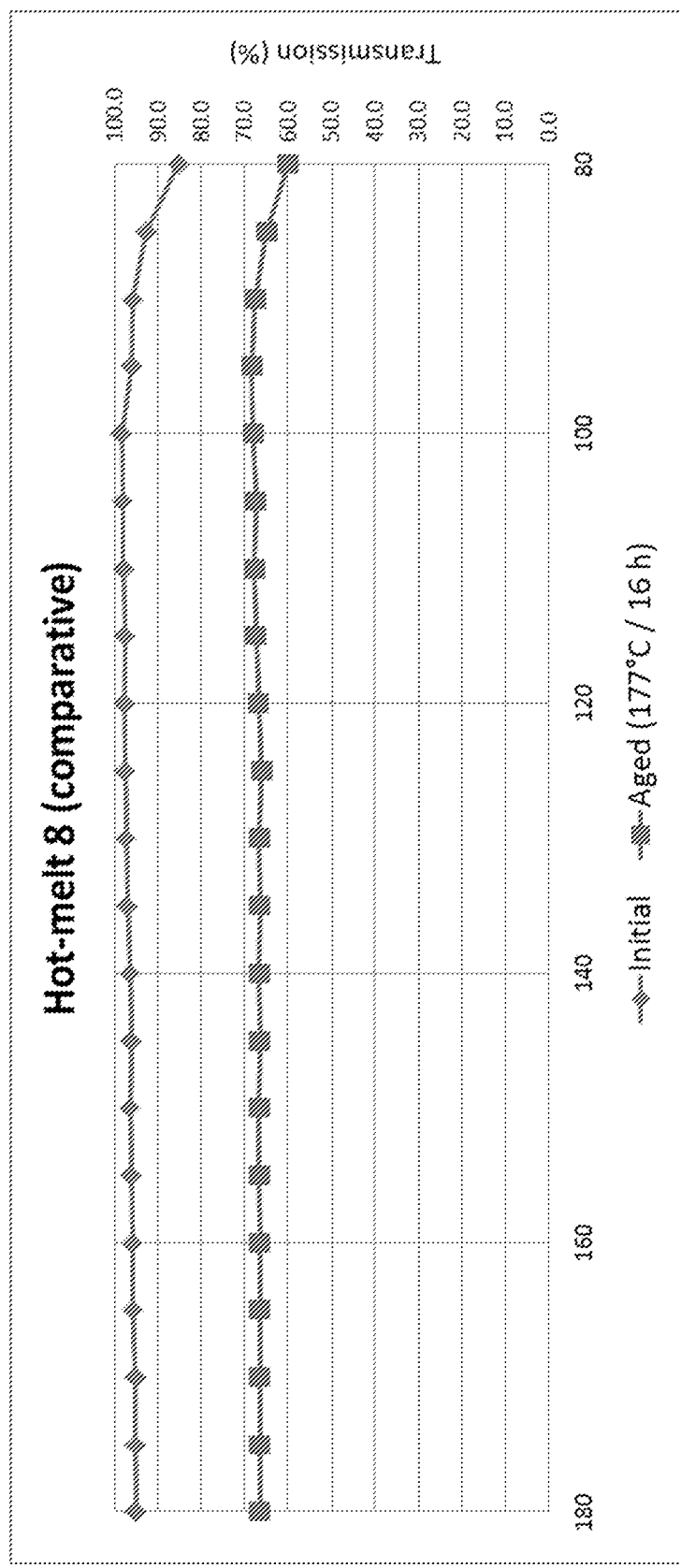
FIG. 6 depicts a graph of the turbidity over time of comparative hot-melt adhesive 8 prepared with rosin ester 7.
Figure 7:
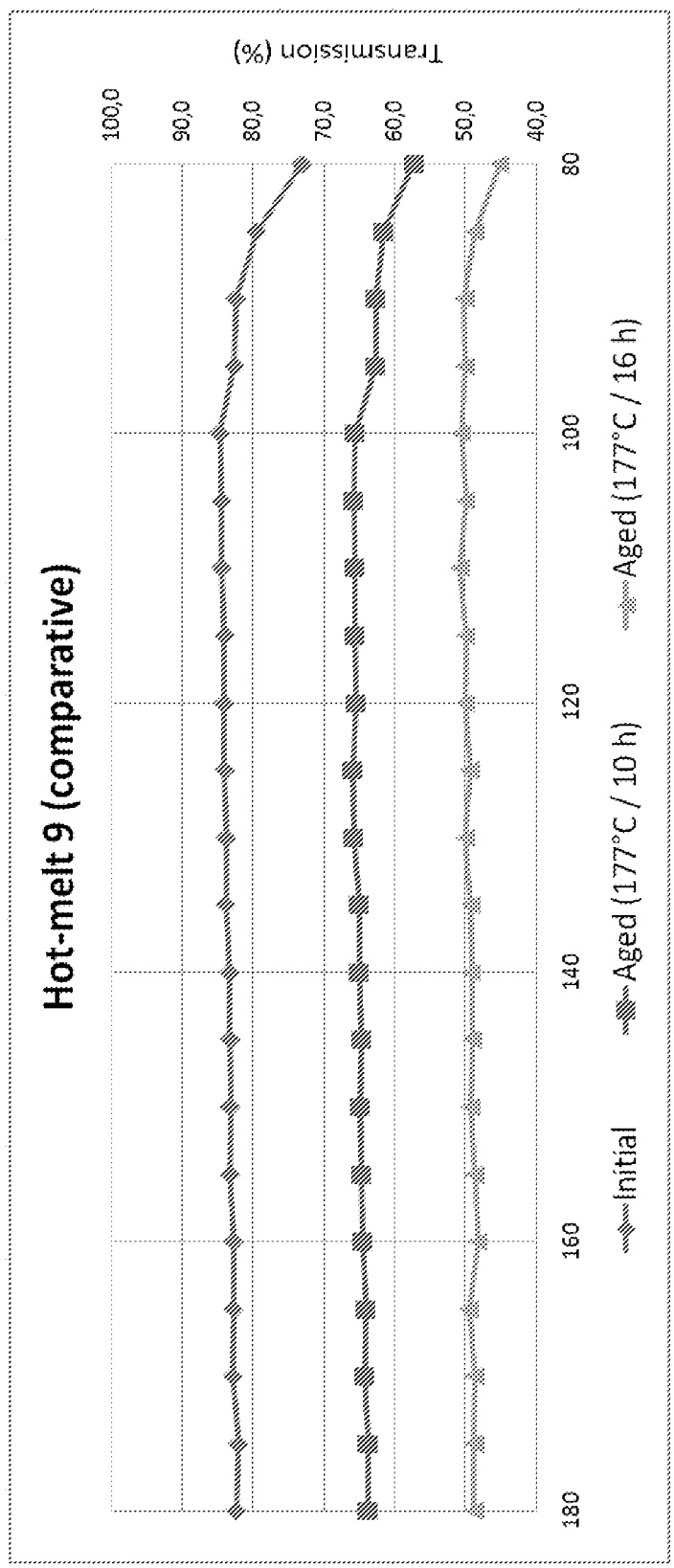
FIG. 7 depicts a graph of the turbidity over time of comparative hot-melt adhesive 9 prepared with comparative rosin ester 21 (SYLVALITE™ RE 118).

Provided herein are compositions that include ethylene polymers, derived from at least one polar monomer with one or more ester groups, which polymerize with ethylene or a blend of two or more of such polymers, and a rosin ester. Also provided are compositions that include ethylene polymers, preferably having MI values of 400 grams/10 minutes or higher, e.g. having MI values of 750 grams/10 minutes or higher, or having MI values of 900 grams/10 minutes or higher, derived from at least one polar monomer with one or more ester groups, which polymerize with ethylene or a blend of two or more of such polymers, and a rosin ester.

The ester group in the polar monomers of this invention can be either covalently linked with its alkoxy moiety to the vinyl part of the monomer such as is the case in vinyl alkanoates as exemplified by vinyl acetate, or can be linked with its acyl carbon atom to the vinyl part of the monomer such as is the case in an acrylate ester or methacrylate ester as exemplified by n-butyl acrylate.

By incorporating a rosin ester having particular properties (e.g., a low hydroxyl number, a low acid number, a relatively low PAN number, or combinations thereof) into ethylene polymers derived from at least one polar monomer with one or more ester groups, which polymerize with ethylene the resultant composition can exhibit improved viscosity stability on aging at elevated temperatures (thermal aging). By incorporating a rosin ester having particular properties (e.g., a low hydroxyl number, a low acid number, a relatively low PAN number, a relatively low sulfur content as compared to the rosin reactant, a relatively low aromatic content, or combinations thereof) into ethylene polymers having MI values of 400 grams/10 minutes or higher, e.g. having MI values of 750 grams/10 minutes or higher, or e.g. having MI values of 900 grams/10 minutes or higher, derived from at least one polar monomer with one or more ester groups, which polymerize with ethylene, the resultant composition can exhibit a higher level of compatibility at higher temperatures, e.g. higher than 100° C. and the resultant composition can exhibit a higher level of compatibility on aging at elevated temperatures such as temperatures higher than 100° C. (thermal aging). In some embodiments, the rosin ester includes more than one type of rosin ester. In some embodiments, the rosin ester can be blended with other resins which are known as tackifiers in the adhesives industry.

Low molecular weight copolymers, e.g., that have MI values of 750 grams/10 minutes or higher, derived from ethylene and vinyl alkanoates include polymers derived, from polymerization of one or more vinyl alkanoate monomers with ethylene. For example, a copolymer having MI values of 750 grams/10 minutes or higher, or e.g. having MI values of 900 grams/10 minutes or higher, derived from ethylene and a vinyl alkanoate can be obtained by, for example, radical polymerization of a monomer mixture comprising one or more vinyl alkanoate monomers and ethylene. Said another way, a copolymer having MI values of e.g. 750 grams/10 minutes or higher, derived from ethylene and a vinyl alkanoate can be said to contain monomer units obtained by copolymerization (e.g., radical polymerization) of one or more vinyl alkanoate monomers (e.g., vinyl alkanoate monomer units) with ethylene, such as is the case in poly(ethylene-co-vinyl acetate), EVA. In these embodiments, the co-polymers having MI values of 400 grams/10 minutes or higher, e.g. having MI values of 750 grams/10 minutes or higher, or having MI values of 900 grams/10 minutes or higher, derived from ethylene and one or more vinyl alkanoates can be derived from a monomer mixture comprising varying amounts of vinyl alkanoates and ethylene, so as to provide a copolymer having the chemical and physical properties suitable for a particular application.

Vinyl alkanoate monomers are composed of a vinyl moiety which is covalently bound with a single bond to the oxygen atom of an alkylcarbonyloxy group or a formyloxy group. Alkylcarbonyloxy group are generally also referred to as alkanoyloxy groups. The alkyl moiety of this alkylcarbonyloxy group as used herein, refers to the radical of saturated or unsaturated aliphatic groups, including straight-chain alkyl, alkenyl, or alkynyl groups, branched-chain alkyl, alkenyl, or alkynyl groups, cycloalkyl or cycloalkenyl (alicyclic) groups, alkyl-substituted cycloalkyl or cycloalkenyl groups, cycloalkyl-substituted alkyl or alkenyl groups, arylalkyl groups, or cinnamyl groups. In some embodiments, the alkyl group comprises 30 or fewer carbon atoms in its backbone (e.g., C1-C30 for straight chain, C3-C30 for branched chain). For example, the alkyl group can comprise 20 or fewer carbon atoms, 12 or fewer carbon atoms, 8 or fewer carbon atoms, or 6 or fewer carbon atoms in its backbone. Representative of alkyl groups are methyl, ethyl, propyl, isopropyl, butyl, isobutyl, sec-butyl, tert-butyl, pentyl, isopentyl, neopentyl, hexyl, heptyl, octyl, ethylhexyl, nonyl, decyl, undecyl, dodecyl, tridecyl, tetradecyl, pentadecyl, hexadecyl, heptadecyl, octadecyl, and the like. The term alkyl includes both unsubstituted alkyls and substituted alkyls, the latter of which refers to alkyl groups having one or more substituents, such as a halogen (F or Cl), haloalkyl (e.g., —$CF_3$ or $CCl_3$), replacing a hydrogen on one or more carbons of the hydrocarbon backbone. The alkyl groups can also comprise one or two oxygen atoms within the carbon backbone of the alkyl group, such as an ether moiety. Arylalkyl, as used herein, refers to an alkyl group substituted with an aryl group (e.g., derived from an aromatic hydrocarbon such as a phenyl group or benzyl group). A cinnamyl group, as used herein, refers to an allylic group with an attached phenyl substituent at the 3-position. Suitable vinyl alkanoate monomers include vinyl formate, vinyl acetate, vinyl propionate, vinyl butyrate, vinyl isobutyrate, vinyl valerate, vinyl isovalerate, vinyl caproate, vinyl isocaproate, vinyl 2-ethyl hexanoate, vinyl isooctanoate, vinyl nonanoate, vinyl decanoate, vinyl laurate, vinyl pivalate, vinyl palmitate, vinyl stearate, vinyl cinnamate and vinyl versatate. In some embodiments, the vinyl alkanoate monomer comprises a monomer selected from the group consisting of vinyl acetate, vinyl propionate, vinyl laurate, and combinations thereof. In certain embodiments, the vinyl alkanoate monomer comprises vinyl acetate.

In some embodiments, the low molecular weight copolymer, e.g. that has an MI value of 750 grams/10 minutes or higher, or e.g. has an MI value of 900 grams/10 minutes or higher, derived from ethylene and a vinyl alkanoate (e.g., vinyl acetate) is derived from at least about 5% by weight of a vinyl alkanoate monomer (e.g., vinyl acetate), based on the total weight of all of the monomers polymerized to form the polymer (e.g., at least 7.5% by weight, at least 9% by weight, at least 10% by weight, at least 11% by weight, at least 12% by weight, at least 13% by weight, at least 14% by weight, at least 15% by weight, at least 16% by weight, at least 17% by weight, at least 18% by weight, at least 19% by weight, at least 20% by weight, at least 21% by weight, at least 22% by weight, at least 23% by weight, at least 24% by weight, at least 25% by weight, at least 26% by weight, at least 27% by weight, at least 28% by weight, at least 29% by weight, at least 30% by weight, at least 31% by weight, at least 32% by weight, at least 33% by weight, at least 34% by weight, at least 35% by weight, at least 37.5% by weight, at least 40% by weight, at least 45% by weight, at least 50% by weight, at least 55% by weight, at least 60% by weight, at least 65% by weight, at least 70% by weight, at least 75% by weight, at least 80% by weight, at least 85% by weight, or at least 90% by weight, to a maximum of 95% by weight). In some embodiments, the low molecular weight polymer e.g. that has an MI value of 750 grams/10 minutes or higher, e.g. having MI values of 900 grams/10 minutes or higher, derived from ethylene and a vinyl alkanoate is derived from about 95% by weight or less of a vinyl alkanoate monomer (e.g., vinyl acetate), based on the total weight of all of the monomers polymerized to form the polymer (e.g., 90% by weight or less, 85% by weight or less, 80% by weight or less, 75% by weight or less, 70% by weight or less, 65% by weight or less, 60% by weight or less, 55% by weight or less, 50% by weight or less, 45% by weight or less, 40% by weight or less, 37.5% by weight or less, 35% by weight or less, 34% by weight or less, 33% by weight or less, 32% by weight or less, 31% by weight or less, 30% by weight or less, 29% by weight or less, 28% by weight or less, 27% by weight or less, 26% by weight or less, 25% by weight or less, 24% by weight or less, 23% by weight or less, 22% by weight or less, 21% by weight or less, 20% by weight or less, 19% by weight or less, 18% by weight or less, 17% by weight or less, 16% by weight or less, 15% by weight or less, 14% by weight or less, 13% by weight or less, 12% by weight or less, 11% by weight or less, 10% by weight or less, 9% by weight or less, or 7.5% by weight or less, to a minimum of 5% by weight).

The low molecular weight copolymer, e.g. that has an MI value of 750 grams/10 minutes or higher, e.g. having MI values of 900 grams/10 minutes or higher, derived from ethylene and a vinyl alkanoate (e.g. vinyl acetate) can be a copolymer derived from an amount of a vinyl alkanoate (e.g., vinyl acetate) ranging from any of the minimum values above to any of the maximum values above. For example, the polymer having MI values of 750 grams/10 minutes or higher, e.g. having MI values of 900 grams/10 minutes or higher derived from ethylene and a vinyl alkanoate (e.g., vinyl acetate) can be a copolymer derived from 5% by weight to less than 95% by weight of a vinyl alkanoate monomer (e.g., vinyl acetate), based on the total weight of all of the monomers polymerized to form the polymer (e.g., from 5% by weight to 75% by weight of a vinyl alkanoate monomer such as vinyl acetate, from 10% by weight to 40% by weight of a vinyl alkanoate monomer such as vinyl acetate, or from 17% by weight to 34% by weight of a vinyl alkanoate monomer such as vinyl acetate).

In the case of low molecular weight terpolymers, e.g. that having MI values of 750 grams/10 minutes or higher, e.g. having MI values of 900 grams/10 minutes or higher, derived from ethylene and a vinyl alkanoate monomer (e.g., vinyl acetate) and one or more ethylenically-unsaturated monomers, any suitable ethylenically-unsaturated monomers can be incorporated in the terpolymer, so as to provide a terpolymer having the chemical and physical properties desired for a low temperature hot-melt adhesive application. By way of example, suitable low molecular weight ethylenically-unsaturated monomers which can be incorporated into the terpolymers e.g. having MI values of 750 grams/10 minutes or higher, e.g. having MI values of 900 grams/10 minutes or higher, include (meth)acrylate monomers, vinyl aromatic monomers (e.g., styrene), vinyl esters of a carboxylic acids, (meth)acrylonitriles, vinyl halides, vinyl ethers, (meth)acrylamides and (meth)acrylamide derivatives, ethylenically unsaturated aliphatic monomers (e.g., ethylene, butylene, butadiene), and combinations thereof. As used herein, the term "(meth)acrylate monomer" includes acrylate, methacrylate, diacrylate, and dimethacrylate monomers. Similarly, the term "(meth)acrylonitrile" includes acrylonitrile, methacrylonitrile, etc. and the term "(meth) acrylamide" includes aerylamide, methacrylamide, etc.

Suitable (meth)acrylate monomer include esters of α,β-monoethylenically unsaturated monocarboxylic and dicarboxylic acids having 3 to 6 carbon atoms with alkanols having 1 to 20 carbon atoms (e.g., esters of acrylic, acid, methacrylic acid, maleic acid, fumaric acid, or itaconic acid, with $C_1$-$C_{20}$, $C_1$-$C_{12}$, $C_1$-$C_8$, or $C_1$-$C_4$ alkanols). Exemplary (meth)acrylate monomers include, but are not limited to, methyl acrylate, methyl (meth)acrylate, ethyl acrylate, ethyl (meth)acrylate, butyl acrylate, butyl (meth)acrylate, isobutyl (meth)acrylate, n-hexyl (meth)acrylate, ethylhexyl (meth) acrylate, n-heptyl (meth)acrylate, ethyl (meth)acrylate, 2-methylheptyl (meth)acrylate, octyl (meth)acrylate, isooctyl (meth)acrylate, n-nonyl (meth)acrylate, isononyl (meth) acrylate, n-decyl (meth)acrylate, isodecyl (meth)acrylate, dodecyl (meth)acrylate, lauryl (meth)acrylate, tridecyl (meth)acrylate, stearyl (meth)acrylate, glycidyl (meth)acrylate, alkyl crotonates, vinyl acetate, di-n-butyl maleate, di-octylmaleate, acetoacetoxyethyl (meth)acrylate, acetoacetoxypropyl (meth)acrylate, hydroxyethyl (meth)acrylate, allyl (math)acrylate, tetrahydrofurfuryl (meth)acrylate, cyclohexyl (meth)acrylate, 2-ethoxyethyl (meth)acrylate, 2-methoxy (meth)acrylate, 2-(2-ethoxyethoxy)ethyl (meth) acrylate, 2-ethylhexyl (meth)acrylate, 2-propylheptyl (meth) acrylate, 2-phenoxyethyl (meth)acrylate, isobornyl (meth) acrylate, caprolactone (meth)acrylate, polypropyleneglycol mono(meth)acrylate, polyethyleneglycol (meth)acrylate, benzyl (meth)acrylate, 2,3-di(acetoacetoxy)propyl (meth) acrylate, hydroxypropyl (meth)acrylate, methylpolyglycol (meth)acrylate, 3,4-epoxycyclohexylmethyl (meth)acrylate, 1,6 hexanediol di(meth)acrylate, 1,4 butanediol di(meth) acrylate and combinations thereof.

Suitable vinyl aromatic compounds include styrene, α- and p-methylstyrene, α-butylstyrene, 4-n-butylstyrene, 4-n-decylstyrene, vinyltoluene, and combinations thereof. Suitable vinyl esters of carboxylic acids include vinyl esters of carboxylic acids comprising up to 20 carbon atoms, such as vinyl laurate, vinyl stearate, vinyl propionate, versatic acid vinyl esters, and combinations thereof. Suitable vinyl halides can include ethylenically unsaturated compounds substituted by chlorine, fluorine or bromine, such as vinyl chloride and vinylidene chloride. Suitable vinyl ethers can include, for example, vinyl ethers of alcohols comprising 1 to 4 carbon atoms, such as vinyl methyl ether or vinyl isobutyl ether. Aliphatic hydrocarbons having 2 to 8 carbon atoms and one or two double bonds can include, for example, hydrocarbons having 2 to 8 carbon atoms and one olelinic double bond, such as ethylene, as well as hydrocarbons having 4 to 8 carbon atoms and two olefinic double bonds, such as butadiene, isoprene, and chloroprene.

In some embodiments, the low molecular weight copolymer, e.g. that has an MI value of 750 grams/10 minutes or higher, e.g. having MI values of 900 grams/10 minutes or higher, derived from ethylene and a vinyl alkanoate can be a copolymer derived from vinyl acetate. In certain embodiments, the copolymer derived from ethylene and vinyl acetate is poly(ethylene-co-vinyl acetate) (EVA). EVA is a copolymer derived from ethylene and vinyl acetate. EVA is widely used in a variety of applications, including as a copolymer in hot-melt adhesives, in road marking and pavement marking applications, in biomedical applications (e.g., as a matrix for controlled drug delivery), as an additive in plastic films, and as a foam in a variety of consumer products.

Optionally, the low molecular weight EVA copolymer having preferably MI values of 750 grams/10 minutes or higher, can be grafted with suitable olefinic monomers, such as butadiene, to obtain copolymers having the particular chemical and physical properties required for a particular application. See, for example, U.S. Pat. No. 3,959,410 to DiRossi and U.S. Pat. No. 5,036,129 to Atwell, et al. which are incorporated herein by reference in their entirety.

In certain embodiments, the low molecular weight polymer, e.g. that has an MI value of 750 grams/10 minutes or higher, derived from vinyl acetate is EVA derived from 9% by weight to less than 45% by weight vinyl acetate, based on the total weight of all of the monomers polymerized to form the polymer (e.g., from 17% by weight to 40% by weight vinyl acetate, from 17% by weight to 34% by weight vinyl acetate, or from 25% by weight to 30% by weight vinyl acetate). In one embodiment, the low molecular weight polymer, e.g. that has an MI value of 750 grams/10 minutes or higher, derived from vinyl acetate is EVA derived from approximately 28% by weight vinyl acetate, based on the total weight of all of the monomers polymerized to form the polymer. Ethylene vinylacetate copolymers are or have been available from DuPont Chemical Co., Wilmington, Del. under the tradename Elvax™ (e.g., ELVAX™ 205W which has a melt index of 800 and a vinyl acetate content of about 28% by weight in the copolymer. Other ethylene vinyl acetate copolymers are or have been available from Exxon Chemical Co. under the tradename ESCORENE™ (e.g., UL7505) or from Arkema under the tradename EVATANE™, or from LyondellBasell under the tradename ULTRATHENE™. EVATANE™ 28-800 is a representative example having approximately 30-32% by weight vinyl acetate content and has an MI value of approximately 700-900 grams/10 minutes.

In some embodiments, the low molecular weight copolymer e.g. that has an MI value of 750 grams/10 minutes or higher, derived from ethylene and a vinyl alkanoate (e.g., vinyl acetate) has a melting temperature, as measured by differential scanning calorimetry (DSC) using the standard method described in ISO 11357-3:2011, of greater than 25° C. (e.g., greater than 30° C., greater than 35° C., greater than 40° C., greater than 45° C., greater than 50° C., greater than 55° C., greater than 60° C., greater than 65° C., greater than 70° C., greater than 75° C., greater than 80° C., greater than 85° C., greater than 90° C., or greater than 95° C.). The copolymer having MI values of 750 grams/10 minutes or higher, derived from ethylene and a vinyl alkanoate (e.g., vinyl acetate) can have a melting temperature of less than 100° C. (e.g., less than 95° C., less than 90° C. less than 85° C., less than 80° C., less than 75° C., less than 70° C., less than 65° C., less than 60° C., less than 55° C., less than 50° C., less than 45° C., less than 40° C., less than 35° C., or less than 30° C.).

The low molecular weight copolymer having MI values of 750 grams/10 minutes or higher, derived from ethylene and a vinyl alkanoate (e.g., vinyl acetate) can have a melting temperature ranging from any of the minimum values above to any of the maximum values above. For example, the polymer derived from a vinyl alkanoate (e.g., vinyl acetate) can have a melting temperature, as measured by differential scanning calorimetry (DSC) using the standard method described in ISO 11357-3:2011, of from 25° C. to 100° C. (e.g., from 25° C. to 90° C., from 35° C. to 85° C., or 50° C. to 80° C.).

Low molecular weight polymers e.g. having an MI value of 400 grams/10 minutes or higher, e.g. 750 grams/10 minutes or higher, or e.g. having MI values of 900 grams/10 minutes or higher, derived from ethylene and an acrylate ester or methacrylate ester include those obtained from polymerization of one or more acrylate ester or methacrylate ester monomers with ethylene. For example, a copolymer having MI values of 750 grams/10 minutes or higher, e.g. having MI values of 900 grams/10 minutes or higher, derived from ethylene and an acrylate ester or methacrylate ester can be obtained by, for example, radical polymerization of a monomer mixture comprising one or more acrylate ester or methacrylate ester monomers and ethylene. Said another way, a copolymer a copolymer having MI values of 750 grams/10 minutes or higher, e.g. having MI values of 900 grams/10 minutes or higher, derived from ethylene and an acrylate ester or methacrylate ester can be said to contain monomer units obtained by copolymerization (e.g., radical polymerization) of one or more acrylate ester or methacrylate ester monomers (e.g., n-butyl acrylate monomer units) with ethylene, such as is the case in ethylene-n-butyl acrylate copolymer, EnBA.

Exemplary acrylate ester or methacrylate ester monomers include but are not limited, to acrylate esters with methanol, ethanol, propanol, butanol or other alcohols, or methacrylate esters with methanol, ethanol, propanol, butanol or other alcohols. Examples of acrylate or methacrylate derived monomers include but are not limited to n-butylacrylate, methylacrylate, ethylacrylate, 2-ethyl hexyl acrylate, methyl methacrylate, and ethylmethacrylate. Random copolymers, block copolymers, terpolymers and grafted polymers as well as blends thereof may be used in the practice of the invention. Compatible blends of homopolymers with the copolymers or terpolymers of this invention may be used in the practice of the invention.

In some embodiments, the low molecular weight copolymer e.g. that has an MI value of 750 grams/10 minutes or higher, e.g. having MI values of 900 grams/10 minutes or higher, derived from ethylene and an acrylate ester or methacrylate ester (e.g., n-butyl acrylate) is derived from at least 5% by weight of an acrylate ester or methacrylate ester monomer (e.g., n-butyl acrylate), based on the total weight of all of the monomers polymerized to form the polymer (e.g., at least 7.5% by weight, at least 9% by weight, at least 10% by weight, at least 11% by weight, at least 12% by weight, at least 13% by weight, at least 14% by weight, at least 15% by weight, at least 16% by weight, at least 17% by weight, at least 18% by weight, at least 19% by weight, at least 20% by weight, at least 21% by weight, at least 22% by weight, at least 23% by weight, at least 24% by weight, at least 25% by weight, at least 26% by weight, at least 27% by weight, at least 28% by weight, at least 29% by weight, at least 30% by weight, at least 31% by weight, at least 32% by weight, at least 33% by weight, at least 34% by weight, at least 35% by weight, at least 37.5% by weight, at least 40% by weight, at least 45% by weight, at least 50% by weight, at least 55% by weight, at least 60% by weight, at least 65% by weight, at least 70% by weight, at least 75% by weight, at least 80% by weight, at least 85% by weight, or at least 90% by weight, to a maximum of 95% by weight). In some embodiments, the polymer, derived from ethylene and acrylate ester or methacrylate ester monomer (e.g., n-butyl acrylate) is derived from 95% by weight or less of a acrylate ester or methacrylate ester monomer (e.g., n-butyl acrylate), based on the total weight of all of the monomers polymerized to form the polymer (e.g. 90% by weight or less, 85% by weight or less, 80% by weight or less, 75% by weight or less, 70% by weight or less, 65% by weight or less, 60% by weight or less, 55% by weight or less, 50% by weight or less, 45% by weight or less, 40% by weight or less, 37.5% by weight or less, 35% by weight or less, 34% by weight or less, 33% by weight or less, 32% by weight or less, 31% by weight or less, 30% by weight or less, 29% by weight or less, 28% by weight or less, 27% by weight or less, 26% by weight or less, 25% by weight or less, 24% by weight or less, 23% by weight or less, 22% by weight or less, 21% by weight or less, 20% by weight or less, 19% by weight or less, 18% by weight or less, 17% by weight or less, 16% by weight or less, 15% by weight or less, 14% by weight or less, 13% by weight or less, 12% by weight or less, 11% by weight or less, 10% by weight or less, 9% by weight or less, or 7.5% by weight or less, to a minimum of 5% by weight).

The low molecular weight copolymer e.g. that has an MI value of 750 grams/10 minutes or higher, e.g. having MI values of 900 grams/10 minutes or higher, derived from ethylene and an acrylate ester or methacrylate ester monomer (e.g., n-butyl acrylate) can be a copolymer derived from an amount of an acrylate ester or methacrylate ester monomer (e.g., n-butyl acrylate) ranging from any of the minimum values above to any of the maximum values above. For example, the copolymer having MI values of 750 grams/10 minutes or higher, e.g. having MI values of 900 grams/10 minutes or higher, derived from ethylene and an acrylate ester or methacrylate ester monomer (e.g., n-butyl acrylate) can be a copolymer derived from 5% by weight to less than 95% by weight of an acrylate ester or methacrylate ester monomer (e.g., n-butyl acrylate), based on the total weight of all of the monomers polymerized to form the polymer (e.g., from 5% by weight to 75% by weight of an acrylate ester or methacrylate ester monomer such as n-butyl acrylate, from 10% by weight to 50% by weight of an acrylate ester or methacrylate ester monomer such as n-butyl acrylate, or from 30% by weight to 45% by weight of an acrylate ester or methacrylate ester monomer such as n-butyl acrylate.

In some embodiments, the low molecular weight copolymer, e.g. that has an MI value of 750 grams/10 minutes or higher, e.g. having MI values of 900 grams/10 minutes or higher, derived from ethylene and an acrylate ester or methacrylate ester monomer can be a copolymer derived from n-butyl acrylate. In certain embodiments, the low molecular weight copolymer, e.g that has an MI value of 750 grams/10 minutes or higher, derived from ethylene and an acrylate ester or methacrylate ester monomer is ethylene n-butyl acrylate) (EnBA). EnBA is a copolymer derived from ethylene and n-butyl acrylate. EnBA copolymer, e.g. that has an MI value of 750 grams/10 minutes or higher, is widely used in a variety of applications, including as a copolymer in low temperature application hot-melt adhesives, in a variety of consumer products. Optionally, the EnBA copolymer can be grafted with suitable olefinic monomers, to obtain terpolyrners having the particular chemical and physical properties required for a particular application.

In certain embodiments, the low molecular weight copolymer e.g. that has an MI value of 750 grams/10 minutes or higher, e.g. having MI values of 900 grams/10 minutes or higher, derived from ethylene and n-butyl acrylate is EnBA derived from 5% by weight to less than 75% by weight n-butyl acrylate, based on the total weight of all of the monomers polymerized to form the polymer (e.g., from 10% by weight to 50% by weight n-butyl acrylate, from 30% by weight to 45% by weight, or from 33% by weight to 37% by weight n-butyl acrylate). In one embodiment, the polymer having MI values of 750 grams/10 minutes or higher, derived from vinyl acetate is EnBA derived from approximately 35% by weight n-butyl acrylate, based on the total weight of all of the monomers polymerized to form the polymer. Such EnBA copolymers having relatively high MI values are or have been available from Exxon Chemical under the tradename ENABLE® (e.g., ENABLE® 33900 contains approximately 35% by weight of n-butyl acrylate and has a MI of about 900). Other ethylene n-butyl acrylate copolymer tradenames are LOTRYL® and ENATHENE®. An example of an EnBA copolymer is LOTRYL® 35BA320 (EnBA copolymer with a 33-37 wt % n-butyl acrylate content, commercially available from Arkema Inc.)

Ethylene methyl acrylate copolymers can be applied in low application temperature hot-melts adhesives and are for example available from Exxon Chemical Co. as OPTEMA®.

Other embodiments will comprise ethylene n-butyl acrylate copolymer, ethylene vinyl acetate copolymer or blends thereof. An example of such a blend is a blend which comprises LOTRYL® 35BA320 and EVATANE® 28-800.

The compositions provided herein also include a rosin ester. Rosin esters can be formed by the esterification of rosin. Rosin, also called colophony or Greek pitch (*Pix groeca*), is a solid hydrocarbon secretion of plants, typically of conifers such as pines (e.g., *Pinus palustris* and *Pinus caribaea*). Rosin can include a mixture of rosin acids, with the precise composition of the rosin varying depending in part on the plant species. Rosin acids are $C_{20}$ fused-ring monocarboxylic acids with a nucleus of three fused six-carbon rings containing double bonds that vary in number and location. Examples of rosin acids include abietic acid, neoabietic acid, dehydroabietic acid, dihydroabietic acid, pimaric acid, levopimaric acid, sandaracopimaric acid, isopimaric acid, and palustris acid. Natural rosin typically consists of a mixture of approximately seven or eight rosin acids, in combination with minor amounts of a variety of other components. These minor amounts of a variety of other components are usually referred to as neutrals or nonsaponifiables.

Rosin is commercially available, and can be obtained from pine trees by distillation of oleoresin (gum rosin being the residue of distillation), by extraction of pine stumps (wood rosin) or by fractionation of tall oil (tall oil rosin). Tall oil rosin typically comprises a small proportion (usually approximately 1-4% by weight) of residual tall oil fatty acids from incomplete fractionation in the course of fractional distillation of crude tall oil in a multi-column configuration. These residual tall oil fatty acids as present in tall oil rosin, as well as the abovementioned minor amounts of neutrals and nonsaponifiables, are considered as integral part of tall oil rosin in the present invention. In general, rosin is industrially used as a complex mixture of chemical components in its entirety. More comprehensive information on the chemical composition, including major and minor chemical components, of different rosin types and sources can be found in *Naval Stores*, (Eds.: D. F. Zinkel, J. R. Russell), Production, Chemistry, Utilization, Pulp Chemicals Association, New York, 1989, which is incorporated herein by reference in its entirety Any type of rosin can be used to prepare the rosin esters described herein, including tall oil rosin, gum rosin and wood rosin and mixtures thereof. In certain embodiments, the rosin ester is derived from tall oil rosin. Examples of commercially available rosins include tall oil rosins such as SYLVAROS® 85, SYLVAROS® 90, SYLVAROS® HYR and SYLVAROS® NCY, Which are or have been commercially available from Arizona Chemical Company, LLC. Gum rosins can originate from a variety of *Pinus* species such as *Pinus elliottii, Pinus merkusii, Pinus tropicana*, and *Pinus massoniana*.

Rosins can be used as a feedstock for the formation of rosin esters as obtained from a commercial or natural source. Alternatively, rosin can be subjected to one or more purification steps (e.g., distillation under reduced pressure, treatment with adsorbents, extraction, and/or crystallization) prior its use as a feedstock for the formation of rosin esters. If desired, one or more purified rosin acids (e.g., abietic acid, neoabietic acid, pimaric acid, levopimaric acid, sandaracopimaric acid, isopimaric acid, palustric acid, dehydroabietic acid, dihydroabietic acid, or combinations thereof) can be used as a feedstock for the formation of a rosin ester in place of rosin.

Rosin esters can be obtained from rosin and suitable alcohols using a variety of methods known in the art. See, for example, U.S. Pat. No. 5,504,152 to Douglas et al., and U.S. Pat. No. 2,369,125 to Anderson, U.S. Pat. No. 2,459,581 to Oswald, and US 2013/0197152 A1 to Herve, which are hereby incorporated by reference in their entirety. Suitable methods for preparing the rosin esters can be selected in view of the desired chemical and physical properties of the resultant rosin esters.

In some embodiments, the rosin is reacted with an alcohol and with an amount of more than zero up to 10 weight %, by weight of all reactants, of a carboxylic acid functional organic compound selected from the group consisting of aromatic monofunctional carboxylic acids, aromatic polyfunctional carboxylic acids, aliphatic monofunctional carboxylic acids, partially unsaturated linear or branched nonconjugated monofunctional carboxylic acids, saturated linear or branched monofunctional carboxylic acids, aliphatic difunctional carboxylic acids, saturated linear or branched difunctional carboxylic acids, partially unsaturated linear or branched non-conjugated difunctional carboxylic acids, aliphatic polyfunctional carboxylic, acids, cycloaliphatic monofunctional carboxylic acids, cycloaliphatic difunctional carboxylic acids, cycloaliphatic polyfunctional carboxylic acids, saturated cyclic monofunctional carboxylic acids, partly unsaturated cyclic non-conjugated monofunctional carboxylic acids, saturated cyclic difunctional carboxylic acids, partly unsaturated cyclic non-conjugated difunctional carboxylic acids, saturated cyclic polyfunctional carboxylic acids, partly unsaturated non-conjugated cyclic polyfunctional carboxylic acids, natural fatty acids, synthetic fatty acids, fatty acid derivatives including fatty acid dimer, fatty acid trimer, hydrogenated fatty acid dimer, hydrogenated fatty acid trimer, and isostearic acid, and fatty acids derived from triglyceride vegetable oils, and combinations thereof. See for example, U.S. patent 2011/0034669 to Dallavia which is incorporated herein by reference in its entirety. The carboxylic acid reactant molecular structure may contain one or more additional groups such as hydroxyl, alkyl, benzyl, methoxy, trifluoromethyl, and keto groups, and may contain a combination of linear, branched and cyclic aliphatic, partially unsaturated, or aromatic chemical moieties. An example of such an acid is tartronic acid. One or more oxygen or nitrogen atoms may be incorporated in the carboxylic acid molecular structure, such as for example an ether group in the case of an incorporated oxygen atom. Aromatic monofunctional or polyfunctional carboxylic acid molecular structures may contain one or more fluoro or chloro aromatic ring substituents or one or more methyl, ethyl, methoxy or trifluoromethyl groups. Examples of saturated aliphatic monofunctional carboxylic acids are formic acid, acetic acid, propionic acid, butyric acid, valeric acid, caproic acid, enanthic acid, caprylic acid, pelargonic acid, capric acid, lauric acid, myristic acid, palmitic acid, stearic acid, isostearic acid, arachidic acid, behenic, and cerotic acid. In some embodiments, aliphatic monofunctional carboxylic acids in the present invention contain one to eleven carbon atoms. Examples of saturated aliphatic difunctional carboxylic acids are oxalic acid, malonic acid, succinic acid, glutaric acid, adipic acid, pimelic acid, suberic acid, azelaic acid, sebacic acid, undecanedioic acid, and dodecanedioic acid. Examples of cycloaliphatic difunctional carboxylic acids are pinic acid, rosin dimer (also in general referred to as polymerized rosin, CAS 65997-05-9), mercusic (dihydroagathic) acid CAS No. 41787-69-3), 1,2-cyclopentanedicarboxylic acid, 1,3-cyclopentanedicarboxylic acid 1,2-cyclohexanedicarboxylic acid, 1,3-cyclohexanedicarboxylic acid, and 1,4-cyclohexanedicarboxylic acid. Cyclic dicarboxylic acids such as 1,2-cyclohexanedicarboxylic acid, 1,3-cyclohexanedicarboxylic acid and 1,4-cyclohexanedicarboxylic acid can occur in the form of different stereoisomers. The present invention includes all these stereoisomers and mixtures thereof, including optically active stereoisomers such as enantiomers and diastereomers. Examples of such stereoisomers are cis isomers and trans isomers. For example, 1,4-cyclohexanedicarboxylic acid high purity grade as marketed by Eastman is a mixture of cis and trans isomers. An example of an aromatic monofunctional carboxylic acid is benzoic acid. Examples of saturated cycloaliphatic monofunctional carboxylic acids are cyclopropanecarboxylic acid, cyclopentanecarboxylic acid and cyclohexanecarboxylic acid. Examples of unsaturated aliphatic linear or branched non conjugated monofunctional carboxylic acids are linoleic acid, alpha-linolenic acid, elaidic acid, sapienic acid, arachidonic acid, myristoleic acid, palmitoleic acid, and oleic acid. Examples of fatty acids derived from triglyceride vegetable oils, such as palm oil, linseed oil, rapeseed oil, sunflower seed oil, olive oil, lung oil, peanut oil, cottonseed oil, palm kernel oil, and coconut oil, are linoleic acid, alpha-linolenic acid, palmitic acid, stearic acid, myristic acid, and oleic acid. Examples of natural fatty acids are tall oil fatty acid. The term polyfunctional carboxylic acid in the present invention means tricarboxylic acid or tetracarboxylic acid. Aliphatic compounds are any chemical compound belonging to the organic class in which the atoms are not linked together to form an aromatic or heteroaromatic ring. Aliphatic compounds include the alkanes, alkenes, and alkynes, and substances derived from them. Cycloaliphatic compounds are aliphatic compounds in which the atoms are linked together to form one or more ring structures and include for example cycloalkanes, bicycloalkanes, tricycloalkanes and cycloalkenes bicycloalkenes, and tricycloalkenes.

In some embodiments, the rosin is reacted with an alcohol and with an amount of more than zero up to 10 weight %, by weight of all reactants, of a carboxylic acid functional organic compound selected from the group consisting of aromatic monofunctional carboxylic acids, aromatic polyfunctional carboxylic acids, aliphatic monofunctional carboxylic acids, unsaturated linear or branched monofunctional non-alpha-beta unsaturated carboxylic acids i.e. with the exception of alpha-beta unsaturated monocarboxylic acids which can react as enophiles or dienophiles, aliphatic difunctional carboxylic acids, unsaturated linear or branched non-alpha-beta unsaturated difunctional carboxylic acids i.e. with the exception of alpha-beta unsaturated difunctional carboxylic acids which can react as dienophiles or enophiles, aliphatic polyfunctional carboxylic acids, cycloaliphatic monofunctional carboxylic acids, cycloaliphatic difunctional carboxylic acids, cycloaliphatic polyfunctional carboxylic acids, natural fatty acids, synthetic fatty acids, fatty acids derived from triglyceride vegetable oils, and combinations thereof. For example, the rosin is reacted with an alcohol and with an amount of more than two weight % up to 10 weight %, by weight of all reactants, of a carboxylic acid functional organic compound, e.g. 2.5 weight % or more, 3.0 weight % or more, 3.5 weight % or more, 4.0 weight % or more, 4.5 weight % or more, 5.0 weight % or more, 5.5 weight or more, 6.0 weight % or more, 6.5 weight % or more, 7.0 weight % or more, 7.5 weight % or more, 8.0 weight % or more, 8.5 weight % or more, 9.0 weight % or more, or 9.5 weight % or more.

In some embodiments, the rosin is reacted with an alcohol and with an amount of in between 2 to 25 weight %, by weight of all reactants, of one or more dicarboxylic acid functional organic compounds, e.g. 2.5 weight % or more, 4.0 weight % or more, 6.0 weight % or more, 8.0 weight % or more, 10.0 weight % or more, 12.0 weight % or more, 14.0 weight % or more, 16.0 weight % or more, 18.0 weight % or more, 20.0 weight % or more, 22.0 weight % or more, or 24.0 weight % or more. For example, the rosin is reacted with an alcohol and with an amount of more than two weight % up to 10 weight %, by weight of all reactants, of one or more dicarboxylic acid functional organic compounds.

Examples of alpha-beta unsaturated monofunctional carboxylic acids are acrylic acid, methacrylic acid, crotonic acid and 3,3-dimethylacrylic acid.

Dienophiles or enophiles such as fumaric acid, citraconic acid, mesaconic acid and maleic acid and unsaturated difunctional carboxylic acids such as itaconic acid which can thermally isomerize into a dienophile or enophile at a reaction temperature of about 295° C. or less, e.g. at about a temperature of about 200° C., are not part of the current invention.

While not bound by any particular theory, it is believed that an increase in molecular rigidity, or a decrease in the degree of molecular flexibility, in a resin chemical structure can lead to an increased glass transition temperature ($T_g$) and softening point and thereby can affect viscosity-temperature relationships and can contribute to an increase in heat stress performance when applied in hot melt adhesive formulations. Increased molecular branching and the incorporation of one or more cyclic moieties in a chemical structure in general will lead to a decrease in molecular flexibility and thereby can lead to increased $T_g$ and softening point values. It can be anticipated that the incorporation of a dicarboxylic acid moiety or a polycarboxylic acid moiety in a rosin ester structure will have a larger positive impact on the resulting rosin ester molecular weight than the incorporation of a monocarboxylic acid moiety.

In some embodiments, the one or more carboxylic acid functional organic compounds do not represent a dienophile or enophile.

In some embodiments, the rosin ester is not derived from a dienophile or enophile fortified rosin.

In some embodiments, the rosin ester is not derived from a fortified rosin which is derived from an unsaturated carboxylic acid functional organic compound which can thermally isomerize into a dienophile or enophile.

In some embodiments, the rosin ester is derived from a rosin, a polyhydric alcohol and more than zero up to 10 weight %, by weight of all reactants, of one or more carboxylic acid functional organic compounds wherein the one or more carboxylic acid functional organic compounds does neither include a dienophile, nor an enophile, nor an unsaturated carboxylic acid functional organic compound which can thermally isomerize into a dienophile or enophile.

In some embodiments, the rosin ester is derived from a rosin, a polyhydric alcohol and more than zero up to 10 weight %, by weight of all reactants, of one or more carboxylic acid functional organic compounds wherein the sum of applied carboxylic acid monofunctional organic compounds is less than 1 weight %, by weight of all reactants.

In some embodiments, the rosin ester is derived from a rosin, a polyhydric alcohol and more than zero up to 10 weight %, by weight of all reactants, of one or more carboxylic acid functional organic compounds wherein the carboxylic acid functional organic compound represents one or more dicarboxylic acids or polycarboxylic acids.

In some embodiments, the rosin ester is derived from a rosin, a polyhydric alcohol and more than zero up to 10 weight %, by weight of all reactants, of one or more carboxylic acid functional organic compounds wherein the carboxylic acid functional organic compound represents one or more dicarboxylic acids.

In some embodiments, the rosin ester is derived from a rosin, a polyhydric alcohol and more than zero up to 10 weight %, by weight of all reactants, of one or more carboxylic acid functional organic compounds wherein the one or more carboxylic acid functional organic compounds have an average number of rotatable bonds of twelve or less than twelve, e.g. in between 1 to 11, or in between 1 to 10, or in between 1 to 9, or in between 1 to 8, or in between 1 to 7, or in between 1 to 6, or in between 1 to 5, or in between 1 to 4, or in between 1 to 3, or in between 2 and 6, or in between 2 to 5, or in between 2 to 4 or in between 2 to 3.

For example, in some embodiments, the rosin ester is derived from a rosin, a polyhydric alcohol and more than zero up to 10 weight %, by weight of all reactants, of one or more carboxylic acid functional organic compounds wherein the one or more carboxylic acid functional organic compounds have an average number of rotatable bonds of six or less than six.

In case of one carboxylic acid functional organic compound the average number of rotatable bonds equals the number of rotatable bonds of the functional organic compound. In case of more than one carboxylic acid functional organic compounds the average number of rotatable bonds can be calculated from the individual carboxylic acid functional organic compound rotatable bond values, and their individual weight fraction contributions.

In some embodiments, the rosin ester is derived from a rosin, a polyhydric alcohol and more than zero up to 10 weight %, by weight of all reactants, of one or more carboxylic acid functional organic compounds wherein the one or more carboxylic acid functional organic compounds have one to twelve rotatable bonds, e.g. 1, or 2, or 3, or 4, or 5, or 6, or 7, or 8, or 9, or 10, or 11, or 12 rotatable bonds. Herein, the number of rotatable bonds can be different per applied carboxylic acid functional organic compound in cases wherein more than one carboxylic acid functional organic compound is applied.

For example, the rosin ester is derived from a rosin, a polyhydric alcohol and more than zero up to 10 weight %, by weight of all reactants, of one or more carboxylic acid functional organic compounds wherein the one or more carboxylic acid functional organic compounds have two to twelve rotatable bonds e.g. 2, or 3, or 4, or 5, or 6, or 7, or 8, or 9, or 10, or 11, or 12 rotatable bonds. Herein, the number of rotatable bonds can be different per applied carboxylic acid functional organic compound in cases wherein more than one carboxylic acid functional organic compound is applied.

In some embodiments, the rosin ester is derived from a rosin, a polyhydric alcohol and more than zero up to 10 weight %, by weight of all reactants, of one or more carboxylic acid functional organic compounds wherein the carboxylic acid functional organic compound represents one or more dicarboxylic acids in which dicarboxylic acid molecular formulas the number of hydrogen atoms is higher than the number of carbon atoms, or wherein one of the dicarboxylic acids represents oxalic acid.

In some embodiments, the rosin ester is derived from a rosin, a polyhydric alcohol and more than zero up to 10 weight %, by weight of all reactants, of one or more carboxylic acid functional organic compounds wherein the carboxylic acid functional organic compound represents one or more dicarboxylic acids in which dicarboxylic acid molecular formulas the number of hydrogen atoms is higher than the number of carbon atoms.

In some embodiments, the rosin ester is derived from a rosin, a polyhydric alcohol and more than zero up to 10 weight %, by weight of all reactants, of one or more carboxylic acid functional organic compounds wherein the carboxylic acid functional organic compound represents one or more dicarboxylic acids in which dicarboxylic acid molecular formulas the number of carbon atoms is in between 2 and 22 or in which dicarboxylic acid molecular formulas the number of carbon atoms is 40. For example, in the dicarboxylic acid molecular formulas the number of carbon atoms is 2, or 3, or 4, or 5, or 6, or 7, or 8, or 9, or 10, or 11, or 12, or 13, or 14, or 15, or 16, or 17, or 18, or 19, or 20, or 21 or 22, or 40.

In some embodiments, the rosin ester is derived from a rosin, a polyhydric alcohol and more than 2%, or in between 2 to 25 weight %, by weight of all reactants, of one or more dicarboxylic acid functional organic compounds wherein the one or more dicarboxylic acid functional organic compounds have an average number of rotatable bonds of twelve or less than twelve.

In some embodiments, the rosin ester is derived from a rosin, a polyhydric alcohol and more than 2%, or in between 2 to 25 weight %, by weight of all reactants, of one or more dicarboxylic acid functional organic compounds wherein the one or more dicarboxylic acid functional organic compounds have an average number of rotatable bonds of six or less than six.

In some embodiments, the rosin ester is derived from a rosin, a polyhydric alcohol and more than 2%, or in between 2 to 25 weight %, by weight of all reactants, of one or more dicarboxylic acid functional organic compounds wherein the one or more dicarboxylic acid functional organic compounds have two to twelve rotatable bonds.

In some embodiments, the rosin ester is derived from a rosin, a polyhydric alcohol and more than 2%, or in between 2 to 25 weight %, by weight of all reactants, of one or more dicarboxylic acid functional organic compounds wherein the one or more dicarboxylic acid functional organic compounds have two to nine rotatable bonds.

In some embodiments, the rosin ester is derived from a rosin, a polyhydric alcohol and more than 2%, or in between 2 to 25 weight %, by weight of all reactants, of one or more dicarboxylic acid functional organic compounds wherein the one or more dicarboxylic acid functional organic compounds have two to six rotatable bonds.

In some embodiments, the rosin ester is derived from a rosin, a polyhydric alcohol and more than 2%, or in between 2 to 25 weight %, by weight of all reactants, of one or more dicarboxylic acid functional organic compounds in which dicarboxylic acid molecular formulas the number of hydrogen atoms is higher than the number of carbon atoms.

Many carboxylic acid derivatives are produced from petroleum-based feedstocks. There is an ongoing trend that an increasing number of such carboxylic acid derivatives can also be produced at relatively low cost in a renewable feedstock context. An example is succinic acid which traditionally has been produced from petroleum-based feedstocks. Nowadays, commercial quantities of succinic acid are being produced by fermentation processes from renewable materials. For example, BioAmber has developed an integrated technology that produces large, commercial quantities of succinic acid by fermentation rather than from petroleum feedstocks. Since early 2010, BioAmber has been producing succinic acid by bacterial fermentation of glucose. Such materials are sometimes referred to as green materials, bio-based materials or bio-materials, e.g. bio-succinic acid and bio-adipic acid. Such bio-based carboxylic acid derivatives are part of the current invention. Carboxylic acids such as monocarboxylic acids, dicarboxylic acids and polycarboxylic acids can form anhydrides. Some dicarboxylic acids and polycarboxylic acids can form cyclic anhydrides, such as succinic anhydride, also called dihydro-2,5-furandione, from succinic acid. Such anhydrides and cyclic anhydrides as reactants are part of the present invention.

Bio-based alcohols and bio-based polyols are also part of the current invention, e.g. bio-pentaerythritol and glycerol.

Methods for esterifying rosin can include contacting the rosin, and other optional reactants which contain at least one carboxylic acid moiety (carboxyl moiety), with an alcohol, and allowing the rosin and other optional reactants which contain at least one carboxylic acid moiety and the alcohol to react for a period of time and under suitable conditions to form a rosin ester. For example, rosin can be esterified by a thermal reaction of the rosin, and other reactants which contain at least one carboxylic acid moiety, with an alcohol. Esterification can comprise contacting the rosin and other optional reactants which contain at least one carboxylic acid moiety with the alcohol at an elevated temperature (e.g., at a temperature greater than 220° C.). The removal of the water vapor formed during an esterification as the reaction proceeds can shift the reaction equilibrium to favor product formation and thereby drive the reaction towards completion. In some of such embodiments, methods can involve contacting molten rosin with an alcohol for a period of time suitable to form a rosin ester. The reaction stoichiometry is an important concept herein. For example, the polyfunctional alcohol pentaerythritol contains four hydroxyl groups whereas a rosin acid contains one carboxyl group. Therefore, four moles of rosin per mol pentaerythritol are required in order to achieve a complete esterification of pentaerythritol. A stoichiometric excess of rosin means that more than four moles of rosin per mol pentaerythritol are applied in the reaction. A stoichiometric excess of carboxylic acid functionality versus pentaerythritol means in this respect that more than four moles of total carboxylic acid moieties (which corresponds with more than four moles of total carboxyl groups) per mol pentaerythritol are applied in the reaction. The use of other reactants on top of the applied rosin and an alcohol, which other reactants contain more than one carboxylic acid moiety can lead to rosin esters with increased molecular weight, or increased average molecular weight, as compared to rosin esters which are solely based on the esterification reaction of a rosin and an alcohol. It is known to a person skilled in the art that industrially produced rosin esters in general have a molecular weight distribution rather than a single molecular weight value. The use of other reactants on top of the applied rosin and an alcohol, which other reactants contain more than one carboxylic acid moiety such as a rosin dimer, mercusic acid, adipic acid, 1,4-cyclohexanedicarboxylic acid or sebacic acid can lead to rosin esters having an increased molecular weight, or increased average molecular weight, as compared to rosin esters which are solely based on the esterification reaction of a rosin and an alcohol. The use of such other reactants which contain more than one carboxylic acid moiety can also lead to rosin esters having an increased softening point value. The degree of molecular flexibility which can be correlated to the number of rotatable bonds in a chemical molecule structure can play an important role herein. The number of rotatable bonds is the number of bonds which allow free rotation around themselves. Rotatable bond is defined as any single bond, not in a ring, bound to a nonterminal heavy atom. The term 'heavy' herein means 'non-hydrogen'. Excluded from the count are amide C—N bonds because of their high rotational energy barrier.

For example, fatty acid dimer and fatty acid trimer are of commercial interest as renewable low cost reactants. However, they contain a relatively large number of rotatable bonds in their molecular structures. As a consequence, the use of fatty acid dimer and fatty acid trimer as a co-reactant is anticipated to lead to an increase in rosin ester molecular weight but can also lead to rosin esters having a decreased softening point value as compared to rosin esters which are solely based on the esterification reaction of rosin and an alcohol. For example, polymerized rosin (rosin dimer) has a polycyclic structure and has a relatively low number of rotatable bonds in its molecular structures. Rosin dimers typically contain 40 carbon atoms in their molecular structures and contain several fused rings which contribute to its relatively high degree of molecular rigidity. More comprehensive information on the molecular structures and molecular formula of rosin dimers can be found in: R. Fujii, K. Arimoto, D. F. Zinkel, *J. Am. Oil Chem. Soc.* 1987, 67, 1144-1149 which is incorporated herein by reference in its entirety. The use of such more rigid difunctional or polyfunctional carboxylic acids like rosin dimers or 1,4-cyclohexanecarboxylic acid is anticipated in general to lead to rosin esters having an increased molecular weight value as well as an increased softening point as compared to rosin esters which are solely based on the esterification reaction of a rosin and an alcohol. Such more rigid difunctional or polyfunctional carboxylic acids like polymerized rosin or 1,4-cyclohexanecarboxylic acid are part of the present invention. This combination of an increased molecular weight value and increased softening point within an optimal range is anticipate to contributes to an improved heat stress performance in low temperature hot melt adhesive applications. The use of such other reactants which contain more than one carboxylic acid moiety can also lead to rosin esters having an increased glass transition temperature ($T_g$) value. The in situ formation of some rosin dimer during an esterification wherein rosin and an alcohol is applied can lead to rosin esters with increased molecular weight as compared to rosin esters which are solely based on the esterification reaction of a rosin and an alcohol without such an in situ rosin dimerization or in situ rosin polymerization. The in situ formation of some rosin dimer during an esterification wherein rosin and an alcohol is applied can lead to rosin esters with increased softening point value as compared to rosin esters which are solely based on the esterification reaction of a rosin and an alcohol without such an in situ rosin dimerization or in situ rosin polymerization. The in situ formation of some rosin dimer during an esterification wherein rosin and an alcohol is applied can lead to rosin esters with increased $T_g$ value as compared to rosin esters which are solely based on the esterification reaction of a rosin and an alcohol without such an in situ rosin dimerization or in situ rosin polymerization. In situ rosin dimerization during art esterification wherein rosin and an alcohol is applied can take place at elevated temperatures in the absence or presence of an esterification catalyst. Some in situ rosin dimerization or situ rosin polymerization will preferably take place if no or a relatively small amount of a disproportionation catalyst is applied. In situ rosin dimerization or in situ rosin polymerization can also be effected prior to the rosin esterification reaction by adding the alcohol at a later stage during the reaction. Esters can be obtained by a reaction of an acid with an alcohol. Esters can also be obtained by a transesterification reaction, i.e. the reaction of an alcohol with an ester such as, for example, the transesterification of a lower alkyl ester such as a methyl ester derived from a carboxylic acid with a higher boiling polyol, like for example pentaerythritol, technical grade pentaerythritol, or glycerol. The lower boiling, volatile alcohol such as methanol which is liberated during the transesterification reaction can be removed during the reaction, and thereby can shift the reaction equilibrium to favor product formation, thereby driving the transesterification reaction to completion.

Reactants based on rosin acids and other monocarboxylic acids having a modified carboxyl group or dicarboxylic acids or polycarboxylic acids having one or more modified carboxyl groups can be used in place of the rosin acids and other monocarboxylic acids, dicarboxylic acids or polycarboxylic acids, respectively. For example, partial esters and half esters, as described can be used in place of dicarboxylic acids or polycarboxylic acids. For example, dimethyl adipate or monomethyl adipate or diethyl adipate can be applied instead of adipic acid in the current invention and are part of the present invention. Other examples include thioesters and carbonyl chlorides, also called acyl chlorides or acid chlorides, which can be substituted for rosin acids, dicarboxylic acids or polycarboxylic acids. In general these structurally related reactants contain an acyl group that can react with a nucleophile (e.g., the hydroxyl group of a polyhydric alcohol) via a nucleophilic acyl substitution mechanism. Analogously, an acid chloride, can be applied as a reactant instead of the corresponding carboxylic acid or can be applied instead of an ester derived from the corresponding carboxylic acid. For example, methyl adipoyl chloride, also called adipic acid monomethyl ester chloride, can be applied as a reactant instead of adipic acid or adipic acid dimethyl ester, adipic acid diethyl ester, adipic acid monomethyl ester, adipic acid monoethyl ester or adipoyl chloride.

The amount of alcohol employed in the esterification process relative to the amount of rosin and other reactants which contain at least one carboxylic acid moiety can be varied, depending on the nature of the alcohol and the desired chemical and physical properties of the resultant rosin ester. In some embodiments, the rosin and other reactants which contain at least one carboxylic acid moiety are provided in excess so as to produce a rosin ester having a low hydroxyl number. For example, the alcohol can be provided in an amount such that less than a molar equivalent of hydroxy groups is present in the reaction relative to the amount of rosin and other reactants which contain at least one carboxylic acid moiety present. U.S. Pat. No. 4,758,379 to Johnson, which is incorporated herein by reference in its entirety, describes a method of preparing a polyol ester of rosin, which comprises esterifying the rosin with a polyol in the presence of an stoichiometric equivalent excess of rosin. In U.S. Pat. No. 4,758,379, which is incorporated herein by reference in its entirety, a rosin and a polyol are reacted in an esterification reaction without the addition of an additional carboxylic acid reactant. In U.S. Pat. No. 5,830,992, which is incorporated herein by reference in its entirety, a process for preparing a rosin ester which comprises heating an equivalent excess proportion of rosin with a polyhydric alcohol in the presence of a metal salt of a hindered phenylphosphonate or diphenylphosphonate so as to form a rosin ester is described. In U.S. Pat. No. 5,830,992, a rosin and a polyol are reacted in an esterification reaction without the addition of a further carboxylic acid reactant.

Any suitable alcohol, including monoalcohols, diols, and other polyols, can be used to form the rosin esters. One alcohol or a mixture comprising more alcohols can be applied in the esterification reaction. In some cases, the one or more alcohols have 1 carbon atom up to 30 carbon atoms (e.g., from 2 to 16 carbon atoms or from 3 to 12 carbon atoms). Examples of suitable alcohols include glycerol, pentaerythritol, including technical grades of pentaerythritol, dipentaerythritol, ethylene glycol, diethylene glycol, 2,2,4,4-tetramethyl-1,3-cyclobutanediol, triethylene glycol, sorbitol, xylitol, mannitol, neopentylglycol, trimethylolpropane, methanol, ethanol, propanol, butanol, amyl alcohol, 2-ethyl hexanol, diglycerol, tripentaerythritol, $C_8$-$C_{11}$ branched or unbranched alkyl alcohols, and $C_7$-$C_{16}$ branched or unbranched arylalkylalcohols. In certain embodiments, the alcohol is a polyhydric alcohol. One polyhydric alcohol or a mixture comprising more polyhydric alcohols can be applied in the esterification reaction. The one or more polyhydric alcohols can have an average hydroxyl functionality of from two to ten (e.g., from two to six, or from two to five). The one or more polyhydric alcohols can have 2 to 30 carbon atoms (e.g., from 2 to 16 carbon atoms). For example, the polyhydric alcohol can be selected from the group consisting of ethylene glycol, propylene glycol, diethylene glycol, triethylene glycol, tetraethylene glycol, trimethylene glycol, 2,2,4,4-tetramethyl-1, 3-cyclobutanediol, 4,4'-isopropylidenedicyclohexanol (CAS Number 80-04-6), 1,4-cyclohexanedimethanol, 4,8-bis(hydroxymethyl)tricyclo[5.2.1.0$^{2,6}$]decane (CAS Number 26896-48-0), glycerol, diglycerol, polyglycerols and mixtures of polyglycerols such as polyglycerol-2, polyglycerol-3 and polyglycerol-4, trimethylolpropane, trimethylolethane, pentaerythritol, including technical grades of pentaerythritol, dipentaerythritol, tripentaerythritol, mannitol, sorbitol, xylitol, and combinations thereof. In some embodiments, more than one alcohol is used to form the rosin esters. In certain embodiments, pentaerythritol and one or more additional alcohols selected from the group consisting of glycerol, diglycerol, polyglycerol, dipentaerythritol, ethylene glycol, diethylene glycol, triethylene glycol, trimethylolpropane, and combinations thereof are used to form the rosin esters. The reaction of alcohols having a higher hydroxyl group functionality with rosin can lead to rosin esters with increased molecular weight as compared to rosin esters which are solely based on the esterification reaction of a rosin and an alcohol with a lower hydroxyl group functionality. For example, the molecular weight of rosin esters is expected to increase by using dipentaerythritol as compared to pentaerythritol. Technical pentaerythritol is commercially available, for example from Perstorp, which in majority consists of pentaerythritol but also contains some dipentaerythritol and can contain small amounts of tripentaerythritol. The term 'pentaerythritol' in the present invention includes technical pentaerythritol grades as well as higher purity or pure pentaerythritol grades.

The term "hydroxyl number" or hydroxyl value is well recognized in the art, and is defined as the number of milligrams of potassium hydroxide required to neutralize acetic acid taken up on acetylation of one gram of a chemical substance that contains free hydroxyl groups. Hydroxyl value is a measure of the content of free hydroxyl groups in a chemical substance, typically a polyol, usually expressed in units of the mass of potassium hydroxide (KOH) in milligrams equivalent to the hydroxyl content of one gram of the polyol/chemical substance (e.g., mg KOH/g). The analytical method used to determine hydroxyl value traditionally involves acetylation of the free hydroxyl groups of the substance with acetic anhydride in pyridine solvent. After completion of the reaction, water is added, and the remaining unreacted acetic anhydride is converted to acetic acid and measured by titration with potassium hydroxide.

As is known in the art, catalysts, bleaching agents, stabilizers, and/or antioxidants can be added to the esterification reaction. Suitable catalysts, bleaching agents, stabilizers, and antioxidants are known in the art, and described, for example, in U.S. Pat. Nos. 2,729,660, 3,310,575, 3,423,389, 3,780,013, 4,172,070, 4,548,746, 4,690,783, 4,693,847, 4,725,384, 4,744,925, 4,788,009, 5,021,548, and 5,049,652, the entire subject matter of which is incorporated herein. In order to drive the esterification reaction to completion, water can be removed from the reactor using standard methods, such as distillation and/or application of a vacuum.

Following the esterification reaction, unreacted rosin as well as other volatile components can be removed from the resultant rosin ester product, for example, by steam sparging, sparging by an inert gas such as nitrogen gas, wiped film evaporation, short path evaporation, and vacuum distillation. This results in stripping any excess rosin acid from the rosin ester products, reducing the acid number of the rosin ester. Following esterification, the resultant rosin ester can comprise low amounts of residual, unreacted rosin acid and/or alcohol. A rosin ester which is characterized by a low hydroxyl number and having a low acid number after one of the above mentioned volatiles removal methods can be characterized by a relatively low weight fraction of lower molecular weight species. This property can render it in particular suitable for applications where low migration and/or low volatile organic compounds (VOC) content is beneficial. Examples are food contact applications and low-fogging systems. In addition, the relatively smaller amount of lower molecular weight species in such a rosin ester which has a low hydroxyl number and has a low acid number can contribute to a higher average molecular weight and thereby can contribute to improved heat stress resistance performance in an low temperature application adhesive hot-melt formulation since lower molecular weight species are expected to have a lower viscosity and as a consequence would be anticipated to more easily or rapidly deform upon an applied stress than higher molecular weight components.

To obtain a rosin ester having the desired chemical and physical properties for incorporation into the compositions described herein, preparation of the rosin esters can optionally further include one or more additional processing steps. As described above, the rosin acids (e.g., abietadienoic acids) can include conjugated double bonds within their ring systems. These conjugated double bonds can be a source of oxidative instability. Accordingly, in some embodiments, the rosin to be esterified and/or the rosin ester formed by esterification can be processed to decrease the PAN number of the rosin or rosin ester. The PAN number of rosin or a rosin ester refers to the weight percentage of abietadienoic acids (in particular palustric, abietic and neoabietic acid) present in the rosin or rosin ester, based on the total weight of the rosin or rosin ester. The term "PAN number", as used herein, refers to the sum of the weight percentages of palustric, abietic and neoabietic acid moieties in the rosin or rosin esters, as determined according to method described in ASTM D5974-00 (2010). Methods of reducing the PAN number of rosin or a rosin ester are known in the art, and include hydrogenation, dehydrogenation, disproportionation, dimerization, and fortification, in particular Diels-Alder reaction fortification. In certain embodiments, rosin is processed using one or more of these methods prior to esterification to improve the chemical and physical properties of the resultant rosin esters. Where chemically permissible, such methods can also be performed in combination with esterification and/or following esterification to obtain a rosin ester having the desired chemical and physical properties, as discussed in more detail below.

It is known in the art that rosins or rosin esters can be fortified to improve the chemical and physical properties of the resultant rosin esters. In some embodiments, rosin is fortified prior to esterification to improve the chemical and physical properties of the resultant rosin esters. Fortification of rosin involves the chemical modification of the conjugated double bond system of the abietadienoic acids in the rosin, so as to provide rosin having amongst others a lower PAN number than the starting rosin. A number of suitable chemical modifications and related chemical methods are known in the art to decrease the abietadienoic acid content of rosin and rosin esters, thereby decreasing their PAN number. For example, rosins can be fortified by means of a Diels-Alder or Ene addition reaction of a rosin acid with a dienophile or enophile, such as an $\alpha,\beta$-unsaturated organic acid or the anhydride or ester of such an acid. Examples of suitable dienophiles include maleic acid, fumaric acid, acrylic acid, itaconic acid and esters derived from these acids, and maleic anhydride. Fumaric acid or maleic acid or anhydride Diels-Alder chemistry fortified rosin esters will require an additional Diels-Alder or Ene reaction fortification step on top of rosin esterification which in general will increase the production cycle time. Such Diels-Alder chemistry fortified or Ene chemistry modified rosins with alpha, beta unsatured carboxylic acids such as acrylic acid, or with alpha,beta unsatured dicarboxylic acids such as maleic acid or its anhydride, itaconic acid, citraconic acid, mesaconic acid or fumaric acid are not part of this invention.

Rosin can contain dicarboxylic acids such as mercusic (dihydroagathic) acid (CAS No. 41787-69-3) or rosin dimer (CAS 65997-05-9). Rosin dimer is also known as polymerized rosin. For example, *Pinus merkusii* is a pine native to Indonesia and the Philippines. Rosin derived from *Pinus merkusii* can contain considerable amounts of mercusic acid. *Pinus latteri* is a pine native to Cambodia and Vietnam. Rosin derived from *Pinus latteri* in general contains mercusic acid. It is known that rosin dimers can be formed in rosin upon heating. Dymerex™ is an example of polymerized rosin available from Eastman. Poly-Pale™ Partially Dimerized Rosin is another example of polymerized rosin available from Eastman. ILREZ™ is an example of polymerized rosin available from Ildes Kimya Ltd. Rosins in the present invention include rosins wherein the sum of mercusic acid and rosin dimer (polymerized rosin) content ranges from zero to 15% by weight. Rosins in the present invention also include rosins which consist of a blend of rosin and one or two dicarboxylic acids selected from mercusic acid and rosin dimer (polymerized rosin) wherein the sum of mercusic acid and rosin dimer (polymerized rosin) content ranges from zero to 15% by weight, e.g. higher than 1%, higher than 3%, higher than 5%, higher than 7%, higher than 9%, higher than 11%, or higher than 13%, or e.g. lower than 14%, lower than 12%, lower than 10%, lower than 8%, lower than 6%, lower than 4%, or lower than 2%. For example, rosins in the present invention include rosins which consist of a blend of tall oil rosin and Dymerex™ wherein the Dymerex™ content ranges from zero to 15% by weight.

Methods of disproportionation are known in the art, and can involve heating rosin, often in the presence of one or more disproportionation agents. Suitable methods for disproportionating rosin are described in, for example, U.S. Pat. Nos. 3,423,389, 4,302,371, and 4,657,703, all of which are incorporated herein by reference.

Disproportionation of rosin has been reported to mainly convert abietadienoic acids such as palustris acid, abietic acid and neoabietic acid (PAN acids) and levopimaric acid into dehydroabietic acid and dihydroabietic acids. In addition, some rosin ring opening reactions in conjunction with aromatization are known to occur which can lead to rosin acid derivatives such as 9,10-seco dehydroabietic acid. In that respect, rosin disproportionation can serve as an effective method to lead to a relatively low PAN number of rosin, the resulting rosin esters, and thereby can contribute to an increased oxidative stability and color stability of rosin esters. Both dehydroabietic acid and 9,10-seco dehydroabietic acid contain an aromatic ring, whereas the formed dihydroabietic acids are non-aromatic. It has been reported that dehydrogenation is the main reaction in the intermolecular hydrogen transfer reaction (disproportionation) of pine oleoresin over a Pd/C catalyst, i.e. the rate of abietic acid dehydrogenation is higher than that of abietic acid hydrogenation during the hydrogen exchange of abietic acid. For more details on the disproportionation of rosin, reference is made to J. C. Souto, et al., Disproportionation of rosin on an industrial Pd/C catalyst: Reaction pathway and kinetic model discrimination, *Bioresource Technology* 2011, 102, 3504-3511, and references cited therein. Reference is also made to L. Wang, et al., Kinetic model for the catalytic disproportionation of pine oleoresin over Pd/C catalyst, *Industrial Crops and Products* 2013, 49, 1-9, and references cited therein. Both scientific articles are incorporated herein in their entirety.

Based on these reported data it can be concluded that catalytic disproportionation of rosin is anticipated to lead, amongst others, to relatively more aromatic product formation such as dehydroabietic acid formation and 9,10-seco dehydroabietic acid formation and thereby to a higher level of aromatic rosin ester content as compared to thermal procedures wherein not such a disproportionation catalyst, or a relatively low amount of disproportionation catalyst, e.g. less than 0.2%, or less than 0.15%, or less than 0.10%, or less than 0.05%, or less than 0.02%, or less than 0.01%, by weight of all reactants, is used. In addition, the 9,10-seco dehydroabietic acid formation is anticipated to lead to a relative increase in molecular flexibility and thereby to an decreased softening point of the resulting rosin ester which can go at the expense of heat stress resistance performance.

Ethylene copolymers, as exemplified by ethylene and vinylalkanoate monomer based polymers, e.g. EVA, or ethylene and acrylate or methacrylate monomer based polymers, e.g. EnBA, in general do not contain aromatic rings or aromatic moieties in their chemical structure. A popular aphorism, well known to a person skilled in the art, which relates to the solubility or resulting compatibility performance in mixing different chemical components, is 'like dissolves like'. Essentially this 'like dissolves like' expression is related to the enthalpy of mixing ($\Delta H_m$) contribution in the thermodynamics equation of the free energy of mixing ($\Delta G_m$): $\Delta G_m = \Delta H_m - T \cdot \Delta S_m$. Herein, $\Delta S_m$ represents the entropy of mixing and T represents the absolute temperature. Therefore, it can be rationalized that the degree of aromaticity of a rosin ester preferably should be as low as possible in order to contribute to a low positive enthalpy of mixing ($\Delta H_m$) value, or even more preferably, to a negative value of $\Delta H_m$ in the hot-melt adhesive formulating process, when being mixed with a polymer having a low aromatic content or with a non-aromatic polymer component. A relatively low degree of rosin ester aromaticity is thereby anticipated to contribute to a more optimal, i.e. negative, free energy of mixing ($\Delta G_m$) value and thereby will exert a positive impact on the resulting degree of hot-melt adhesive compatibility.

Palladium on charcoal (Pd/C) catalysts can be used as an effective catalyst system in the disproportionation of rosin. In many cases of current industrial rosin disproportionation reactions and processes wherein disproportionation catalysts are applied in situ during rosin ester production, the disproportionation catalyst contains one or more sulfur atoms, e.g. in Rosinox®, Lowinox® (TBM-6) and nonylphenol disulfide. The average sulfur content in the commercially available disproportionation catalyst Ethanox® 323 amounts to approximately 10%, the average sulfur content in the disproportionation catalyst Lowinox® (TBM-6) amounts to approximately 9%, the average sulfur content in the disproportionation catalyst Vultac® 2 amounts to approximately 23%, and the average sulfur content in the disproportionation catalyst Rosinox® amounts to approximately 30-31%. Elemental iodine or iodine containing disproportionation catalysts have also been reported in the disproportionation of rosin and can deliver effective rosin disproportionation, but can be corrosive and appear to be less commonly used in industrial large scale rosin ester productions nowadays.

As outlined above, a rosin ester synthesis procedure wherein the rosin PAN content is reduced and wherein no disproportionation catalyst, or a relatively low amount of disproportionation catalyst, is required is part of the present invention.

The use of sulfur containing disproportionation catalyst, e.g. Rosinox® is anticipated to lead to increased sulfur content in the obtained rosin ester, as compared to the original sulfur level in the corresponding rosin. The resulting rosin ester sulfur content can also be assessed after volatiles stripping or WFE treatment. Such increased sulfur content can be determined by analytical methods known by a person skilled in the art. The sulfur content can be expressed as parts per million (ppm). Inductively Coupled Plasma (ICP) spectrometry can be used for quantitation of trace levels of Iodine (I), Palladium (Pd), Nickel (Ni) and Platinum (Pt). The sample can be digested in strong acid to get the metals in aqueous solution, or dissolved in an organic solvent (xylene) and aspirated into the ICP plasma. Quantitation is accomplished by comparing the obtained sample signal to a calibration curve generated with commercially available ICP standards for the metals or elements of interest. Yttrium (Y) is added to all samples and standards as an internal standard to compensate for any potential differences in viscosities between the sample and standard. Inductively coupled plasma-mass spectrometry (ICP-MS) analysis constitutes an alternative method to determine trace levels of such metal and halogen constituents.

Disproportionation as induced by a rosin disproportionation catalyst during rosin ester synthesis can lead to a relatively higher rosin ester aromatic content as compared to an analogous method wherein no rosin disproportionation catalyst is applied. Additionally, disproportionation as induced by a rosin disproportionation catalyst will in general also lead to some degree of rosin decarboxylation which will go at the expense of the amount of remaining rosin acids and thereby will negatively affect the chemical yield of rosin ester. Also for this reason, the use of a relatively low amount of disproportionation catalyst or, more preferably, no disproportionation catalyst is preferred in the context of the present invention. U.S. patent 2011/0034669 to Dallavia describes a process of producing light color rosin ester resins by using an stoichiometric excess of carboxylic acid groups as compared to polyol hydroxyl groups. The light rosin ester color is achieved by carrying out the polyol/rosin esterification reaction at a temperature between 220-280° C. in the presence of a disproportionation catalyst. For reasons outlined above, in the present invention preferably a relatively low amount of disproportionation catalyst is added, such as an amount less than 0.05% by weight, based on the total weight of all reactants. More preferably, no disproportionation catalyst is applied. In the present invention preferably a higher polyol/rosin esterification maximum reaction temperature than 280° C. is applied, such as a polyol/rosin esterification maximum reaction temperature in between 290° C. and 300° C., e.g. a polyol/rosin esterification maximum reaction temperature of approximately 295° C. This particular reaction procedure typically renders a somewhat darker rosin ester than in the general case of U.S. patent 2011/0034669 wherein the color of the rosin reactant generally was reported to be higher than the color of the rosin ester obtained from the rosin reactant. The major aim of this invention is not to provide a low color rosin ester but to provide a rosin ester resin that is useful in low application temperature hot-melt adhesives having a level of high heat stress resistance performance in combination with a high level of compatibility. In the present invention, the color of the combined molten reactants that are applied in the rosin ester synthesis can be equal to or lower than the color of the derived rosin ester resin. The neat Gardner color value of the combined molten reactants that are applied in the rosin ester synthesis can be equal to or lower than the neat Gardner color value of the derived rosin ester resin. While not bound by any particular theory, it was observed that another unexpected advantage of applying a stoichiometric excess of carboxylic acid groups as compared to polyol hydroxyl groups, in combination with the applied high polyol/rosin esterification reaction temperature of approximately 295° C., in the absence of a disproportionation catalyst as applied in the present invention, is the relatively low acid value as well as the is the relatively low acid value that resulted after the esterification reactions prior to the volatiles stripping step. Advantageously, the relatively low acid value that resulted after the reaction prior to the volatiles stripping step implies that less volatiles stripping will be required than expected based on chemical calculations. This can save energy costs as well as can lead to a production cycle time reduction.

In another embodiment, the rosin ester is the result of a chemical reaction procedure wherein no disproportionation catalyst is used. In another embodiment, the rosin ester is the result of a chemical reaction procedure wherein a relatively low amount of disproportionation catalyst is used, e.g. less than 0.2%, or less than 0.15%, or less than 0.10%, or less than 0.05%, or less than 0.02%, or less than 0.01%, by weight of all reactants. In another embodiment, the rosin ester is the result of a chemical reaction procedure wherein a relatively low amount of sulfur containing disproportionation catalyst is used, e.g. less than 0.2%, or less than 0.15%, or less than 0.10%, or less than 0.05%, or less than 0.02%, or less than 0.01%, by weight of all reactants.

In another embodiment, the stripped rosin ester after the esterification reaction, prior to adding any sulfur-containing antioxidant or sulfur containing additive, has a first sulfur ppm content value, and the applied rosin reactant has a second sulfur ppm content value, and the first sulfur ppm content value minus the second sulfur ppm content value is, e.g. lower than 500, or lower than 200, or the first sulfur ppm content value equals the second sulfur ppm content value, or the first sulfur ppm content value is lower than the second sulfur ppm content value, or the first sulfur ppm content value divided by the second sulfur ppm content value is equal or lower than 0.92, or first sulfur ppm content value divided by the second sulfur ppm content value is equal or lower than 0.89, or the first sulfur ppm content value divided by the second sulfur ppm content value is equal or lower than 0.86 or lower than 0.82, or lower than 0.77, or lower than 0.75, or lower than 0.73, or lower than 0.70, or lower than 0.65. In another embodiment, the obtained rosin ester has a first sum of palladium, nickel and platinum ppm content value, and the rosin has a second sum of palladium, nickel and platinum ppm content value, wherein the first sum of palladium, nickel and platinum ppm content value is lower than or equal to the second sum of palladium, nickel and platinum ppm content value. In another embodiment, the obtained rosin ester has a first iodine ppm content value, and the rosin has a second iodine ppm content value, wherein the first iodine ppm content value is lower than or equal to the second iodine ppm content.

In some embodiments, no disproportionation catalyst is applied during the esterification reaction step, in combination with a high esterification top temperature, such as a temperature between 290° C. and 300° C., or a temperature of approximately 295° C., in order to improve the chemical and physical properties of the resultant rosin esters, in particular in relation to an improved compatibility-heat stress resistance performance of the rosin ester containing low application temperature hot-melt adhesives.

In some embodiments, a relatively small amount of disproportionation catalyst, e.g. less than 0.2%, or less than 0.15%, or less than 0.10%, or less than 0.05%, or less than 0.02%, or less than 0.01%, by weight of all reactants, is applied during the esterification reaction step in combination with a somewhat lower esterification top temperature, such as a temperature between 260° C. and 290° C., or a temperature between 265° C. and 280° C., or a temperature of approximately 270-275° C.

A variety of suitable disproportionation agents can be used. In one embodiment of the present invention, a relatively low amount of disproportionation catalyst is added, e.g. less than 0.05% on a weight basis, based on all reactants. More preferably, no disproportionation catalyst is applied. Examples of disproportionation agents include thiobisnaphthols, including 2,2'thiobisphenols, 3,3'-thiobisphenols, 4,4'-thiobis(resorcinol) and t,t'-thiobis(pyrogallol), 4,4'-15 thiobis(6-t-butyl-m-cresol) and 4/4'-thiobis(6-t-butyl-o-cresol) thiobisnaphthols, 2,2'-thio-bisphenols, 3,3'-thio-bis phenols; metals, including palladium, nickel, and platinum; iodine or iodines (e.g., iron iodine); sulfides (e.g., iron sulfide); and combinations thereof. In certain embodiments, the rosin is disproportionated using a phenol sulfide type disproportionation agent. Examples of phenol sulfide type disproportionation agents include poly-t-butylphenoldisulfide (commercially available under the trade name ROSINOX® from Arkema, Inc.), 4,4'thiobis(2-t-butyl-5-methylphenol (commercially available under the trade name LOWINOX® TBM-6 from Chemtura), nonylphenol disulfide oligomers (such as those commercially available under the trade name ETHANOX® TM323 from Albemarle Corp.), and amylphenol disulfide polymer (such as those commercially available under the trade name VULTAC® 2 from Sovereign Chemical Co.). Preferably no disproportionation agents will be used, or only to a minor extent, in the context of the present invention for reasons outlined above.

If desired, rosin esters can be chemically modified following esterification to provide a rosin ester having a low hydroxyl number. This process can involve chemical modification of residual hydroxyl moieties in the rosin ester following esterification using synthetic methods known in the art. For example, a rosin ester can be reacted with an acylating agent (e.g., a carboxylic acid or a derivative thereof, such as an acid anhydride, like acetic anhydride which is derived from acetic acid). Such acid anhydrides can also be derived from other alkanoic acids such as propionic acid, butyric acid, valeric acid, caproic acid, enanthic acid, caprylic acid, pelargonic acid, capric acid, lauric acid, myristic acid, palmitic acid, stearic acid, or arachidic acid. See, for example, U.S. Pat. No. 4,380,513 to Ruckel. Residual hydroxyl moieties in a rosin ester can also be reacted with an electrophilic reagent, such as an isocyanate, to produce the corresponding carbamate derivative. Examples of isocyanates are alkyl isocyanates such as methyl isocyanate, ethyl isocyanate, propyl isocyanate, isopropyl isocyanate, butyl isocyanate, isobutyl isocyanate, sec-butyl isocyanate, tert-butyl isocyanate, pentyl isocyanate, isopentyl isocyanate, neopentyl isocyanate, hexyl isocyanate, heptyl isocyanate, octyl isocyanate, ethylhexyl isocyanate, nonyl isocyanate, decyl isocyanate, undecyl isocyanate, dodecyl isocyanate, tridecyl isocyanate, tetradecyl isocyanate, pentadecyl isocyanate, hexadecyl isocyanate, heptadecyl isocyanate, octadecyl isocyanate, and cycloalkyl isocyanates such as cyclohexyl isocyanate, and isocyanates which contain an aromatic ring such as phenyl isocyanate and benzyl isocyanate. See, for example, U.S. Pat. No. 4,377,510 to Ruckel. Other suitable electrophilic reagents which can be used to react with residual hydroxyl moieties include alkylating agents (e.g., methylating agents such as dimethylsulphate).

In some embodiments, the rosin or rosin ester is hydrogenated to obtain rosin esters having the desired chemical and physical properties for a particular application. Hydrogenation is a reduction reaction, which can result in addition of hydrogen to a reactant. Hydrogenation of an alkene moiety or diene moiety, such as an alkene car diene moiety present in the ring structure of a rosin acid moiety, can reduce one or more olefinic bonds to produce the corresponding saturated moiety, e.g. alkane in case of alkene hydrogenation or to increase the level of saturation, e.g. alkane or alkene in case of diene hydrogenation. Accordingly, hydrogenation can be performed, for example, to reduce the PAN number of rosin or rosin ester. Methods of hydrogenating rosins or rosin esters are known in the art. Hydrogenation reactions can be carried out using a catalyst, such as a heterogeneous hydrogenation catalyst (e.g., a palladium catalyst, such as Pd supported on carbon (Pd/C), a platinum catalyst, such as $PtO_2$, a nickel catalyst, such as Raney Nickel (Ra—Ni), a rhodium catalyst, or a ruthenium catalyst). The hydrogen source for the hydrogenation can by hydrogen ($H_2$) or a compound which can generate hydrogen under reaction conditions, such as formic acid, isopropanol or hydrazine.

An example of commercially available hydrogenated rosin is Foral™ AX-E, which is marketed by Eastman Chemical Company. Staybelite™ Resin-E is an example of commercially available partially hydrogenated rosin which is also marketed by Eastman Chemical Company. HYDROGAL is an example of commercially available hydrogenated rosin which is marketed by DRT (Dérivés Résiniques et Terpéniques).

In some embodiments, the rosin or rosin ester is partly dimerized or polymerized to obtain after esterification rosin esters having the desired chemical and physical properties for a particular application, such as an increased molecular weight, increased molecular rigidity, and increased $T_g$ value and softening point in the context of this invention. Rosin polymerization and dimerization reactions are known and described in patent applications such as for example U.S. Pat. No. 2,369,125 to Anderson, U.S. Pat. No. 2,017,866 to Morton, and U.S. Pat. No. 2,108,928 to Rummelsburg, which are incorporated herein by reference in their entirety. Such rosin and rosin ester polymerization and dimerization reactions can be catalyzed by Brønsted acids such as sulfuric acid or by Lewis acids such as $AlCl_3$. An example of commercially available polymerized rosin is Dymerex™ which is marketed by Eastman Chemical Company. POLYGRAL and DERTOPOL are examples of commercially available polymerized rosins which are marketed by DRT (Dérivés Résiniques et Terpéniques). The in situ formation of some rosin dimer during an esterification wherein rosin and an alcohol is applied can lead to rosin esters with increased molecular weight and increased $T_g$ and softening point and as such can be preferred in the context of the present invention. In situ rosin dimerization during an esterification wherein rosin and an alcohol is applied can also take place to some extent at elevates temperatures in the absence of a catalyst. Some degree of rosin dimerization can also be realized prior to the rosin esterification reaction as a separate reaction step by adding the alcohol at a later stage during the reaction.

In some embodiments, the rosin ester is made in the presence of a difunctional or polyfunctional carboxylic acid derivative, or combinations thereof, in order to effectively build up rosin ester molecular weight to the required relatively high level in the absence of a disproportionation catalyst or in the presence of a low amount of disproportionation catalyst in order to suppress the degree of disproportionation, and wherein the esterification reaction is conducted at a relatively high temperature e.g., at 295° C., to allow for some degree of concurrent in situ rosin or rosin ester dimerization which is carried out preferably in the absence of a rosin dimerization catalyst or in the presence of a low amount of dimerization catalyst. The applied relatively high temperature with these reactants under these reaction conditions during the rosin ester synthesis will result in a decrease of the rosin ester PAN value, without the necessity to apply a disproportionation catalyst, and thereby to an increased rosin ester oxidative stability and thermal color stability and also will result in an increase of the molecular weight of the resulting rosin ester which is of importance to achieve the required level of heat stress resistance in the low temperature hot-melt adhesive wherein the rosin ester is one of the chemical components. A relatively high reaction temperature e.g., at 295° C., can also lead to some degree of concurrent in situ polyol dimerization and polymerization reactions which can also increase the molecular weight of the resulting rose ester.

In some embodiments, the rosin ester is made at 270-320° C., e.g. at 290-300° C., or e.g. at approximately 295° C.

Rosin esters may also be obtained by a transesterification reaction such as, for example, the transesterification of a methyl ester derived from rosin with a higher boiling polyol like for example pentaerythritol, technical grade pentaerythritol or glycerol. The low boiling, volatile methanol which is liberated during the reaction can be removed during the reaction thereby driving the transesterification reaction to completion. An example of a commercially available methyl ester of hydrogenated rosin is Foralyn™ 5020-F which is marketed by Eastman Chemical Company.

The rosin ester incorporated in the compositions provided herein can have a low hydroxyl number. In some embodiments, the rosin ester has a hydroxyl number, as measured using a modified version of the standard method provided in DIN 53240-2 (different solvent tetrahydrofuran was applied), of 6.0, 5.5, 5.0 or less (e.g., 4.5 or less, 4.0 or less, 3.5 or less, 3.0 or less, 2.5 or less, 2.0 or less, 1.5 or less, or 1.0 or less). The hydroxyl number is expressed as mg KOH per grain rosin ester sample.

The rosin ester incorporated in the compositions provided herein can have a low acid number. In some embodiments, the rosin ester has an acid number, as determined according to the method described in ASTM D465-05 (2010), of 15.0 or less (e.g., 14.5 or less, 14.0 or less, 13.5 or less, 13.0 or less, 12.5 or less, 12.0 or less, 11.5 or less, 11.0 or less, 10.5 or less, 10.0 or less, 9.5 or less, 9.0 or less, 8.5 of less, 8.0 or less, 7.5 or less, 7.0 or less, 6.5 or less, 6.0 or less, 5.5 or less, 5.0 or less, 4.5 or less, 4.0 or less, 3.5 or less, 3.0 or less, 2.5 or less, 2.0 or less, 1.5 or less, or 1.0 or less). The acid number is expressed as mg KOH per gram rosin ester sample.

The rosin ester incorporated in the compositions provided herein can have a low hydroxyl number and a low acid number. In some embodiments, the sum of the hydroxyl number of the rosin ester, as measured using a modified version of the standard method provided in DIN 53240-2 (different solvent tetrahydrofuran was applied), and the acid number of the rosin ester, as determined according to the method described in ASTM D465-05 (2010), is 15.0 or less (e.g., 14.5 or less, 14.0 or less, 13.5 or less, 13.0 or less, 12.5 or less, 12.0 or less, 11.5 or less, 11.0 or less, 10.5 or less, 10.0 or less, 9.5 or less, 9.0 or less, 8.5 or less, 8.0 or less, 7.5 or less, 7.0 or less, 6.5 or less, 6.0 or less, 5.5 or less, 5.0 or less, 4.5 or less, 4.0 or less, 3.5 or less, 3.0 or less, 2.5 or less, or 2.0 or less).

The rosin ester incorporated in the compositions provided herein can have a low PAN number. In some embodiments, the rosin ester can have PAN number, as determined according to the method described in ASTM D5974-00 (2010), of 25.0 or less (e.g., 23 or less, 22 or less, 21.5 or less, 20.0 or less, 19.5 or less, 19.0 or less, 18.5 or less, 18.0 or less, 17.5 or less, 17.0 or less, 16.5 or less, 16.0 or less, 15.5 or less, 15.0 or less, 14.5 or less, 14.0 or less, 13.5 or less, 13.0 or less, 12.5 or less, 12.0 or less, 11.5 or less, or 11.0 or less, or 10.0 or less, 9.5 or less, 9.0 or less, 8.5 or less, 8.0 or less, 7.5 or less, 7.0 or less, 6.5 or less, 6.0 or less, 5.5 or less, 5.0 or less, 4.5 or less, 4.0 or less, 3.5 or less, 3.0 or less, 2.5 or less, 2.0 or less, 1.5 or less, or 1.0 or less). In some embodiments, the rosin ester can have PAN number, as determined according to the method described in ASTM D5974-00 (2010), of up to 25 or in between 22.0 and 8.0 (e.g., in between 21.0 and 8.0, in between 20.0 and 8.0, in between 19.5 and 8.0, in between 19.0 and 8.0, in between 18.5 and 8.0, in between 18.0 and 8.0, in between 17.5 and 8.0, in between 17.0 and 8.0, in between 16.5 and 8.0, in between 16.0 and 8.0, in between 15.5 and 8.0, in between 15.0 and 8.0, in between 14.5 and 8.0, in between 14.0 and 8.0, in between 13.5 and 8.0, in between 13.0 and 8.0, in between 12.5 and 8.0, in between 12.0 and 8.0, in between 11.5 and 8.0, in between 11.0 and 8.0, in between 10.5 and 8.0, in between 10.0 and 8.0, in between 9.5 and 8.0, in between 9 and 8.0, or in between 8.5 and 8.0). In certain embodiments, the rosin ester comprises 60% or less by weight of an esterified dehydroabietic acid and an esterified dihydroabietic acid (e.g., 55% or less by weight, 50% or less by weight, or 45% or less by weight, or 40% or less by weight, or 35% or less by weight, or 30% or less by weight, or 25% or less by weight, or 20% or less by weight) based upon the weight of the rosin ester. The term dihydroabietic acid herein refers to the total of dihydroabietic acid isomers. The rosin ester incorporated in the compositions provided herein can have a low hydroxyl number (e.g., a hydroxyl number of seven, six, or five or less). In these cases, the hydroxyl number of the rosin ester can be low independent of the acid number of the rosin ester and/or the PAN number of the rosin ester. Accordingly, the acid number of the rosin ester and the PAN number of the rosin ester may independently be low as defined above, or higher. In some embodiments, the rosin ester incorporated in the compositions provided herein can have a low hydroxyl number of ten or less (e.g., a hydroxyl number of seven, six, five or less) and an acid number of fifteen or less (e.g., an acid number of ten, nine, eight or less, or an acid number of five or less). In some embodiments, the rosin ester incorporated in the compositions provided herein can have a low hydroxyl number of 10 or less (e.g., a hydroxyl number of seven, six, five or less), and the sum of the hydroxyl number of the rosin ester and the acid number of the rosin ester can be eighteen or less (e.g., fifteen or less, ten or less, seven or less, or five or less).

In some embodiments, rosin ester incorporated in the compositions provided herein has a low hydroxyl number of seven or less (e.g., a hydroxyl number of six or five or less) in combination with a low acid number fifteen or less (e.g., an acid number of ten or less). In some embodiments, the composition comprises a rosin ester which has a low hydroxyl number of ten or less (e.g., a hydroxyl number of seven, six, five or less) in combination with a PAN number of 25 or less (e.g., a PAN number between 22.0 and 8.0). In certain embodiments, the composition comprises a rosin ester which has a low hydroxyl number of ten or less (e.g., a hydroxyl number of seven, six, five or less), a low acid number of twelve or less (e.g., an acid number of ten or less), and a PAN number of twenty-five or less (e.g., a PAN number between 23.0 and 8.0, or a PAN number between 15.0 and 10.0). In some embodiments, the sum of the hydroxyl number and the acid number of the rosin ester incorporated in the compositions provided herein can be fifteen, twelve, ten or less (e.g., seven or less, or five or less).

In one embodiment, the rosin ester can comprise up to 70% by weight of an esterified dehydroabietic acid and an esterified dihydroabietic acid, based on the total weight of the rosin ester (e.g., up to 65% by weight of an esterified dehydroabietic acid and an esterified dihydroabietic acid, up to 60% by weight of an esterified dehydroabietic acid and an esterified dihydroabietic acid, up to 50% by weight of an esterified dehydroabietic acid and an esterified dihydroabietic acid, up to 45% by weight of an esterified dehydroabietic acid and an esterified dihydroabietic acid, up to 40% by weight of an esterified dehydroabietic acid and an esterified dihydroabietic acid, up to 35% by weight of an esterified dehydroabietic acid and an esterified dihydroabietic acid, or up to 30% by weight of an esterified dehydroabietic acid and an esterified dihydroabietic acid).

In one embodiment of the present invention, the rosin ester may comprise from more than zero up to 40% by weight of an esterified dehydroabietic acid based on the total weight of the rosin ester, or up to 35%, or up to 30%, or up to 25%, or up to 20%, or up to 15%, or up to 10% by weight of an esterified dehydroabietic acid, based upon the total weight of the rosin ester.

In another embodiment, the composition of the present invention includes a rosin ester comprising esterified dehydroabietic acid in an amount of 45% or less, or 40%, or 39%, or 38%, or 37%, or 36%, or 35%, or 34%, or 33%, or 32%, or 31%, or 30%, or 29%, or 28% or 27%, or 26%, or 25%, or 24%, or 23%, or 22%, or 21%, or 20% or less (or from 1 to 45%, or 5 to 40% or 10 to 35%) by weight based upon the weight of the rosin ester, and wherein the rosin ester has a PAN number between 7 or 8 and 25, or between 8.5 and 25, or between 9 and 25, or between 9.5 and 25, or between 10 and 25.

In another embodiment, the present invention relates to a rosin ester comprising esterified dehydroabietic acid in the amounts recited herein, wherein the rosin ester has a PAN number as recited herein, and the ratio of the amount of esterified dehydroabietic acid to the PAN number (i.e., the amount of esterified dehydroabietic acid divided by the PAN number) is less than 5.0, 4.9, 4.8, 4.7, 4.6, 4.5, 4.4, 4.3, 4.2, 4.1, 4.0, 3.9, 3.8, 3.7, 3.6, 3.5, 3.4, 3.3, 3.2, 3.1, 3.0, 2.9, 2.8, 2.7, 2.6, 2.5, 2.4, 2.3, 2.2, 2.1, 2.0 or less; or the ratio of the amount of esterified dehydroabietic acid to the PAN number may range from 0.1 to 5.0, or 0.2 to 4.9, or 0.3 to 4.8 or 0.4 to 4.7, or 0.5 to 4.6, or 0.6 to 4.5, or 0.7 to 4.4, or 0.8 to 4.3, or 0.9 to 4.2 or 1.0 to 4.1, or 1.1 to 4.0, or 1.2 to 3.9, or 1.3 to 3.8, or 1.4 to 3.7, or 1.5 to 3.6, or 1.6 to 3.5, or 1.7 to 3.4, or 1.8 to 3.3, or 1.9 to 3.2, or 2.0 to 3.1, or 2.1 to 3.0, etc.

In one embodiment, the rosin ester may comprise a tetrahydroabietic acid content of more than zero up to 10% by weight, or up to 9% by weight, or up to 8% by weight, or up to 7% by weight, or up to 6% by weight, or up to 5% by weight based upon the weight of rosin ester.

In another embodiment, the rosin ester incorporated in the compositions provided herein can have a low neat Gardner color. In some embodiments, the rosin ester has a neat Gardner color, as determined according to the method described in ASTM D1544-04 (2010), of 10.0 or less. (e.g., 9.5 or less, 9.0 or less, 8.5 or less, 8.0 or less, 7.5 or less, 7.0 or less, 6.5 or less, 6.0 or less, 5.5 or less, 5.0 or less, 4.5 or less, 4.0 or less, 3.5 or less, 3.0 or less, 2.5 or less, 2.0 or less, or 1.5 or less, 1.0 or less).

In certain embodiments, the rosin ester is derived from a polyhydric alcohol, such as a polyhydric alcohol selected from the group consisting of ethylene glycol, propylene glycol, diethylene glycol, triethylene glycol, tetraethylene glycol, trimethylene glycol, glycerol, diglycerol, polyglycerol, trimethylolpropane, trimethylolethane, pentaerythritol, dipentaerythritol, mannitol, and combinations thereof.

In other embodiments the rosin ester can have a weight average molecular weight ($M_w$), as determined using gel permeation chromatography (GPC) as described in ASTM D5296-05, of at least 1700 g/mol (e.g., at least 1800 g/mol, at least 1900 g/mol, at least 2000 g/mol, at least 2100 g/mol, at least 2200 g/mol, at least 2300 g/mol, at least 2400 g/mol, at least 2500 g/mol, at least 2600 g/mol, at least 2700 g/mol, at least 2800 g/mol, at least 2900 g/mol, at least 3000 g/mol, at least 3100 g/mol, at least 3200 g/mol, at least 3300 g/mol, at least 3400 g/mol, at least 3500 g/mol, at least 3600 g/mol, at least 3700 g/mol, at least 3800 g/mol, at least 3900 g/mol). The rosin ester can have a weight average molecular weight of 4000 g/mol or less (e.g., 3900 g/mol or less, 3800 g/mol or less, 3700 g/mol or less, 3600 g/mol or less, 3500 g/mol or less, 3400 g/mol or less, 3300 g/mol or less, 3200 g/mol or less, 3100 g/mol or less, 3000 g/mol or less, 2900 g/mol or less, 2800 g/mol or less, 2700 g/mol or less, 2600 g/mol or less, 2500 g/mol or less, 2400 g/mol or less, 2300 g/mol or less, 2200 g/mol or less, 2100 g/mol or less, 2000 g/mol or less, 1900 g/mol or less, 1800 g/mol or less).

In a further embodiment, the rosin ester can have a weight average molecular weight ranging from any of the minimum values above to any of the maximum values above. For example, the rosin ester can have a weight average molecular weight of from 1700 g/mol to 4000 g/mol (e.g., from 2000 g/mol to 3500 g/mol, or from 2100 g/mol to 3300 g/mol).

In an even further embodiment, the rosin ester can have a third moment or third power average molecular weight ($M_z$), as determined using gel permeation chromatography (GPC) as described in ASTM D5296-05, of at least 2500 g/mol (e.g., at least 2600 g/mol, at least 3000 g/mol, at least 3400 g/mol, at least 3800 g/mol, at least 4200 g/mol, at least 4600 g/mol, at least 5000 g/mol, at least 5400 g/mol, at least 5800 g/mol, at least 6200 g/mol, at least 6600 g/mol, at least 7000 g/mol, at least 7400 g/mol, at least 7800 g/mol, at least 8200 g/mol, at least 8600 g/mol, at least 9000 g/mol, at least 9400 g/mol, at least 9800 g/mol, at least 10200 g/mol, at least 10600 g/mol, at least 11000 g/mol, at least 11400 g/mol, at least 11800 g/mol). The rosin ester can have a third moment or third power average molecular weight ($M_z$) of 12000 g/mol or less (e.g., 11800 g/mol or less, 11400 g/mol or less, 11000 g/mol or less, 10600 g/mol or less, 10200 g/mol or less, 9800 g/mol or less, 9400 g/mol or less, 9000 g/mol or less, 8600 g/mol or less, 8200 g/mol or less, 7800 g/mol or less, 7400 g/mol or less, 7000 g/mol or less, 6600 g/mol or less, 6200 g/mol or less, 5800 g/mol or less, 5400 g/mol or less, 5000 g/mol or less, 4600 g/mol or less, 4200 g/mol or less, 3800 g/mol or less, 3400 g/mol or less, 3000 g/mol or less, 2600 g/mol or less).

In another embodiment, the rosin ester can have a third moment or third power molecular weight ($M_z$) ranging from any of the minimum values above to any of the maximum values above. For example, the rosin ester can have a weight average molecular weight of from 2500 g/mol to 12000 g/mol (e.g., from 3000 g/mol to 8000 g/mol, or from 3500 g/mol to 7000 g/mol).

In an embodiment, the rosin ester can have a number average molecular weight ($M_n$), as determined using gel permeation chromatography (GPC) as described in ASTM D5296-05, of at least 11000 g/mol (e.g., at least 1150 g/mol, at least 1200 g/mol, at least 1250 g/mol, at least 1300 g/mol, at least 1350 g/mol, at least 1400 g/mol, at least 1450 g/mol, at least 1500 g/mol, at least 1500 g/mol, at least 1600 g/mol, at least 1600 g/mol, at least 1650 g/mol, at least 1700 g/mol, at least 1750 g/mol, at least 1800 g/mol, at least 1850 g/mol, at least 1900 g/mol, at least 1950 g/mol). The rosin ester can have a number average molecular weight of 2000 g/mol or less (e.g., 1950 g/mol or less, 1900 g/mol or less, 1850 g/mol or less, 1800 g/mol or less, 1750 g/mol or less, 1700 g/mol or less, 1650 g/mol or less, 1600 g/mol or less, 1550 g/mol or less, 1500 g/mol or less, 1450 g/mol or less, 1400 g/mol or less, 1350 g/mol or less, 1300 g/mol or less, 1250 g/mol or less, 1200 g/mol or less, 1150 g/mol or less).

In another embodiment, the rosin ester can have a number average molecular weight ($M_n$) ranging from any of the minimum values above to any of the maximum values above. For example, the rosin ester can have a number average molecular weight ($M_n$) of from 1100 g/mol to 2000 g/mol (e.g., from 1400 g/mol to 1800 g/mol or from 1450 g/mol to 1700 g/mol).

The rosin ester can be present in the composition in varying amounts, depending upon the desired properties of the composition. In some embodiments, the rosin ester comprises at least 5% by weight of the composition (e.g., at least 10% by weight of the composition, at least 15% by weight of the composition, at least 20% by weight of the composition, at least 25% by weight of the composition, at least 30% by weight of the composition, at least 35% by weight of the composition, at least 40% by weight of the composition, at least 45% by weight of the composition, at least 50% by weight of the composition, or at least 55% by weight of the composition). In some embodiments, the rosin ester comprises 60% or less of the composition by weight (e.g., 55% or less by weight, 50% or less by weight, 45% or less by weight, 40% or less by weight, 35% or less by weight, 30% or less by weight, 25% or less by weight, 20% or less by weight, 15% or less by weight, or 10% or less by weight). The rosin ester can be present in the composition in an amount ranging from any of the minimum values above to any of the maximum values above.

In some embodiments, the rosin ester includes more than one type of rosin ester. For example, the rosin ester can include a mixture of two rosin esters which are derived from the same type of rosin and two different alcohols and one dicarboxylic acid (e.g., a pentaerythritol ester of tall oil rosin and adipic acid and a glycerol ester of tall oil rosin and adipic acid), a mixture of two rosin esters which are derived from the same alcohol and two different types of rosin and a two dicarboxylic acids (e.g., a pentaerythritol ester of tall oil rosin and adipic acid and a pentaerythritol ester of gum rosin and 1,4-cyclohexane dicarboxylic acid), or a mixture of two rosin esters which are derived from two different alcohols and two different types of rosin and one dicarboxylic acid (e.g., a pentaetythritol ester of tall oil rosin and succinic acid and a glycerol ester of gum rosin and succinic acid).

In some cases, the composition can be an adhesive formulation (e.g., hot-melt adhesive formulation), an ink formulation, a coating formulation, a rubber formulation, a sealant formulation, an asphalt formulation or a road marking bitumen based formulation, or a pavement marking formulation (e.g., a thermoplastic road marking formulation). The rosin ester resin may be present in these compositions in an amount of from 1 to 40% by weight from 2 to 35% by weight, from 5 to 30% by weight, from 7 to 25% by weight, or from 10 to 20% by weight), based on the weight of the composition.

In some embodiments, the present invention may include a tire tread composition comprising a rubber polymer (e.g., a copolymer derived from styrene and one or more of isoprene and butadiene), a filler, and a rosin ester resin described herein. The rubber polymer can be any suitable rubber polymer or combination of rubber polymers (including natural rubber and its various raw and reclaimed forms as well as various synthetic rubber polymers, and any combinations thereof), depending on the desired end use of the rubber formulation. Representative synthetic rubber polymers are the homopolymerization products of butadiene and its homologues and derivatives, for example, methylbutadiene, dimethylbutadiene and pentadiene, as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. It should be understood that any of the rubbers may be end-modified. Such an end-modifying group may be a carboxyl group, an amino group, a hydroxyl group, an alkoxyl group or a silanol group (—SiOH), for example. Meanwhile, a rubber may contain a modifying group inside the rubber chain. Such a modifying group may be an epoxy group or a ketone group, for example. Any of these rubbers can be used either in a single form or an arbitrarily blended form. In certain embodiments, the rubber formulation can include one or more diene rubber or non-diene polymers. Optionally, the formulation can further include any suitable additives and fillers as may be desired. Thus, it is possible to blend various additives generally used in tire rubber compositions, including, vulcanizing agents, vulcanization accelerators, antioxidants, plasticizers, coupling agents, reinforcing agents, viscosifiers, colorants, softeners, fillers, and the like with the rubber formulation.

The rosin ester resin may be present in the tire tread composition in an amount of from 1 to 80 parts by weight (e.g., from 2 to 75 parts by weight, from 5 to 70 parts by weight, from 35 to 75 parts by weight, or from 55 to 75 parts by weight), based on 100 parts by weight of the rubber polymer.

In certain embodiments, the composition is a hot-melt adhesive. In these embodiments, the rosin ester can function as all or a portion of the tackifier component in a traditional hot-melt adhesive formulation. The copolymer derived from ethylene and a vinyl alkanoate (e.g., vinyl acetate) or the copolymer derived from ethylene and an acrylate ester or methacrylate ester (e.g., n-butyl acrylate), the rosin ester and one or more additional components can be present in amounts effective to provide a hot-melt adhesive having the characteristics required for a particular application. For example, The copolymer derived from ethylene and a vinyl alkanoate (e.g., vinyl acetate) or the copolymer derived from ethylene and an acrylate ester or methacrylate ester (e.g., n-butyl acrylate) can be from 10% by weight to 70% by weight of the hot-melt adhesive composition (e.g., from 20% by weight to 60% by weight of the hot-melt adhesive composition, from 25% by weight to 50% by weight of the hot-melt adhesive composition, or from 30% by weight to 40% by weight of the hot-melt adhesive composition). The rosin ester can be from 1% by weight to 60% by weight of the hot-melt adhesive composition (e.g., from 10% or 25% by weight to 45% by weight of the hot-melt adhesive composition, or from 30% by weight to 40% by weight of the hot-melt adhesive composition).

The hot-melt adhesive can further include one or more additional components, including additional tackifiers, waxes, stabilizers (e.g., antioxidants and UV stabilizers), plasticizers (e.g., benzoates and phthalates and the like), oils such as paraffinic oils, napthtenic oils, vegetable oils and the like and mixtures thereof, nucleating agents, optical brighteners, pigments dyes, glitter, biocides, flame retardants, anti-static agents, slip agents, anti-blocking agents, lubricants, ferromagnetic particles, hygroscopic water-retaining materials, electrically conductive particles, templating agents, and fillers. In some embodiments, the hot-melt adhesive further comprises a wax or more than one wax. U.S. Pat. No. 8,921,464 B2 to Liu describes wax components that can be applied in hot-melt adhesives. Such waxes include petroleum based waxes, synthetic waxes and naturally occurring waxes such as plant and animal waxes. Waxes include, but are not limited to, paraffin-based waxes, microcrystalline waxes, high density low molecular weight waxes, less refined waxes, highly refined waxes which elicit a sharp melting point, and synthetic Fischer-Tropsch waxes including low melting Fischer-Tropsch waxes and oxidized Fischer-Tropsch waxes. Examples of waxes are Sasolwax® C80 and Sasolwax® 6805. Exemplary synthetic waxes include, but are not limited to polyethylene waxes, polypropylene waxes, and functionalized waxes such as hydroxy stearamide waxes and fatty amide waxes. The waxes can be from 5% by weight to 60% by weight of the hot-melt adhesive composition, based on the total weight of the composition (e.g., from 20% by weight to 30% by weight of the hot-melt adhesive composition). Fillers can be used for reducing cost, adding bulk, improving cohesive strength and altering properties. Examples of fillers are: calcium carbonate, barium sulfate, talc, silica, carbon black, clays. Templating agents are described in U.S. Pat. No. 8,921,464 B2 to Liu et al which is incorporated herein by reference in their entirety.

Examples of additional tackifiers or resins that can be included in the hot-melt adhesive are any compatible resins or mixtures thereof. Examples are alkyl phenolics such as terpene phenolics, hydrogenated terpene phenolics, aromatic hydrocarbon resins such as styrene and substituted styrene based resins, C9 resins, C5/C9 aliphatic and/or aromatic resins, and styrenated terpene based resins, aliphatic and cycloaliphatic hydrocarbon resins and polyterpenic resins, modified terpenes, hydrogenated terpenes, aromatic modified cycloaliphatic hydrocarbon resins, polycyclopentadiene resins, hydrogenated polycyclopentadiene resins, aromatic modified hydrogenated polycyclopentadiene resins, rosins, hydrogenated rosins, and resins obtained from the cationic polymerization of compositions containing one or more of the following monomers: C5 diolefins, C5 olefins, C6 olefins, C9 vinylaromatics cyclic and acyclic terpenes, resins obtained by the thermal polymerization of dicyclopentadiene, and the thermal polymerization of dimers or oligomers of cyclopentadiene and/or methylcyclopentadiene, optionally with vinylaromatics, and resins with similar chemical structures.

In one embodiment, relatively small quantities of alkylphenolic tackifiers can be added to the composition in order to improve the high temperature performance of adhesives.

In some embodiments, the composition is a hot-melt adhesive and the copolymer derived from ethylene and a vinyl alkanoate is a copolymer derived from vinyl acetate. In certain embodiments, the copolymer derived from ethylene and vinyl acetate is EVA. In certain embodiments, the EVA can be derived from 10% by weight to 40% by weight vinyl acetate, based on the total weight of all of the monomers polymerized to form the EVA (e.g., from 17% by weight to 34% by weight vinyl acetate).

In some embodiments, the copolymer derived from ethylene and vinyl acetate is EVA and has an MI value of 400 grams/10 minutes or higher, or has an MI value of 750 grams/10 minutes or higher, or has an MI value of 900 grams/10 minutes or higher.

In some embodiments, the copolymer derived from ethylene and butylacrylate is EnBA and has an MI value of 400 grams/10 minutes or higher, or has an MI value of 750 grams/10 minutes or higher, or has a MI value of 900 grams/10 minutes or higher.

In certain embodiments, the composition is a thermoplastic road marking formulation. The thermoplastic road marking formulation can include from 5% by weight to 25% by weight of a rosin ester, based on the total weight of the thermoplastic road marking formulation (e.g., from 10% by weight to 20% by weight of the thermoplastic road marking formulation). The thermoplastic road marking formulation can further include a copolymer derived from ethylene and a vinyl alkanoate, such as vinyl acetate (e.g., up to 10% of a copolymer derided from ethylene and a vinyl alkanoate such as vinyl acetate, up to 5% of a copolymer derived from ethylene and a vinyl alkanoate such as vinyl acetate, or from 0.1% by weight to 1.5% by weight of a copolymer derived from ethylene and a vinyl alkanoate such as vinyl acetate, such as EVA), a pigment (e.g., from 1% by weight to 10% by weight titanium dioxide), and glass beads (e.g., from 30% by weight to 40% by weight), and a filler (e.g., calcium carbonate which can make up the balance of the composition up to 100% by weight). The thermoplastic road marking formulation can further include an oil (e.g., from 1% by weight to 5% by weight percent mineral oil), a wax (e.g., from 1% by weight to 5% by weight percent paraffin-based wax or synthetic Fischer-Tropsch wax), a stabilizer (e.g., from 0.1% by weight to 0.5% by weight stearic acid), and, optionally, polymers, copolymers, terpolymers and grafted polymers other than copolymers derived from ethylene and vinyl alkanoates and/or binders other than the rosin ester blend as described herein.

As discussed above, by incorporating ester having particular properties (e.g., a low hydroxyl number, a low acid number, a relatively low PAN number, or combinations thereof) into a copolymer derived form ethylene and a vinyl alkanoate such as vinyl acetate, or with a low molecular weight copolymer derived from ethylene and an acrylate ester or methacrylate ester monomer such as n-butyl acrylate, the composition can exhibit improved viscosity stability and compatibility on aging at elevated temperatures (thermal aging), e.g., at temperatures of 100° C. and higher. The viscosity stability of the compositions provided herein upon thermal aging can be determined according to methods described in ASTM D4499-07 and variations thereof. Round robin tests have shown that the ASTM D4499-07 standard test method for Heat Stability is well suited for testing of the heat stability, including viscosity stability, of adhesives based on an EVA copolymer. The viscosity stability of the compositions provided herein upon thermal aging can be determined according to methods described in ASTM D4499-07 and variations thereof.

In some embodiments, the composition exhibits less than a 20% change in viscosity upon incubation at 177° C. for 96 hours, when analyzed using the modified ASTM D4499-07 method described below (e.g., less than a 18% change in viscosity, less than an 16% change in viscosity, less than a 14% change in viscosity, less than a 12% change in viscosity, less than a 10% change in viscosity, less than a 8% change in viscosity, less than a 6% change in viscosity, less than a 4% change in viscosity, or less than a 2% change in viscosity). In certain cases, the composition exhibits an initial viscosity of about 1.7 Pa·s at 145° C. as e.g. measured using a parallel-plate rheometer (Anton Paar-Physica MCR101, PP25) applying a copolymer blend of EVATHANE® 28-800 and LOTRYL® 35BA320 in the hot-melt adhesive, or the composition exhibits an initial viscosity of about 1.5 Pa·s at 145° C. using EVATHANE® 28-800 as the copolymer in the hot-melt adhesive.

By incorporating a rosin ester having particular properties (e.g., a low hydroxyl number, a low acid number, a relatively low PAN number, or combinations thereof) into a low molecular weight polymer derived from a vinyl alkanoate such as vinyl acetate, or with a copolymer derived from ethylene and an acrylate ester or methacrylate ester monomer such as n-butyl acrylate, the composition can exhibit improved color stability upon thermal aging.

In further embodiments, the compositions of the present invention may also exhibit improved thermal color stability and can exhibit an extended shelf life by showing less discoloration in the course of time. Thermal color stability and shelf life have been associated with radical formation propensity. It has been reported by J. Minn that the rate of radical formation is related to the degree of oxidative stability. Oxidative stability can be determined according to a procedure as was published by J. Minn, Determination of oxidative stability of rosin products by high pressure differential scanning calorimetry, *Thermochimica Acta* 1985, 91, pages 87-94, which is incorporated herein in its entirety. Differential Scanning Calorimetry (DSC) can be used to predict the thermo-oxidative performance of a material, e.g. a rosin ester, and rank and classify materials in terms of their oxidative stability. Oxidation induction time (OIT) is a standardized test performed in DSC. The time between melting and the onset of decomposition in isothermal conditions is measured. Samples are generally heated up under a nitrogen atmosphere. Oxygen is then introduced to the sample cell, and the length of time before the onset of degradation, or the time to the maximum level of degradation, as seen by the initiation or height of an endothermic process in the DSC trace, is measured.

In some embodiments, the composition has a Gardner color, as determined according to the method described in ASTM D1544-04 (2010), of 14.0 or less after incubation at 177° C. for 96 hours (e.g., 13.0 or less, 12.5 or less, 12.0 or less, 11.5 or less, 11.0 or less, 10.5 or legs, 10.0 or less, 9.5 or less, 9.0 or less, 8.5 or less, 8.0 or less, 7.5 or less, 7.0 or less, 6.5 or less, 6.0 or less, 5.5 or less, 5.0 or less, 4.5 or less, or 4.0 or less).

The composition can optionally have low sulfur content. Sulfur content can be measured with an ANTEK® 9000 sulfur analyzer using the standard methods described in ASTM D5453-05. In some embodiments, the composition comprises less than 700 ppm sulfur (e.g., less than 650 ppm sulfur, less than 600 ppm sulfur, less than 550 ppm sulfur, less than 500 ppm sulfur, less than 450 ppm sulfur, less than 400 ppm sulfur, less than 350 ppm sulfur, less than 300 ppm sulfur, less than 250 ppm sulfur, less than 200 ppm sulfur, less than 150 ppm, less than 100 ppm sulfur, less than 50 ppm sulfur, less than 20 ppm sulfur or less than 10 ppm sulfur).

The rosin ester can optionally have low sulfur content. In some embodiments, the rosin ester comprises less than 1000 ppm sulfur (e.g., less than 900 ppm sulfur, less than 800 ppm sulfur, less than 700 ppm sulfur, less than 600 ppm sulfur, less than 500 ppm sulfur, less than 400 ppm sulfur, less than 300 ppm sulfur, less than 200 ppm sulfur, less than 100 ppm sulfur, less than 50 ppm sulfur, less than 20 ppm sulfur, or less than 10 ppm sulfur). In some embodiments, the sulfur content of the rosin ester can be reduced by treating the rosin ester with a sorbent, such as activated carbon, to decrease the amount of sulfur in the rosin ester.

As discussed above, by incorporating a rosin ester having particular properties (e.g., a low hydroxyl number, a low acid number, a relatively low PAN number, a certain molecular weight distribution a relatively low aromatic content, or combinations thereof) into a low molecular weight copolymer derived from ethylene and a vinyl alkanoate such as vinyl acetate, or with a low molecular weight copolymer derived from ethylene and an acrylate ester or methacrylate ester monomer such as n-butyl acrylate, the composition can exhibit a better compatibility on aging at elevated temperatures (thermal aging). The compatibility of the compositions provided herein upon thermal aging can be determined according to methods described herein.

Incompatibility related phenomena are more likely to occur when the free energy of mixing ($\Delta G_m$) value is greater than zero. Thermodynamics can predict if phase separation will occur but cannot predict the time frame or initiation thereof. Kinetic factors like diffusion rates can play an important role therein. Incompatibility related phenomena can show up in the form of phase separation, for example the formation of small droplets consisting of one of the components from the blended material or enriched in one of the components from the blended material. These small droplets of phase separated material can grow in the course of time, assemble and eventually lead to a separate material layer. Phase separation can be the result of intrinsic incompatibility upon mixing but can aggravate by thermal decomposition phenomena in the course of time.

Several methods are known to assess incompatibility or phase separation phenomena such as cloud point temperature determination. Herein, a hot-melt adhesive formulation is slowly cooled and the cloud point temperature is determined. Alternatively, a light transmission rate through a hot-melt adhesive formulation sample across a temperature range can be measured. A lower light transmission can be indicative for a more cloudy solution with a higher degree of incompatibility.

In one embodiment, the present invention includes a rosin ester having an $M_z$ value, an $M_w$ value, or an $M_n$ value as mentioned herein, and a turbidity light transmission, such that the rosin ester has a turbidimetric light transmission percentage that exceeds 60%, 65%, 70%, 75%, 80%, 85%, 90%, or 95% within a temperature range of 80° C. to 180° C., after thermal aging at 177° C. for 10 hours; or a turbidimetric light transmission percentage that exceeds 60%, 65%, 70%, 75%, 80%, 85%, 90%, or 95% at a temperature of 120° C., after thermal aging at 177° C. for 10 hours, or after thermal aging at 177° C. for 16 hours. In this embodiment, the rosin ester may have as $M_z$ value between 2500 and 12000, or between 3000 and 8000, or between 4000 and 7500; or an $M_w$ value between 1700 and 4000, or between 2000 and 3500, or between 2100 and 3300; or an $M_n$ value between 1100 and 2000, or between 1400 and 1800, or between 1450 and 1700.

In one embodiment, the present invention includes a rosin ester wherein the composition has an initial turbidimetric light transmission percentage which is higher than a similar composition based on SYLVALITE™ RE 118 as the rosin ester within a temperature range of 80° C. to 180° C., e.g. a turbidimetric light transmission percentage that exceeds 85%, or that exceeds 88%, or that exceeds 90%, or that exceeds 92%, or that exceeds 95%, or that exceeds 97%.

Optical microscopy can be well-suited to visually check phase separation phenomena, i.e. the formation of resin droplets as a function of time and/or temperature. An additional microscopy heating stage setup can be applied to measure phase separation phenomena at elevated temperatures. Other microscopic techniques can also be applied to assess compatibility.

Dynamic mechanical analysis (DMA) rheology comparisons can be applied to assess incompatibility in adhesive formulations. For example, the tan δ peak ("the ratio of loss modulus to storage modulus") can be used for that purpose. Less compatibility can result in a lower tan δ peak value or can lead to flattening of the tan δ peak in the DMA rheogram.

The adhesive co positions of the present invention can be prepared by blending the components in the melt at a temperature of above about 120° C. until a homogeneous blend is obtained. Various methods of blending are known and any method that produces a homogeneous blend can be applied.

The INSTANT-LOK® product line from Henkel (National Starch and Chemical Company) includes some low temperature EVA containing hot-melt adhesives. The COOL LOK® brand from Henkel (National Starch and Chemical Company) includes some low application temperature EVA containing hot-melt adhesive and low application temperature EnBA containing hot-melt adhesives.

The compositions provided herein can be used in a variety of applications, including as adhesives (e.g., hot-melt adhesives, including low temperature application hot-melt adhesives), inks, coatings, rubbers, sealants, asphalt, and thermoplastic road markings and pavement markings. In some embodiments, the compositions are hot-melt adhesives used, for example, in product assembly and in conjunction with papers and packaging (e.g., to adhere surfaces of corrugated fiberboard boxes and paperboard cartons during assembly and/or packaging, to prepare self-adhesive labels, to apply labels to packaging, or in other applications such as bookbinding and to seal cardboard cases, trays and cartons), in conjunction with non-woven materials (e.g., to adhere non-woven material with a backsheet during the construction of disposable diapers), in adhesive tapes, in apparel (e.g., in the assembly of footware, or in the assembly of multi-wall and specialty handbags), in electrical and electronic bonding (e.g., to affix parts or wires in electronic devices), in general wood assembly (e.g., in furniture assembly, or in the assembly of doors and mill work), and in other industrial assembly (e.g., in the assembly of appliances).

Also provided are methods for preparing polymer compositions, including hot-melt adhesives. Methods for preparing polymer compositions can include mixing a low molecular weight copolymer derived from ethylene and a vinyl alkanoate (e.g., a copolymer derived from vinyl acetate) or mixing a low molecular weight copolymer derived from ethylene and an acrylate ester or methacrylate ester monomer such as n-butyl acrylate, and a rosin ester as described herein having a hydroxyl number of six or five or less and an acid number of fifteen or less (e.g., ten or less, or five or less). Methods for preparing polymer compositions can also include mixing a low molecular weight polymer derived from a vinyl alkanoate (e.g., a polymer derived from vinyl acetate), or mixing a low molecular weight copolymer derived from ethylene and an acrylate ester or methacrylate ester monomer such as n-butyl acrylate, and a rosin ester as described herein, wherein the hydroxyl number of the rosin ester is six, five or less, and wherein the sum of the hydroxyl number and the acid number is eighteen or less (e.g., fifteen or less, ten or less, seven or less, or five or less). Methods for preparing polymer compositions can also include mixing a low molecular weight polymer derived from a vinyl alkanoate (e.g., a polymer derived from vinyl acetate), or mixing a copolymer derived from ethylene and an acrylate ester or methacrylate ester monomer such as n-butyl acrylate, and a rosin ester as described herein, wherein the sum of the hydroxyl number and the acid number of the rosin ester is ten or less (e.g., seven or less, or five or less). Methods can further include adding one or more additional components to the composition, wherein several materials selected from a component class can be used, such as an additional tackifier, a resin, a wax, a stabilizer (e.g., an antioxidant UV stabilizer), a plasticizer (e.g., benzoates, phthalates), paraffin oil, a nucleating agent, an optical brightener, a pigment, a dye, glitter, a biocide, a flame retardant, an antistatic agent, a slip agent, an anti-blocking agent, a lubricants, a filler, or a combination thereof. Methods can further include esterifying a rosin to obtain a rosin ester having the desired properties (e.g., a hydroxyl number of six or five or less, an acid number of fifteen or less, etc.), which can then be mixed with the polymer.

As set forth herein, heat stress is defined as being the temperature at which a stressed bond fails. More than one method to determine heat stress resistance or heat resistance of hot-melt adhesives is known. A method for testing heat stress resistance has been described in U.S. Pat. No. 8,076,407 B2 to Ellis and Stolbova which is incorporated herein by reference in its entirety. An alternative heat stress determination method is described in U.S. Pat. No. 8,921,464 B2 to Liu. Another alternative method to determine heat stress resistance has been described by the Institute of Packaging Professionals (IoPP). See for example: M. J. Ambrosini, Heat stress resistance of hot-melt adhesives, pp. 166-170, September 1993 Tappi Journal, and in: IoPP Adhesion Committee, IoPP Technical Journal X(1): pp. 7-9 Winter (1992), and by the Institute of Packaging Professionals: Suggested test method for determining the heat stress resistance of hot-melt adhesives, T-3006, which are incorporated herein by reference in their entirety. Results in such heat stress tests are generally reported as the highest temperature at which the majority of tested samples pass, e.g., four passed samples versus one failure in the case of 5 replicates. Heat stress resistance test repeatability results were reported in M. J. Ambrosini's article cited hereinabove and led to an estimate of the standard deviation (standard error) value of approximately 2.5° C. for the obtained pass temperature values in their heat stress resistance test. A novel heat stress resistance test method variant is incorporated herein as part of the invention which has a standard error value which is less than 2.5° C. for the obtained pass temperature values. The rosin ester incorporated in the compositions provided herein which is formulated as part of a hot-melt adhesive composition can lead to a heat resistance performance that is either similar to or higher than the performance as obtained in an analogous hot-melt adhesive formulation based on the Diels-Alder fortified rosin ester derivative SYLVALITE™ RE 118. A similar hot-melt adhesive heat resistance performance as compared with a SYLVALITE™ RE 118 based composition means that the highest temperature at which the majority of tested samples passes in one of the abovementioned test methods, or test modifications based on such test methods, does not deviate more than 4° C., in other words, it is at most 4° C. higher than the SYLVALITE™ RE 118 based hot-melt adhesive composition value and it is at most 4° C. lower than the SYLVALITE™ RE 118 based hot-melt adhesive composition value, e.g. it is at most 3° C. higher, 2° C. higher, 1° C. higher; it exhibits the same pass temperature; or it is at most 1° C. lower, 2° C. lower, or at most 3° C. lower than the SYLVALITE™ RE 118.

The rosin ester incorporated in the compositions provided herein which is formulated as part of a hot-melt adhesive composition can lead to a heat resistance performance that is either similar to or higher than the performance as obtained in an analogous hot-melt adhesive formulation based on the rosin ester SYLVALITE™ RE 110L. A similar heat resistance performance means that it is at most 4° C. higher than the SYLVALITE™ RE 110L based hot-melt adhesive composition value and it is at most 4° C. lower than the SYLVALITE™ RE 110L based hot-melt adhesive composition value, e.g. it is at most 3° C. higher, 2° C. higher, 1° C. higher; it exhibits the same pass temperature; or it is at most 1° C. lower, 2° C. lower, or at most 3° C. lower than the SYLVALITE™ RE 110L.

The rosin ester incorporated in the compositions provided herein which is formulated as part of a hot-melt adhesive composition can lead to a heat resistance performance that is either similar to or higher than the performance as obtained in an analogous hot-melt adhesive formulation based on the rosin ester SYLVALITE™ RE 105L. A similar heat resistance performance means that it at most 4° C. higher than the SYLVALITE™ RE 105L based hot-melt adhesive composition value and it is at most 4° C. lower than the SYLVALITE™ RE 105L based hot-melt adhesive composition value, e.g. it is at most 3° C. higher, 2° C. higher, 1° C. higher; it exhibits the same pass temperature; or it is at most 1° C. lower, 2° C. lower, or at most 3° C. lower than the SYLVALITE™ RE 105L.

An exemplary road marking formulation may be prepared by: (a) charging a standard mixer with 16 parts rosin ester, 2.8 parts oil (e.g., a mineral oil, such as mineral oil; obtained from Statoil), 1 part wax (e.g., polyethylene wax, such as AC6 PE-wax obtained from Honeywell), 1 part of a copolymer derived from ethylene and a vinyl alkanoate such as vinyl acetate (e.g., poly(ethylene-co-vinyl acetate) such as Elvax 22W obtained from DuPont), 0.2 parts fatty acid (e.g., stearic acid), 5.3 parts pigment (e.g., titanium dioxide, such as titanium dioxide obtained from Kronos), 42.4 parts filler (e.g., calcium carbonate), and 37.1 parts reflective filler (e.g., glass beads, such as glass beads obtained from Swarco); and (b) heating (e.g., at 180° C.) and blending at low speed to avoid introducing air bubbles into the melt.

An exemplary tire formulation may be prepared by the following process. In the first step, the rubbers SBR and BR are introduced to a lab-scale Brabender type internal mixer (Haake Rheomix OS & Polylab OS from Thermo Scientific Mixer) and heated at 70° C. and 80 rpm. After 0.5 minutes, 50.5 phr of silica, and 6.7 phr of organosilane are added to the rubber. The mixture is mixed at 80 RPM for 1 minute and further 50.5 phr of silica, the rosin resin of the present invention (1.3 phr), 3.7-4.6 phr of the mineral oil (TDAE), antioxidant (Vulkanox 4020 2.5 phr), wax 0.9 phr (Antilux 654), Zinc Oxide 3.2 phr, and 2.5 phr stearic acid are added to the mixture. The mixture is mixed at 80 RPM for 1 minute and 12.6 phr Carbon Black and 6.3 phr of mineral oil (TDAE) are added to the mixture. The mixture is mixed for a further 1.5 minutes to allow the mixture to reach a temperature of 150° C. The ram is then raised to allow for cleaning and then lowered. When the temperature reached 160° C. the mixture is dumped out of the mixer and allowed to cool at room temperature, to provide a first non-productive rubber mixture (STAGE 1 rubber). In the second step, the STAGE 1 rubber is brought back into the mixer and is set to 80 RPM. After 2 minutes the ram is raised and lowered. When the temperature of 160° C. is reached, the mixture is dumped out of the mixer and allowed to cool at room temperature, to provide a second non-productive rubber mixture (STAGE 2 rubber). In the third step, the STAGE 2 rubber is brought back into the mixer and the rotor is set to 50 RPM. The vulcanization package of 6.2 phr (Rhenogran CBS-80 2 phr, Rhenogran DPG-80 2 phr, and Rhenogran IS 60-75 2.2 phr) is added to the mixture. When the temperature of 105° C. is reached, the mixture is dumped out of the mixer and allowed to cool at room temperature, to provide a final productive mixture (FINAL STAGE). The final productive mixture is cured at 160° C. for 15 minutes.

By way of non-limiting illustration, examples of certain embodiments of the present disclosure are included below.

EXAMPLES

General Methods

All materials were characterized using the following methods unless otherwise stated. Hydroxyl numbers were determined according to a modified method (different solvent tetrahydrofuran was applied) of DIN 53240-2 entitled "Determination of Hydroxyl Value—Part 2: Method with Catalyst," which is incorporated herein by reference in its entirety. The rosin ester (dissolved in tetrahydrofuran) was reacted with acetic anhydride in the presence of 4-dimethylaminopyridine. Residual acetic anhydride was hydrolyzed and the resulting mixture titrated with an alcoholic solution of potassium hydroxide (0.5 M). Acid numbers were determined according to method described in ASTM D465-05 (2010) entitled "Standard Test Methods for Acid Number of Naval Stores Products Including Tall Oil and Other Related Products," which is incorporated herein by reference in its entirety. Softening points were determined according to method described in ASTM E28-99 (2009) entitled "Standard Test Methods for Softening Point of Resins Derived from Naval Stores by Ring-and-Ball Apparatus," which is incorporated herein by reference in its entirety. PAN numbers and dehydroabietic acid content were determined according to method described in ASTM D5974-00 (2010) entitled "Standard Test Methods for Fatty and Rosin Acids in Tall Oil Fractionation Products by Capillary Gas Chromatography," which is incorporated herein by reference in its entirety. Specifically, a sample (1.00 g) and 10 mL 2N potassium hydroxide (KOH) in ethanol were added to a high pressure microwave reaction vessel. The reaction vessel was sealed and placed into the rotor of a Perkin Elmer MULTI-WAVE™ 3000 Microwave System. The sample was saponified in the microwave for 30 minutes at 150° C. Upon completion of the microwave-assisted saponification, the reaction mixture was transferred to a separatory funnel, and dilute hydrochloric acid was added to reduce the pH value to less than 4. This converted the rosin soaps in the reaction mixture to rosin acids. The resulting rosin acids were isolated by way of ethyl ether extraction. Upon removal of the ether solvent, the rosin acids were derivatized and analyzed using a gas chromatograph according to ASTM D5974-00 (2010). The Gardner color of all materials was measured according to the Gardner Color scale as specified in ASTM D1544-04 (2010) entitled "Standard Test Method for Color of Transparent Liquids (Gardner Color Scale)," which is incorporated herein by reference in its entirety. Gardner colors were measured neat using a Dr Lange LICO® 200 colorimeter. Molecular weight distributions and the derived $M_n$, $M_w$, and $M_z$ values of the rosin esters were determined by means of Gel permeation chromatography (GPC): Equipment description: Viscotek GPC-Max equipped with a Viscotek TDA305 triple detector array was applied. Column set description: PL-gel Guard column (3 μm, 50×7.5 mm, cat. No. PL1110-1320) and 3 times PL-gel Mixed E (3 μm, 300×7.5 mm, cat. No. PL110-6300) was applied. Tetrahydrofuran (Biosolve AR-grade, stabilized with 0.02-0.03% 2,6-di-tert-butyl-4-methylphenol (BHT), cat. No. 20630502) was applied as eluent. The applied flow rate was 1.0 ml/min. The applied temperature was 40° C. Sample preparation description: About 30 mg of sample was exactly weighted and dissolved in 10.0 ml of eluent, 10.0 μl of toluene was added as a flow rate marker. The applied injection volume was 100 μl. Calibration description: Conversional calibration against eight polystyrene standards in the range of 162-51.000 Da was applied. Glass transition temperature ($T_g$) values of the rosin esters were determined by means of Differential scanning calorimetry (DSC): Equipment description: Mettler Toledo DSC 821$^e$ equipped with an ULSP 130 immersion probe cooler. Cup description: 40 μl aluminum cup with pierced lid. Applied gas and flow rate: $N_2$, 65 ml/min. Temperature program description (Basic temperature program; heating and cooling rates were standard, actual minimum and maximum temperatures can be modified on demand).

| 1st. segment | 25° C. à 160° C. (20° C./min) |
|---|---|
| 2nd. segment | 160° C. à −60° C. (−10° C./min) |
| 3rd. segment | −60° C. à 160° C. (10° C./min) |

Sample intake amount: Approximately 10 mg. Processing description: The glass transition temperature ($T_g$) is determined in the $3^{rd}$ segment (i.e. the $2^{nd}$ heating curve). Oxidative-induction time was measured according to the standard methods specified in ASTM D5483-05 (2010) entitled "Standard Test Method for Oxidation Induction Time of Lubricating Greases by Pressure Differential Scanning Calorimetry," which is incorporated herein by reference in its entirety. Unless otherwise specified, the oxidative-induction time was measured at 130° C. using 550 psi (3.79 MPa) of oxygen. The time of peak onset and peak maximum, expressed in minutes, is a measure of the oxidative stability of the sample. Unless otherwise specified the samples contained 0.08% (w/w) Irganox® 565 antioxidant, based on the applied amount of rosin.

Sample analysis was carried according the procedure below: The cell was heated to 110° C. and 2 to 3 mg of sample was put into an aluminum DSC pan. Once the cell temperature had equilibrated, the sample pan was placed in the cell, the cell was closed and purged for 20 seconds with oxygen. Thereafter, the DSC cell was pressurized to 550 psi over the next 40-45 seconds, the oxygen valve was closed and data acquisition was started immediately. Isobaric/isothermal conditions were continued for 360 minutes or until an exothermic oxidation was observed.

Preparation of Rosin Esters

Example 1

Tall oil rosin (600 g, having an acid number of 181 mg KOH/g rosin) was charged into a four-necked flask (1 L) and heated to 200° C. under a nitrogen atmosphere. After the rosin was completely melted, the resulting solution was mechanically stirred. Pentaerythritol (71.884 g), adipic acid (99% purity, Acros Organics) (27.0 g) and Irganox® 1425 (Calcium-bis (((3,5-bis(1,1-dimethylethyl)-4-hydroxyphenyl)methyl)-ethylphosphonate, commercially available from BASF)) (1.5 g) were added and the reaction mixture was heated to 190° C. and subsequently to 295° C. with a heating rate of 30° C./h. The formed water was allowed to escape as vapor during the esterification reaction. After 12 hours at 295° C., residual rosin acids and other volatiles were stripped off during two hours of nitrogen sparging and the reaction mixture was subsequently cooled to 200° C. Irganox® 565 (0.48 g) was added and blended into the resulting mixture. The product was discharged. The obtained rosin ester 1 exhibited a softening point of 115.1° C., an acid number of 4.9 mg KOH/g rosin ester, a hydroxyl number of 0.14 mg KOH/g rosin ester, an $M_z$ value of 3543 g/mol, an $M_w$ value of 2157 g/mol, an $M_n$ value of 1433 g/mol, an $T_g$ of 66.9° C., a PAN value of 11.8%, and a color of 5.2 Gardner (neat). The percentage of esterified dehydroabietic acid in rosin ester 1 was 35.4 by weight, based upon the total weight of the obtained rosin acids, after rosin ester hydrolysis.

Example 2 (Comparative)

The procedure of Example 1 was repeated, except that a larger amount of pentaerythritol (88.358 g) was used. The obtained rosin ester 2 exhibited a softening point of 113.3° C., an acid number of 1.6 mg KOH/g rosin ester, a hydroxyl number of 13.7 mg KOH/g rosin ester, an $M_z$ value of 3593 g/mol, an $M_w$ value of 2157 g/mol, $M_n$ value of 1433 g/mol, a PAN value of 12.0%, and a color of 7.2 Gardner (neat).

Example 3

Tall oil rosin SYLVAROS™ 90 (acid number 175 mg KOH/g rosin, sulfur content 839 ppm, commercially available from Arizona Chemical) (600 g) was charged into a four-necked flask (1 L) and heated to 200° C. under a nitrogen atmosphere. After the rosin was completely melted, the resulting solution was mechanically stirred. Pentaerythritol (74.439 g), adipic acid (36.0 g) and Irganox® 1425 (1.5 g) were added and subsequently the reaction mixture was heated to 295° C. (heating rate of 30° C./hour). The formed water was allowed to escape as vapor during the esterification reaction. After 12 hours at 295° C., residual rosin acids and other volatiles were stripped off during one hour of nitrogen sparging and the reaction mixture was subsequently cooled to 200° C. Irganox® 565 (0.48 g) was added and blended into the resulting mixture. The product was discharged. The obtained rosin ester 3 exhibited a softening point of 104.3° C., an acid number of 5.2 mg KOH/g rosin ester, a hydroxyl number of 0.7 mg KOH/g rosin ester, an $M_z$ value of 5660 g/mol, an $M_w$ value of 2892 g/mol, an $M_n$ value of 1612 g/mol, an $T_g$ of 56.1° C., a PAN value of 10.9%, and a color of 8.0 Gardner (neat). The percentage of esterified dehydroabietic acid in rosin ester 3 was 31.6 by weight, based upon the total weight of the obtained rosin acids, after rosin ester hydrolysis. The sulfur content of rosin ester 3 after the Irganox® 565 antioxidant addition was determined and amounted to 665 ppm.

Example 4 (Comparative)

The procedure of Example 3 was repeated, except that a larger amount of pentaerythritol (90.473 g) was used. The obtained rosin ester 4 exhibited a softening point of 106.4° C., an acid number of 0.9 mg KOH/g rosin ester, a hydroxyl number of 16.9 mg KOH/g rosin ester, an $M_z$ value of 5131 g/mol, an $M_w$ value of 2705 g/mol, an $M_n$ value of 1556 g/mol, an $T_g$ of 59.6° C., a PAN value of 10.3%, and a color of 10.1 Gardner (neat).

Example 5 (Comparative)

Tall oil rosin SYLVAROS™ 90 (14.03 g, acid number 175 mg KOH/g rosin) was added to a portion of rosin ester 4 (86.01 g) that was obtained in Example 4. The obtained rosin ester 5 exhibited an acid number of 25.3 mg KOH/g rosin ester, a hydroxyl number of 16.4 mg KOH/g rosin ester, an $T_g$ of 50.6° C., and a PAN value of 15.2%.

Example 6

Tall oil rosin SYLVAROS™ 90 (300 g, acid number 175 mg KOH/g rosin, sulfur content 839 ppm) was charged into a four-necked flask (0.5 L) and heated to 190° C. under a nitrogen atmosphere. After the rosin was completely melted, the resulting solution was mechanically stirred. Pentaerythritol (37.219 g), sebacic acid (99% purity, commercially available from Sigma-Aldrich) (24.911 g), ROSINOX® (poly-tert-butylphenoldisulfide; commercially available from Arkema Inc.) (0.3 g), and Irganox® 1425 (0.75 g) were added and subsequently the reaction mixture was heated to 275° C. (heating rate of 30° C./hour). The formed water was allowed to escape as vapor during the esterification reaction. After 8 hours at 275° C., residual rosin acids and other volatiles were stripped off during two hours of nitrogen sparging and the reaction mixture was subsequently cooled to 200° C. No Irganox® 565 was added to the resulting mixture. The product was discharged. The obtained rosin ester 6 exhibited a softening point of 95.7° C., an acid number of 6.61 mg KOH/g rosin ester, a hydroxyl number of 2.24 mg KOH/g rosin ester, an $M_z$ value of 5817 g/mol, an $M_w$ value of 2889 g/mol, an $M_n$ value of 1457 g/mol, sulfur content of 805 ppm, and a color of 5.1 Gardner (neat).

Example 7 (Comparative)

The procedure of Example 6 was repeated, except that a larger amount of pentaerythritol (43.767 g) was used. The product was discharged. The obtained rosin ester 7 exhibited a softening point of 95.9° C., an acid number of 2.3 mg KOH/g rosin ester, a hydroxyl number of 16.5 mg KOH/g rosin ester, an $M_z$ value of 4678 g/mol, an $M_w$ value of 2577 g/mol, an $M_n$ value of 1497 g/mol, and a color of 5.3 Gardner (neat).

Example 8

*Pinus Massoniana* gum rosin (600.1 g, having an acid number of 170 mg KOH/g rosin, a softening point of 82.6° C., a sulfur content of <10 ppm and a color of 6.8 Gardner (neat)) was charged into a four-necked flask (1 L) and heated to 190° C. under a nitrogen atmosphere. After the gum rosin was completely melted, the resulting solution was mechanically stirred. Pentaerythritol (67.01 g), adipic acid (24.01 g) and Irganox® 1425 (1.504 g) were added and subsequently the reaction mixture was heated to 295° C. (heating rate of 30° C./hour). The formed water was allowed to escape as vapor during the esterification reaction. After 12 hours at 295° C., residual rosin acids and other volatiles were stripped off during two hours of nitrogen sparging and the reaction mixture was subsequently cooled to 200° C. Irganox® 565 (0.4836 g) was added and blended into the resulting mixture. The resulting product was discharged. The obtained rosin ester 8 (512.4 g) exhibited a softening point of 122.7° C., an acid number of 2.3 mg KOH/g rosin ester, a hydroxyl number of 0.4 mg KOH/g rosin ester, an $M_z$ value of 3445 g/mol, an $M_w$ value of 2075 g/mol, an $M_n$ value of 1388 g/mol, a $T_g$ of 80.8° C., a sulfur content of 113 ppm, a PAN value of 15.7%, and a color of 5.5 Gardner (neat). The percentage of esterified dehydroabietic acid in rosin ester 8 was 26.9 by weight, based upon the total weight of the obtained rosin acids, after rosin ester hydrolysis.

Example 9

Tall oil rosin SYLVAROS™ 90 (1200 g, acid number 175 mg KOH/g rosin) was charged into a four-necked flask (2 L) and heated to 195° C. under a nitrogen atmosphere. After the rosin was completely melted, the resulting solution was mechanically stirred. Pentaerythritol (155.285 g), adipic acid (72.0 g) and Irganox® 1425 (3.0 g) were added and subsequently the reaction mixture was heated to 295° C. (heating rates: 180° C. to 200° C., 10° C./hour; 200° C. to 240° C., 25° C./hour; 240° C. to 270° C., 20° C./hour; 270° C. to 285° C., 10° C./hour; 285° C. to 295° C., 5° C./hour). The formed water was allowed to escape as vapor during the esterification reaction. After 10 hours at 295° C., residual rosin acids and other volatiles were stripped off during one hour of nitrogen sparging and the reaction mixture was subsequently cooled to 200° C. The product was discharged. The obtained rosin ester 9 exhibited a softening point of 102.2° C., an acid number of 4.5 mg KOH/g rosin ester, a hydroxyl number of 1.33 mg KOH/g rosin ester, an $M_z$ value of 5393 g/mol, an $M_w$ value of 2758 g/mol, an $M_n$ value of 1452 g/mol, an $T_g$ of 60.2° C., a PAN value of 11.8%, and a color of 8.0 Gardner (neat). The percentage of esterified dehydroabietic acid in rosin ester 9 was 30.1 by weight, based upon the total weight of the obtained rosin acids, after rosin ester hydrolysis.

Example 10

The procedure of Example 9 was repeated, except that a larger amount of pentaerythritol (158.08 g) and adipic acid (36.34 g) was used. The obtained rosin ester 10 exhibited a softening point of 103.0° C., an acid number of 4.1 mg KOH/g rosin ester, a hydroxyl number of 1.9 mg KOH/g rosin ester, an $M_z$ value of 6233 g/mol, an $M_w$ value of 3014 g/mol, an $M_n$ value of 1508 g/mol, a PAN value of 11.8%, and a color of 8.0 Gardner (neat). The percentage of esterified dehydroabietic acid in rosin ester 10 was 30.5 by weight, based upon the total weight of the obtained rosin acids, after rosin ester hydrolysis.

Example 11

Tall oil rosin SYLVAROS™ 90 (1200 g, acid number 175 mg KOH/g rosin, sulfur content 839 ppm) was charged into a four-necked flask (2 L) and heated to 190° C. under a nitrogen atmosphere. After the rosin was completely melted, the resulting solution was mechanically stirred. Pentaerythritol (156.684 g), adipic acid (75.004 g) and Irganox® 1425 (3.003 g) were added and subsequently the reaction mixture was heated to 295° C. (heating rates: 180° C. to 200° C., 10° C./hour; 200° C. to 240° C., 25° C./hour; 240° C. to 270° C., 20° C./hour; 270° C. to 285° C., 10° C./hour; 285° C. to 295° C., 5° C./hour). The formed water was allowed to escape as vapor during the esterification reaction. After 10 hours at 295° C., residual rosin acids and other volatiles were stripped off during one hour of nitrogen sparging and the reaction mixture was subsequently cooled to 220° C. Irganox® 565 (0.9631 g) was added and blended into the resulting mixture. The resulting product was discharged. The obtained rosin ester 11 (1194 g) exhibited a softening point of 106.5° C., an acid number of 2.4 mg KOH/g rosin ester, a hydroxyl number of 1.2 mg KOH/g rosin ester, an $M_z$ value of 6077 g/mol, an $M_w$ value of 2961 g/mol, an $M_n$ value of 1586 g/mol, a $T_g$ of 61.3° C., a PAN value of 11.9%, and a color of 8.0 Gardner (heat). The percentage of esterified dehydroabietic acid in rosin ester 11 was 31.0 by weight, based upon the total weight of the obtained rosin acids, after rosin ester hydrolysis. The sulfur content of rosin ester 11 after the Irganox® 565 antioxidant addition was determined and amounted to 638 ppm.

Example 12

Tall oil rosin SYLVAROS™ 90 (1200.2 g, acid number 175 mg KOH/g rosin, sulfur content 839 ppm) was charged into a four-necked flask (2 L) and heated to 190° C. under a nitrogen atmosphere. After the rosin was completely melted, the resulting solution was mechanically stirred. Pentaerythritol (154.424 g), adipic acid (75.613 g) and Irganox® 1425 (3.003 g) were added and subsequently the reaction mixture was heated to 295° C. (heating rates: 180° C. to 200° C., 10° C./hour; 200° C. to 240° C., 25° C./hour; 240° C. to 270° C., 20° C./hour; 270° C. to 285° C., 10° C./hour; 285° C. to 295° C., 5° C./hour). The formed water was allowed to escape as vapor during the esterification reaction. After 10 hours at 295° C., residual rosin acids and other volatiles were stripped off during one hour of nitrogen sparging and the reaction mixture was subsequently cooled to 220° C. Irganox® 565 (0.9639 g) was added and blended into the resulting mixture. The resulting product was discharged. The obtained rosin ester 12 (1182 g) exhibited a softening point of 107.1° C., an acid number of 3.0 mg KOH/g rosin ester, a hydroxyl number of 1.7 mg KOH/g rosin ester, an $M_z$ value of 5789 g/mol, an $M_w$ value of 2921 g/mol, an $M_n$ value of 1.569 g/mol, a $T_g$ of 61.8° C., a PAN value of 11.8%, and a color of 8.0 Gardner (neat). The percentage of esterified dehydroabietic acid in rosin ester 12 was 30.4 by weight, based upon the total weight of the obtained rosin acids, after rosin ester hydrolysis. The sulfur content of rosin ester 12 after the Irganox® 565 antioxidant addition was determined and amounted to 638 ppm.

Example 13

Tall oil rosin SYLVAROS™ 90 (600 g, acid number 175 mg KOH/g rosin) was charged into a four-necked flask (1 L) and heated to 190° C. under a nitrogen atmosphere. After the rosin was completely melted, the resulting solution was mechanically stirred. Pentaerythritol (70.388 g), 1,4-cyclohexanedicarboxylic acid (99% purity, CAS Number 1076-97-7, commercially available from Sigma-Aldrich) (33.0 g) and Irganox® 1425 (1.5 g) were added and subsequently the reaction mixture was heated to 295° C. (heating rates of 30° C./hour). The formed water was allowed to escape as vapor during the esterification reaction. After 12 hours at 295° C., residual rosin acids and other volatiles were stripped off during two hours of nitrogen sparging and the reaction mixture was subsequently cooled to 200° C. The product was discharged. The obtained rosin ester 13 exhibited a softening point of 117.0° C., an acid number of 4.9 mg KOH/g rosin ester, a hydroxyl number of 0.0 mg KOH/g rosin ester, an $M_z$ value of 5638 g/mol, an $M_w$ value of 2802 g/mol, an $M_n$ value of 1520 g/mol, a PAN value of 11.5%, and a color of 7.7 Gardner (neat). The percentage of esterified dehydroabietic acid in rosin ester 13 was 31.4 by weight, based upon the total weight of the obtained rosin acids, after rosin ester hydrolysis.

Example 14

Tall oil rosin SYLVAROS™ HYR (acid number 179 mg KOH/g rosin, sulfur content 547 ppm), commercially available from Arizona Chemical) (660.2 g) was charged into a four-necked flask (1 L) and heated to 190° C. under a nitrogen atmosphere. After the rosin was completely melted, the resulting solution was mechanically stirred. Pentaerythritol (75.462 g), 1,4-cyclohexanedicarboxylic acid (99% purity, CAS Number 1076-97-7, commercially available from Sigma-Aldrich) (26.408 g) and Irganox® 1425 (1.654 g) were added and subsequently the reaction mixture was heated to 295° C. (heating rates of 30° C./hour). The formed water was allowed to escape as vapor during the esterification reaction. After 12 hours at 295° C., residual rosin acids and other volatiles were stripped off during two hours of nitrogen sparging and the reaction mixture was subsequently cooled to 220° C. Irganox® 565 (0.334 g) was added and blended into the resulting mixture. The resulting product was discharged. The obtained rosin ester 14 (583.7 g) exhibited a softening point of 126° C., an acid number of 2.9 mg KOH/g rosin ester, a hydroxyl number of 0.3 mg KOH/g rosin ester, an $M_z$ value of 4307 g/mol, an $M_w$ value of 2376 g/mol, an $M_n$ value of 1491 g/mol, a PAN value of 11.4%, and a color of 6.6 Gardner (neat). The sulfur content of rosin ester 14 after the Irganox® 565 antioxidant addition was determined and amounted to 455 ppm.

Example 15

Tall oil rosin SYLVAROS® 90 (600 g, having an acid number of 175 mg KOH/g rosin was charged into a four-necked flask (1 L) and heated to 190° C. under a nitrogen atmosphere. After the rosin was completely melted, the resulting solution was mechanically stirred. Pentaerythritol (65.644 g), 1,4-cyclohexanedicarboxylic acid (99% purity, CAS Number 1076-97-7, commercially available from Sigma-Aldrich) (21.0 g) and Irganox® 1425 (1.5 g) were added and subsequently the reaction mixture was heated to 295° C. (heating rate of 30° C./hour). The formed water was allowed to escape as vapor during the esterification reaction. After 12 hours at 295° C., residual rosin acids and other volatiles were during two hours of nitrogen sparging and the reaction mixture was subsequently cooled to 200° C. The product was discharged. The obtained rosin ester 15 exhibited a softening point of 114.3° C., an acid number of 4.5 mg KOH/g rosin ester, a hydroxyl number of 0.1 mg KOH/g rosin ester, an $M_z$ value of 3876 g/mol, an $M_w$ value of 2250 g/mol, an $M_n$ value of 1406 g/mol, a PAN value of 9.8%, and a color of 7.8 Gardner (neat). The percentage of esterified dehydroabietic acid in rosin ester 15 was 31.6 by weight, based upon the total weight of the obtained rosin acids, after rosin ester hydrolysis.

Example 16

Tall oil rosin SYLVAROS® 90 (600 g, acid number 175 mg KOH/g rosin, sulfur content 839 ppm) was charged into a four-necked flask (1 L) and heated to 190° C. under a nitrogen atmosphere. After the rosin was completely melted, the resulting solution was mechanically stirred. Pentaerythritol (74.501 g), adipic acid (30 g) and Irganox® 1425 (1.5 g) were added and subsequently the reaction mixture was heated to 295° C. (heating rate of 30° C./hour). The formed water was allowed to escape as vapor during the esterification reaction. After 12 hours at 295° C., residual rosin acids and other volatiles were stripped off during two hours of nitrogen sparging and the reaction mixture was subsequently cooled to 200° C. Irganox® 565 (0.48 g) was added and blended into the resulting mixture. The product was discharged. The obtained rosin ester 16 exhibited a softening point of 107.8° C., an acid number of 2.6 mg KOH/g rosin ester, a hydroxyl number of 1.0 mg KOH/g rosin ester, an $M_z$ value of 5494 g/mol, an $M_w$ value of 2787 g/mol, an $M_n$ value of 1504 g/mol, a PAN value of 11.5%, and a color of 8.0 Gardner (neat). The percentage of esterified dehydroabietic acid in rosin ester 16 was 30.4 by weight, based upon the total weight of the obtained rosin acids, after rosin ester hydrolysis. The sulfur content of rosin ester 16 after the Irganox® 565 antioxidant addition was determined and amounted to 603 ppm.

Example 17

Tall oil rosin (661.9 g, having an acid number of 181 mg KOH/g rosin and sulfur content 382 ppm) was charged into a four-necked flask (1 L) and heated to 190° C. under a nitrogen atmosphere. After the rosin was completely melted, the resulting solution was mechanically stirred. Pentaerythritol (76.174 g), 1,4-cyclohexanedicarboxylic acid (99% purity, CAS Number 1076-97-7, commercially available from Sigma-Aldrich) (26.477 g) and Irganox® 1425 (1.656 g) were added and subsequently the reaction mixture was heated to 295° C. (heating rate of 30° C./hour). The formed water was allowed to escape as vapor during the esterification reaction. After 12 hours at 295° C., residual rosin acids and other volatiles were stripped off during two hours of nitrogen sparging and the reaction mixture was subsequently cooled to 200° C. The product was discharged. The obtained rosin ester 17 (590 g) exhibited a softening point of 124.4° C., an acid number of 2.2 mg KOH/g rosin ester, a hydroxyl number of 0.95 mg KOH/g rosin ester, an $M_z$ value of 3607 g/mol, an $M_w$ value of 2213 g/mol, an $M_n$ value of 1503 g/mol, and a color of 4.9 Gardner (neat). The sulfur content of rosin ester 17 after the Irganox® 565 antioxidant addition was determined and amounted to 364 ppm.

Example 18

Tall oil rosin SYLVAROS® 90 (600 g, acid number 175 mg KOH/g rosin) was charged into a four-necked flask (1 L) and heated to 190° C. under a nitrogen atmosphere. After the rosin was completely melted, the resulting solution was mechanically stirred. Pentaerythritol (76.292 g), 1,4-cyclohexanedicarboxylic acid (99% purity, CAS Number 1076-97-7, commercially available from Sigma-Aldrich) (39.0 g) and Irganox® 1425 (1.5 g) were added and subsequently the reaction mixture was heated to 295° C. (heating rate of 30° C./hour). The formed water was allowed to escape as vapor during the esterification reaction. After 12 hours at 295°, residual rosin acids and other volatiles were stripped off during two hours of nitrogen sparging and the reaction mixture was subsequently cooled to 200° C. The product was discharged. The obtained rosin ester 18 exhibited a softening point of 115.7° C., an acid number of 4.6 mg KOH/g rosin ester, a hydroxyl number of 0.2 mg KOH/g rosin ester, an $M_z$ value of 6631 g/mol, an $M_w$ value of 3141 g/mol, an $M_n$ value of 1672 g/mol, a $T_g$ of 63.9° C. and a color of 7.8 Gardner (neat).

Example 19

Tall oil rosin SYLVAROS™ 90 (600 g, acid number 175 mg KOH/g rosin, sulfur content 839 ppm) was charged into a four-necked flask (1 L) and heated to 190° C. under a nitrogen atmosphere. After the rosin was completely melted, the resulting solution was mechanically stirred. Pentaerythritol (80.029 g), adipic acid (48.0 g), Lowinox™ TBM-6 (0.6 g), and Irganox® 1425 (1.5 g) were added and subsequently the reaction mixture was heated to 270° C. (heating rate of 30° C./hour). The formed water was allowed to escape as vapor during the esterification reaction. After 12 hours at 270° C., residual rosin acids and other volatiles were stripped off during two hours of nitrogen sparging and the reaction mixture was subsequently cooled to 200° C. Irganox® 565 (0.48 g) was added and blended into the resulting mixture. The product was discharged. The obtained rosin ester 19 exhibited a softening point of 101.0° C., an acid number of 6.1 Mg KOH/g rosin ester, a hydroxyl number of 2.0 mg KOH/g rosin ester, an $M_z$ value of 7265 g/mol, an $M_w$ value of 3295 g/mol, an $M_n$ value of 1638 g/mol, a $T_g$ of 49.7° C., and a color of 4.7 Gardner (neat). The sulfur content of rosin ester 19 after the Irganox® 565 antioxidant addition was determined and amounted to 783 ppm.

Example 20

Tall oil rosin (634 g, having an acid number of 181 mg KOH/g rosin, sulfur content 382 ppm) was charged into a four-necked flask (1 L) and heated to 190° C. under a nitrogen atmosphere. After the rosin was completely melted, the resulting solution was mechanically stirred. Pentaerythritol (74.752 g), adipic acid (25.362 g), and Irganox® 1425 (1.592 g) were added and subsequently the reaction mixture was heated to 295° C. (heating rate of 30° C./hour). The formed water was allowed to escape as vapor during the esterification reaction. After 12 hours at 295° C., residual rosin acids and other volatiles were stripped off during two hours of nitrogen sparging and the reaction mixture was subsequently cooled to 220° C. Irganox® 565 (0.5126 g) was added and blended into the resulting mixture. The resulting product was discharged. The obtained rosin ester 20 (566 g) exhibited a softening point of 117.5° C., an acid number of 1.6 mg KOH/g rosin ester, a hydroxyl number of 0.1 mg KOH/g rosin ester, a $M_z$ value of 3558 g/mol, a $M_w$ value of 2118 g/mol, a $M_n$ value of 1426 g/mol, an $T_g$ of 68.6° C., a PAN value of 13.6%, and a color of 5.1 Gardner (neat). The sulfur content of rosin ester 20 after the Irganox® 565 antioxidant addition was determined and amounted to 392 ppm.

Example 21 (Comparative)

Synthesis of SYLVALITE™ RE 118

Tall oil rosin SYLVAROS™ 90 (1400 g, acid number 175 mg KOH/g rosin) was charged into a four-necked flask (2 L) and heated to 205° C. under a nitrogen atmosphere. After the rosin was completely melted, the resulting solution was mechanically stirred. Fumaric acid (49.0 g) and Lowinox™ TBM-6 (1.4 g) were added and the reaction mixture was kept at 205° C. for 1 hour. Pentaerythritol (177.4 g) was added and subsequently the reaction was heated to 250° C. (heating rate of 20° C./hour) and subsequently to 270° C. (heating rate of 10° C./hour). After two hours at 270° C., Irganox® 1425 (3.5 g) was added. The formed water was allowed to escape as vapor during the esterification reaction. After 12 hours at 270° C., residual rosin acids and other volatiles were stripped off during two hours of nitrogen sparging and the reaction mixture was subsequently cooled to 200° C. Irganox® 565 (1.12 g) was added and blended into the resulting mixture. The resulting product was discharged. The obtained rosin ester 21 exhibited a softening point of 113.6° C., an acid number of 6.7 mg KOH/g rosin ester, a hydroxyl number of 13.3 mg KOH/g rosin ester, a $M_z$ value of 5498 g/mol, a $M_w$ value of 2629 g/mol, a $M_n$ value of 1397 g/mol a PAN value of 12.8%, and a color of 6.1 Gardner (neat).

Example 22

Elliotti gum rosin (600.4 g, having an acid number of 164 mg KOH/g, rosin, a softening point of 129.9° C., a sulfur content of <10 ppm and a color of 6.9 Gardner (neat)) was charged into a four-necked flask (1 L) and heated to 196° C. under a nitrogen atmosphere. After the gum rosin was completely melted, the resulting solution was mechanically stirred. Pentaerythritol (65.00 g), adipic acid (24.02 g) and Irganox® 1425 (1.500 g) were added and subsequently the reaction mixture was heated to 295° C. (heating rate of 30° C./hour). The formed water was allowed to escape as vapor during the esterification reaction. After 12 hours at 295° C., residual rosin acids and other volatiles were stripped off during two hours of nitrogen sparging and the reaction mixture was subsequently cooled to 200° C. Irganox® 565 (0.4800 g) was added and blended into the resulting mixture. The resulting product was discharged. The obtained rosin ester 22 (519.5 g) exhibited a softening point of 129.9° C., a color of 6.9 Gardner (neat), an acid number of 3.7 mg KOH/g rosin ester, a hydroxyl number of 0.3 mg KOH/g rosin ester, an $M_z$ value of 7764 g/mol, an $M_w$ value of 3334 g/mol, an $M_n$ value of 1552 g/mol, a $T_g$ of 83.4° C., and a PAN value of 15.3%. The sulfur content of rosin ester 22 after the Irganox® 565 antioxidant addition was determined and amounted to 109 ppm.

Example 23

Tropicana gum rosin gum (600.7 g, having an acid number of 166 mg KOH/g rosin, a softening point of 131°

C., a sulfur content of <10 ppm and a color of 7.1 Gardner (neat)) was charged into a four-necked flask (1 L) and heated to 199° C. under a nitrogen atmosphere. After the gum rosin was completely melted, the resulting solution was mechanically stirred. Pentaerythritol (68.533 g), adipic acid (30.044 g) and Irganox® 1425 (1.5002 g) were added and subsequently the reaction mixture was heated to 295° C. (heating rate of 30° C./hour). The formed water was allowed to escape as vapor during the esterification reaction. After 12 hours at 295° C., residual rosin acids and other volatiles were stripped off during two hours of nitrogen sparging and the reaction mixture was subsequently cooled to 200° C. Irganox® 565 (0.4800 g) was added and blended into the resulting mixture. The resulting product was discharged. The obtained rosin ester 23 (524.9 g) exhibited a softening point of 130.1° C., a color of 7.1 Gardner (neat), an acid number of 3.3 mg KOH/g rosin ester, a hydroxyl number of 0.5 mg KOH/g rosin ester, an $M_z$ value of 8218 g/mol, an $M_w$ value of 3473 g/mol, an $M_n$ value of 1598 g/mol, and a PAN value of 16.5%. The sulfur content of rosin ester 23 after the Irganox® 565 antioxidant addition was determined and amounted to 105 ppm.

Example 24

Tall oil rosin SYLVAROS™ 90 (1200.5 g, acid value 174 mg KOH/g rosin, sulfur content 712 ppm) was charged into a four-necked flask (2 L) and heated to 197° C. under a nitrogen atmosphere. After the rosin was completely melted, the resulting solution was mechanically stirred. Pentaerythritol (159.4346 g), adipic acid (80.432 g) and Irganox® 1425 (3.0043 g) were added and subsequently the reaction mixture was heated to 295° C. (heating rates: 180° C. to 200° C., 10° C./hour; 200° C. to 240° C., 25° C./hour; 240° C. to 270° C., 20° C./hour; 270° C. to 285° C., 10° C./hour; 285° C. to 295° C., 5° C./hour). The formed water was allowed to escape as vapor during the esterification reaction. After 10 hours at 295° C., residual rosin acids and other volatiles were stripped off during one hour of nitrogen sparging and the reaction mixture was subsequently cooled to 220° C. Irganox® 565 (0.9616 g) was added and blended into the resulting mixture. The resulting product was discharged. The obtained rosin ester 24 (1196.1 g) exhibited a softening point of 107.5° C., an acid number of 1.8 mg KOH/g rosin ester, a hydroxyl number of 3.3 mg KOH/g rosin ester, an $M_z$ value of 6393 g/mol, an $M_w$ value of 3073 g/mol, an $M_n$ value of 1638 g/mol, a $T_g$ of 62.0° C., a PAN value of 11.5%, and a color of 8.2 Gardner (neat). The sulfur content of rosin ester 24 after the Irganox® 565 antioxidant addition was determined and amounted to 560 ppm.

Example 25

Two batches of tall oil rosin were applied. Tall oil rosin SYLVAROS™ 90 (420.0 g, acid value 175 mg KOH/g rosin, sulfur content 839 ppm) and another tall oil rosin (180.0 g, acid value 174 mg KOH/g rosin, sulfur content 481 ppm) were subsequently charged into a four-necked flask (1 L) and heated to 180° C. under a nitrogen atmosphere. After the rosin was completely melted, the resulting solution was mechanically stirred. Pentaerythritol (56.4406 g), trimethylolpropane (15.0251 g, commercially available from Acros Organics), dipentaerythritol (7.1219 g, commercially available from Perstorp), dimethyl adipate (42.00 g, commercially available from Sigma-Aldrich), and Irganox® 1425 (1.5048 g) were added and subsequently the reaction mixture was heated to 295° C. (heating rate of 30° C./hour). The formed water was allowed to escape as vapor during the esterification reaction. After 12 hours at 295° C., residual rosin acids and other volatiles were stripped off during two hours of nitrogen sparging and the reaction mixture was subsequently cooled to 220° C. Irganox® 565 (0.483 g) was added and blended into the resulting mixture. The product was discharged. The obtained rosin ester 25 (560 g) exhibited a softening point of 107.5° C., an acid number of 2.3 mg KOH/g rosin ester, a hydroxyl number of 0.5 mg KOH/g rosin ester, an $M_z$ value of 5308 g/mol, an $M_w$ value of 2674 g/mol, an $M_n$ value of 1510 g/mol, a PAN value of 11.6%, a $T_g$ of 61.9° C., and a color of 8.0 Gardner (neat). The sulfur content of rosin ester 25 after the Irganox® 565 antioxidant addition was determined and amounted to 545 ppm.

Example 26

Tall oil rosin SYLVAROS™ 90 (480.0 g, acid value 175 mg KOH/g rosin, sulfur content 839 ppm) and SYLVAROS™ HYR (120.0 g, acid value 181 mg KOH/g rosin, sulfur content 547 ppm) were subsequently charged into a four-necked flask (1 L) and heated to 187° C. under a nitrogen atmosphere. After the rosin was completely melted, the resulting solution was mechanically stirred. Pentaerythritol (68.203 g, technical grade, commercially available from Perstorp), glycerol (6.30 g, commercially available from Acros Organics), 3-methyladipic acid (18.002 g, commercially available from Sigma-Aldrich), succinic acid (15.015 g, commercially available from. Sigma-Aldrich), and Irganox® 1425 (1.5034 g) were added and subsequently the reaction mixture was heated to 295° C. (heating rate of 30° C./hour). The formed water was allowed to escape as vapor during the esterification reaction. After 12 hours at 295° C., residual rosin acids and other volatiles were stripped off during two hours of nitrogen sparging and the reaction mixture was subsequently cooled to 220° C. Irganox® 565 (0.4807 g) was added and blended into the resulting mixture. The product was discharged. The obtained rosin ester 26 (551.0 g) exhibited a softening point of 110.9° C., an acid number of 1.5 mg KOH/g rosin ester, a hydroxyl number of 0.7 mg KOH/g rosin ester, an $M_z$ value of 4027 g/mol, an $M_w$ value of 2305 g/mol, an $M_n$ value of 1451 g/mol, a PAN value of 12.6%, a $T_g$ of 65.7° C., and a color of 7.9 Gardner (neat). The sulfur content of rosin ester 26 after the Irganox® 565 antioxidant addition was determined and amounted to 562 ppm.

Example 27

Tall oil rosin SYLVAROS™ 90 (1200.1 g, acid value 175 mg KOH/g rosin) was charged into a four-necked flask (2 L) and heated to 200° C. under a nitrogen atmosphere. After the rosin was completely melted, the resulting solution was mechanically stirred. A mixture of adipic acid (72.013 g) and Irganox® 1425 (3.0041 g) was added. The reaction mixture was re-heated to 200° C. Pentaerythritol (37.0174 g) was added and the temperature was kept at 200° C. for 30 minutes. Another amount of pentaerythritol (37.0091 g) was added and the temperature was kept at 185° C. for 30 minutes. Another amount of pentaerythritol (37.0082 g) was added and the temperature was kept at 180° C. for 30 minutes Another amount of pentaerythritol (37.0056 g) was added and the temperature was kept at 180° C. for 30 minutes. Thereafter, the reaction mixture was heated to 295° C. (heating rates: 180° C. to 200° C., 10° C./hour; 200° C. to 240° C., 25° C./hour; 240° C. to 270° C., 20° C./hour; 270° C. to 285° C., 10° C./hour; 285° C. to 295° C., 5°

C./hour). The formed water was allowed to escape as vapor during the esterification reaction. After 10 hours at 295° C., residual rosin acids and other volatiles were stripped off during one hour of nitrogen sparging and the reaction mixture was subsequently cooled to 220° C. Irganox® 565 (0.9631 g) was added and blended into the resulting mixture. The resulting product was discharged. The obtained rosin ester 27 (1153.7 g) exhibited a softening point of 108.0° C., an acid number of 4.3 mg KOH/g rosin ester, a hydroxyl number of 0.4 mg KOH/g rosin ester, an $M_z$ value of 5192 g/mol, an $M_w$ value of 2688 g/mol, an $M_n$ value of 1482 g/mol, a $T_g$ of 63.4° C., a PAN value of 12.0%, and a color of 7.6 Gardner (neat).

Example 28

Tall oil rosin SYLVAROS™ 90 (800.7 g, acid value 175 mg KOH/g rosin, sulfur content 839 ppm) and another tall rosin (400.2 g, acid value 181 mg KOH/g rosin, sulfur content 382 ppm) were successively charged into a four-necked flask (2 L) and heated to 183° C. under a nitrogen atmosphere. After the rosin was completely melted, the resulting solution was mechanically stirred. Pentaerythritol (149.579 g), adipic acid (72.053 g) and Irganox® 1425 (3.0043 g) were added and subsequently the reaction mixture was heated to 295° C. (heating rates: 180° C. to 200° C., 10° C./hour; 200° C. to 245° C., 25° C./hour; 245° C. to 295° C., 10° C./hour). The formed water was allowed to escape as vapor during the esterification reaction. After 10 hours at 295° C., residual rosin acids and other volatiles were stripped off during one hour of nitrogen sparging and the reaction mixture was subsequently cooled to 220° C. Irganox® 565 (0.9621 g) was added and blended into the resulting mixture. The resulting product was discharged. The obtained rosin ester 28 (1151.4 g) exhibited a softening point of 110.5° C., an acid number of 3.7 mg KOH/g rosin ester, a hydroxyl number of 1.5 mg KOH/g rosin ester, an $M_z$ value of 7024 g/mol, an $M_w$ value of 2754 g/mol, an $M_n$ value of 1503 g/mol, a $T_g$ of 65.5° C., a PAN value of 12.4%, and a color of 7.3 Gardner (neat). The sulfur content of rosin ester 28 prior to Irganox® 565 antioxidant addition was determined and amounted to 393 ppm. The sulfur content of rosin ester 28 after the Irganox® 565 antioxidant addition was also determined and amounted to 489 ppm. Rosin ester 28 exhibited an oxidative-induction time peak onset value of 14 minutes and an oxidative-induction time peak onset value of 19 minutes as measured at 130° C. The percentage of esterified dehydroabietic acid in rosin ester 28 was 32.8 by weight, based upon the total weight of the obtained rosin acids, after rosin ester hydrolysis.

Example 29

Tall oil rosin SYLVAROS™ 90 (800.2 g, acid value 175 mg KOH/g rosin, sulfur content 839 ppm) and another tall rosin (400.15 g, acid value 181 mg KOH/g rosin, sulfur content 382 ppm) were successively charged into a four-necked flask (2 L) and heated to 191° C. under a nitrogen atmosphere. After the rosin was completely melted, the resulting solution was mechanically stirred. Pentaerythritol (143.916 g), adipic acid (60.024 g) and Irganox® 1425 (3.0035 g) were added and subsequently the reaction mixture was heated to 295° C. (heating rates: 180 to 200° C., 10° C./hour; 200° C. to 245° C., 25° C./hour; 245° C. to 295° C., 10° C./hour). The formed water was allowed to escape as vapor during the esterification reaction. After 10 hours at 295° C., residual rosin acids and other volatiles were stripped off during one hour of nitrogen sparging and the reaction mixture was subsequently cooled to 220° C. Irganox® 565 (0.9623 g) was added and blended into the resulting mixture. The resulting product was discharged. The obtained rosin ester 29 (1143.0 g) exhibited a softening point of 110.6° C., an acid number of 3.7 mg KOH/g rosin ester, a hydroxyl number of 1.2 mg KOH/g rosin ester, an $M_z$ value of 4130 g/mol, an $M_w$ value of 2325 g/mol, an $M_n$ value of 1431 g/mol, a $T_g$ of 65.2° C., a PAN value of 12.9% and a color of 6.7 Gardner (neat). The sulfur content of rosin ester 29 prior to Irganox® 565 antioxidant addition was determined and amounted to 423 ppm. The sulfur content of rosin ester 29 after the Irganox® 565 antioxidant addition was also determined and amounted to 509 ppm. The percentage of esterified dehydroabietic acid in rosin ester 29 was 31.8 by weight, based upon the total weight of the obtained rosin acids, after rosin ester hydrolysis.

Example 30

Tall oil rosin SYLVAROS™ 90 (900 g, acid value 174 mg KOH/g rosin, sulfur content 712 ppm) and another tall rosin (300 g, acid value 181 mg KOH/g rosin, sulfur content 382 ppm) were subsequently charged into a four-necked flask (2 L) and heated to 190° C. under a nitrogen atmosphere. After the rosin was completely melted, the resulting solution was mechanically stirred. Pentaerythritol (148.7 g), Adipic acid (72.0 g) and Irganox® 1425 (3.0 g) were added and subsequently the reaction mixture was heated to 295° C. (heating rates: 180° C. to 200° C., 10° C./hour; 200° C. to 240° C., 25° C./hour; 240° C. to 270° C., 20° C./hour; 270° C. to 285° C., 10° C./hour; 285° C. to 295° C., 5° C./hour). The formed water was allowed to escape as vapor during the esterification reaction. After 10 hours at 295° C., residual rosin acids and other volatiles were stripped off during two hours of nitrogen sparging and the reaction mixture was subsequently cooled to 200° C. Irganox® 565 (0.960 g) was added and blended into the resulting mixture. The product was discharged. The obtained rosin ester 30 exhibited a softening point of 109.0° C., an acid number of 4.7 mg KOH/g rosin ester, an $M_z$ value of 6384 g/mol, an $M_w$ value of 2767 g/mol, an $M_n$ value of 1491 g/mol, and a color of 6.8 Gardner (neat). Rosin ester 30 exhibited an oxidative-induction time peak onset value of 17 minutes and an oxidative-induction time peak onset value of 21 minutes as measured at 130° C. The sulfur content of rosin ester 30 after the Irganox® 565 antioxidant addition was determined and amounted to 546 ppm.

Example 31

Tall oil rosin SYLVAROS™ 90 (1200 g, acid value 176 mg KOH/g rosin, sulfur content 700 ppm) was charged into a four-necked flask (2 L) and heated to 190° C. under a nitrogen atmosphere. After the rosin was completely melted, the resulting solution was mechanically stirred. Pentaerythritol (144.315 g), adipic acid (48.0 g), Dymerex™ (72.0 g) and Irganox® 1425 (3.0 g) were added and subsequently the reaction mixture was heated to 295° C. (heating rates: 180° C. to 200° C., 10° C./hour; 200° C. to 245° C., 25° C./hour; 245° C. to 295° C. 10° C./hour). The formed water was allowed to escape as vapor during the esterification reaction. After 10 hours at 295° C., residual rosin acids and other volatiles were stripped off during two hours of nitrogen sparging and the reaction mixture was subsequently cooled to 200° C. Irganox® 565 (0.960 g) was added and blended into the resulting mixture. The product was discharged. The obtained rosin ester 31 exhibited a softening point of 109.4° C., an $M_z$ value of 4019 g/mol, an $M_w$ value of 2283 g/mol, and an $M_n$ value of 1362 g/mol. Rosin ester 31 exhibited an oxidative-induction time peak onset value of 24 minutes and an oxidative-induction time peak onset value of 28 minutes as measured at 130° C. The sulfur content of rosin ester 31 prior to Irganox® 565 antioxidant addition was determined and amounted to 506 ppm. The sulfur content of rosin ester 31 after the Irganox® 565 antioxidant addition was also determined and amounted to 612 ppm.

Example 32

Tall oil rosin SYLVAROS™ 90 (1200 g, acid value 174 mg KOH/g rosin, sulfur content 712 ppm) was charged into a four-necked flask (2 L) and heated to 190° C. under a nitrogen atmosphere. After the rosin was completely melted, the resulting solution was mechanically stirred. Pentaerythritol (147.299 g), Adipic acid (48.0 g), 1,4-cyclohexanedicarboxylic acid (99% purity, CAS Number 1076-97-7, commercially available from Sigma-Aldrich) (27.6 g) and Irganox® 1425 (3.0 g) were added and subsequently the reaction mixture was heated to 295° C. (heating rates 180° C. to 200° C., 10° C./hour; 200° C. to 240° C., 25° C./hour; 240° C. to 270° C., 20° C./hour; 270° C. to 285° C., 10° C./hour; 285° C. to 295° C., 5° C./hour). The formed water was allowed to escape as vapor during the esterification reaction. After 10 hours at 295° C., residual rosin acids and other volatiles were stripped off during two hours of nitrogen sparging and the reaction mixture was subsequently cooled to 200° C. Irganox® 565 (0.960 g) was added and blended into the resulting mixture. The product was discharged. The obtained rosin ester 32 exhibited a softening point of 110.6° C., an $M_w$ value of 3261 g/mol, an $M_n$ value of 1541 g/mol, and a color of 7.3 Gardner (neat). Rosin ester 32 exhibited an oxidative-induction time peak onset value of 15 minutes and an oxidative-induction time peak onset value of 18 minutes as measured at 130° C. The sulfur content of rosin ester 32 after the Irganox® 565 antioxidant addition was determined and amounted to 592 ppm.

Example 33

Tall oil rosin SYLVAROS™ 90 (1000 g, acid value 176 mg KOH/g rosin, sulfur content 700 ppm) and another tall oil rosin (200 g, acid value 181 mg KOH/g rosin, sulfur content 382 ppm) were subsequently charged into a four-necked flask (2 L) and heated to 190° C. under a nitrogen atmosphere. After the rosin was completely melted, the resulting solution was mechanically stirred. Pentaerythritol (149.832 g), 1,4-cyclohexanedicarboxylic acid (99% purity, CAS Number 1076-97-7, commercially available from Sigma-Aldrich) (14.4 g), Adipic acid (60.0 g) and Irganox® 1425 (3.0 g) were added and subsequently the reaction mixture was heated to 295° C. (heating rates: 180° C. to 200° C., 10° C./hour; 200° C. to 245° C., 25° C./hour; 245° C. to 295° C., 10° C./hour). The formed water was allowed to escape as vapor during the esterification reaction. After 10 hours at 295° C., residual rosin acids and other volatiles were stripped off during two hours of nitrogen sparging and the reaction mixture was subsequently cooled to 200° C. Irganox® 565 (0.960 g) was added and blended into the resulting mixture. The product was discharged. The obtained rosin ester 33 exhibited an $M_z$ value of 5851 g/mol, an $M_w$ value of 2886 g/mol, and an $M_n$ value of 1526 g/mol. Rosin ester 33 exhibited an oxidative-induction time peak onset value of 19 minutes and an oxidative-induction time peak onset value of 23 minutes as measured at 130° C. The sulfur content of rosin ester 33 after the Irganox® 565 antioxidant addition was determined and amounted to 546 ppm.

Example 34

Tall oil rosin SYLVAROS™ 90 (900.14 g, acid value 174 mg KOH/g rosin, sulfur content 712 ppm) and Massoniana gum rosin (300.44 g, acid value 168.7 mg KOH/g rosin, sulfur content<10 ppm) were successively charged into a four-necked flask (2 L) and heated to 181° C. under a nitrogen atmosphere. After the rosins were completely melted, the resulting solution was mechanically stirred. Pentaerythritol (141.185 g), adipic acid (60.031 g) and Irganox® 1425 (3.0055 g) were added and subsequently the reaction mixture was heated to 295° C. (heating rates: 180° C. to 200° C., 10° C./hour; 200° C. to 245° C., 25° C./hour; 245° C. to 295° C., 10° C./hour). The formed water was allowed to escape as vapor during the esterification reaction. After 10 hours at 295° C., residual rosin acids and other volatiles were stripped off during one hour of nitrogen sparging and the reaction mixture was subsequently cooled to 220° C. Irganox® 565 (0.9623 g) was added and blended into the resulting mixture. The resulting product was discharged. The obtained rosin ester 34 (1143.7 g) exhibited a softening point of 111.0° C., an acid number of 4.0 mg KOH/g rosin ester, a hydroxyl number of 0.7 mg KOH/g rosin ester, an $M_z$ value of 4529 g/mol, an $M_w$ value of 2427 g/mol, an $M_n$ value of 1433 g/mol, a $T_g$ of 66.1° C., a PAN value of 12.7%, and a color of 7.1 Gardner (neat). The sulfur content of rosin ester 34 prior to Irganox® 565 antioxidant addition was determined and amounted to 396 ppm. The sulfur content of rosin ester 34 after the Irganox® 565 antioxidant addition was also determined and amounted to 488 ppm. The percentage of esterified dehydroabietic acid in rosin ester 34 was 29.0 by weight, based upon the total weight of the obtained rosin acids, after rosin ester hydrolysis.

Example 35

Tall oil rosin SYLVAROS™ 90 (450 g, acid value 175 mg KOH/g rosin) and Dymerex™ (150 g, acid value 144 mg KOH/g Dymerex™, commercially available from Eastman) were subsequently charged into a four-necked flask (1 L) and heated to 200° C. under a nitrogen atmosphere. After the rosin was completely melted, the resulting solution was mechanically stirred. Pentaerythritol (54.801 g) and Irganox® 1425 (1.5 g) were added and subsequently the reaction mixture was heated to 295° C. (heating rate: 30° C./hour). The formed water was allowed to escape as vapor during the esterification reaction. After 10 hours at 295° C., residual rosin acids and other volatiles were stripped off during two hours of nitrogen sparging and the reaction mixture was subsequently cooled to 200° C. Irganox® 565 (0.480 g) was added and blended into the resulting mixture. The product was discharged. The obtained rosin ester 35 exhibited A softening point of 126.8° C.

Example 36

Tall oil rosin SYLVAROS™ 90 (1200 g, acid value 175 mg KOH/g rosin, sulfur content 839 ppm) was charged into a four-necked flask (2 L) and heated to 195° C. under a nitrogen atmosphere. After the rosin was completely melted, the resulting solution was mechanically stirred. Pentaerythritol (148.222 g), Adipic acid (72.0 g) and Irganox® 1425

(3.0 g) were added and subsequently the reaction mixture was heated to 295° C. (heating rates: 180° C. to 200° C., 10° C./hour; 200° C. to 240° C., 25° C./hour; 240° C. to 270° C., 20° C./hour; 270° C. to 285° C., 10° C./hour; 285° C. to 295° C., 5° C./hour). The formed water was allowed to escape as vapor during the esterification reaction. After 10 hours at 295° C., residual rosin acids and other volatiles were stripped off during two hours of nitrogen sparging and the reaction mixture was subsequently cooled to 200° C. Irganox® 565 (0.960 g) was added and blended into the resulting mixture. The product was discharged. The obtained rosin ester 36 exhibited a softening point of 104.9° C., an acid number of 5.0 mg KOH/g rosin ester, an $M_z$ value of 5236 g/mol, an $M_w$ value of 2715 g/mol, an $M_n$ value of 1473 g/mol, a $T_g$ value of 62.2° C. and a color of 7.8 Gardner (neat). The sulfur content of rosin ester 36 after the Irganox® 565 antioxidant addition was determined and amounted to 715 ppm. The percentage of esterified dehydroabietic acid in rosin ester 36 was 28.6 by weight, based upon the total weight of the obtained rosin acids, after rosin ester hydrolysis.

Example 37

Tall oil rosin SYLVAROS™ 90 (1200.3 g, acid value 174 mg KOH/g rosin, sulfur content 692 ppm) was charged into a four-necked flask (2 L) and heated to 180° C. under a nitrogen atmosphere. After the rosin was completely melted, the resulting solution was mechanically stirred. Pentaerythritol (142.28 g), 1,4-cyclohexanedicarboxylic acid (99% purity, CAS Number 1076-97-7, commercially available from Sigma-Aldrich) (72.02 g) and Irganox® 1425 (3.01 g) were added and subsequently the reaction mixture was heated to 295° C. (heating rates: 180° C. to 200° C., 10° C./hour; 200° C. to 245° C., 25° C./hour; 245° C. to 295° C., 10° C./hour). The formed water was allowed to escape as vapor during the esterification reaction. After 10 hours at 295° C., residual rosin acids and other volatiles were stripped off during one hour of nitrogen sparging and the reaction mixture was subsequently cooled to 220° C. Irganox® 565 (0.9603 g) was added and blended into the resulting mixture. The resulting product was discharged. The obtained rosin ester 37 (1115.0 g) exhibited a softening point of 115.9° C., an acid number of 6.7 mg KOH/g rosin ester, a hydroxyl number of 0.1 mg KOH/g rosin ester, an $M_z$ value of 5482 g/mol, an $M_w$ value of 2777 g/mol, an $M_n$ value of 1451 g/mol, a $T_g$ of 70° C., and a color of 6.8 Gardner (neat). The sulfur content of rosin ester 37 prior to Irganox® 565 antioxidant addition was determined and amounted to 492 ppm. The sulfur content of rosin ester 37 after the Irganox® 565 antioxidant addition was also determined and amounted to 598 ppm.

Example 38

Tall oil rosin SYLVAROS™ 90 (1200 g, acid value 174 mg KOH/g rosin, sulfur content 692 ppm) was charged into a four-necked flask (2 L) and heated to 195° C. under a nitrogen atmosphere. After the rosin was completely melted, the resulting solution was mechanically stirred. Dymerex™ (120 g, acid value 144 mg KOH/g Dymerex™, sulfur content 787 ppm, commercially available from Eastman), pentaerythritol (146.61 g), Irganox® 1425 (3.0 g) and adipic acid (48.0 g) were added and subsequently the reaction mixture was heated to 295° C. (heating rates: 180° C. to 200° C., 10° C./hour; 200° C. to 245° C., 25° C./hour; 245° C. to 295° C., 10° C./hour). The formed water was allowed to escape as vapor during the esterification reaction. After 10 hours at 295° C., residual rosin acids and other volatiles were stripped off during two hours of nitrogen sparging and the reaction mixture was subsequently cooled to 200° C. Irganox® 565 (0.96 g) was added and blended into the resulting mixture. The product was discharged. The obtained rosin ester 38 exhibited a softening point of 112.3° C., a $T_g$ of 68.1° C., and an acid number of 4.6 mg KOH/g rosin ester.

The sulfur content of rosin ester 38 prior to Irganox® 565 antioxidant addition was determined and amounted to 511 ppm. The sulfur content of rosin ester 38 after the Irganox® 565 antioxidant addition was also determined and amounted to 602 ppm.

Example 39

Tall oil rosin SYLVAROS™ 90 (1200.7 g, acid value 174 mg KOH/g rosin, sulfur content 692 ppm) was charged into a four-necked flask (2 L) and heated to 180° C. under a nitrogen atmosphere. After the rosin was completely melted, the resulting solution was mechanically stirred. Pentaerythritol (146.78 g), 1,4-cyclohexanedicarboxylic acid (99% purity, CAS Number 1076-97-7, commercially available from Sigma-Aldrich) (55.22 g), adipic acid (24.01 g) and Irganox® 1425 (3.01 g) were added and subsequently the reaction mixture was heated to 295° C. (heating rates: 180° C. to 200° C., 10° C./hour; 200° C. to 245° C., 25° C./hour; 245° C. to 295° C., 10° C./hour). The formed water was allowed to escape as vapor during the esterification reaction. After 10 hours at 295° C., residual rosin acids and other volatiles were stripped off during one hour of nitrogen sparging and the reaction mixture was subsequently cooled to 220° C. Irganox® 565 (0.9609 g) was added and blended into the resulting mixture. The resulting product was discharged. The obtained rosin ester 39 (1148.8 g) exhibited a softening point of 113.6° C., an acid number of 6.9 mg KOH/g rosin ester, a hydroxyl number of 0.1 mg KOH/g rosin ester, an $M_z$ value of 6518 g/mol, an $M_w$ value of 3067 g/mol, an $M_n$ value of 1523 g/mol, a $T_g$ of 66.6° C., and a color of 6.9 Gardner (neat). The sulfur content of rosin ester 39 prior to Irganox® 565 antioxidant addition was determined and amounted to 478 ppm. The suns content of rosin ester 39 after the Irganox® 565 antioxidant addition was also determined and amounted to 576 ppm.

Example 40

Hydrogenated gum rosin FORAL™ AX-E (300.42 g, acid value 164 mg KOH/g rosin, sulfur content<10 ppm, commercially available at Eastman Chemical Company) was charged into a four-necked flask (0.5 L) and heated to 180° C. under a nitrogen atmosphere. After the rosin was completely melted, the resulting solution was mechanically stirred. Pentaerythritol (23.9834 g), 4,8-bis(hydroxymethyl)tricyclo[5.2.1.0$^{2,6}$]decane, mixture of isomers (CAS Number 26896-48-0, commercially available from Sigma-Aldrich) (9.982 g), polyglycerol-4 (5.720 g, commercially available from Solvay Chemicals International S.A.), dipentaerythritol (4.2629 g, commercially available from Perstorp), dimethyl adipate (20.999 g, commercially available from Sigma-Aldrich), and Irganox® 1425 (0.7584 g) were added and subsequently the reaction mixture was heated to 295° C. (heating rates: 180° C. to 200° C., 10° C./hour; 200° C. to 245° C., 25° C./hour; 245° C. to 295° C., 10° C./hour). The formed water was allowed to escape as vapor during the esterification reaction. After 10 hours at 295° C., residual rosin acids and other volatiles were stripped off during one hour of nitrogen sparging and the reaction mixture was subsequently cooled to 220° C. No Irganox® 565 was added. The resulting product was discharged. The obtained rosin ester 40 (259.06 g) exhibited a softening point of 113.2° C., an acid number of 4.7 mg KOH/g rosin ester, and a color of 6.6 Gardner (neat).

Example 41

Tall oil rosin SYLVAROS™ 90 (1200 g, acid value 174 mg KOH/g rosin, sulfur content 692 ppm) was charged into a four-necked flask (2 L) and heated to 195° C. under a nitrogen atmosphere. After the rosin was completely melted, the resulting solution was mechanically stirred. Dymerex™ (144 g, acid value 144 mg KOH/g Dymerex™, sulfur content 787 ppm, commercially available from Eastman), pentaerythritol (148.71 g), Irganox® 1425 (3.0 g) and adipic acid (48.0 g) were added and subsequently the reaction mixture was heated to 295° C. (heating rates: 180° C. to 200° C., 10° C./hour; 200° C. to 245° C., 25° C./hour; 245° C. to 295° C., 10° C./hour). The formed water was allowed to escape as vapor during the esterification reaction. After 10 hours at 295° C. a 300 g sample was taken, residual rosin acids and other volatiles were stripped off during two hours of nitrogen sparging (of the remaining content) and the reaction mixture was subsequently cooled to 200° C. Irganox® 565 (0.76 g) was added and blended into the resulting mixture. The product was discharged. The obtained rosin ester 41 exhibited a softening point of 114.3° C., a $T_g$ of 69.7° C. and an acid number of 3.8 mg KOH/g rosin ester.

Example 42

The 300 g rosin ester sample which was taken in Example 41 is named rosin ester 42. Rosin ester 42 exhibited a softening point of 101.7° C., a $T_g$ of 56.3° C. and an acid number of 14.6 mg KOH/g rosin ester.

Example 43

Tall oil rosin (1200.1 g, acid value 179 KOH/g rosin, sulfur content 573 ppm) was charged into a four-necked flask (2 L) and heated to 180° C. under a nitrogen atmosphere. After the rosin was completely melted, the resulting solution was mechanically stirred. Pentaerythritol (150.51 g), 1,4-cyclohexanedicarboxylic acid (99% purity, CAS Number 1076-97-7, commercially available from Sigma-Aldrich) (27.60 g), adipic acid (48.01 g) and Irganox® 1425 (3.00 g) were added and subsequently the reaction mixture was heated to 295° C. (heating rates: 180° C. to 200° C., 10° C./hour; 200° C. to 245° C., 25° C./hour; 245° C. to 295° C., 10° C./hour). The formed water was allowed to escape as vapor during the esterification reaction. After 10 hours at 295° C., residual rosin acids and other volatiles were stripped off during one hour of nitrogen sparging and the reaction mixture was subsequently cooled to 220° C. Irganox® 565 (0.9636 g) was added and blended into the resulting mixture. The resulting product was discharged. The obtained rosin ester 43 (1141.6 g) exhibited a softening point of 113.5° C., an acid number of 5.1 mg KOH/g rosin ester, a hydroxyl number of 0.5 mg KOH/g rosin ester, an $M_z$ value of 6969 g/mol, an $M_w$ value of 3140 g/mol, an $M_n$ value of 1596 g/mol, a $T_g$ of 67.8° C., and a color of 7.1 Gardner (neat). The sulfur content of rosin ester 43 prior to Irganox® 565 antioxidant addition was determined and amounted to 414 ppm. The sulfur content of rosin ester 43 after the Irganox® 565 antioxidant addition was also determined and amounted to 513 ppm.

Example 44

Tall oil rosin SYLVAROS™ 90 (1200.2 g, acid value 175 mg KOH/g rosin) was charged into a four-necked flask (2 L) and heated to 190° C. under a nitrogen atmosphere. After the rosin was completely melted, the resulting solution was mechanically stirred. Pentaerythritol (153.6337 g), adipic acid (84.013 g) and Irganox® 1425 (3.0069 g) were added and subsequently the reaction mixture was heated to 295° C. (heating rates: 180° C. to 200° C., 10° C./hour; 200° C. to 240° C., 25° C./hour; 240° C. to 270° C., 20° C./hour; 270° C. to 285° C., 10° C./hour; 285° C. to 295° C., 5° C./hour). The formed water was allowed to escape as vapor during the esterification reaction. After 10 hours at 295° C., residual rosin acids and other volatiles were stripped off during one hour of nitrogen sparging and the reaction mixture was subsequently cooled to 220° C. Irganox® 565 (0.9635 g) was added and blended into the resulting mixture. The resulting product was discharged. The obtained rosin ester 44 (1180.6 g) exhibited a softening point of 108.8° C., an acid number of 4.3 mg KOH/g rosin ester, a hydroxyl number of 0.2 mg KOH/g rosin ester, an $M_z$ value of 6143 g/mol, an $M_w$ value of 2993 g/mol, an $M_n$ value of 1539 g/mol, a $T_g$ of 60.6° C., a PAN value of 13.5%, and a color of 7.3 Gardner (neat).

Example 45

Tall oil rosin SYLVAROS™ 90 (1200.3 g, acid value 174 mg KOH/g rosin, sulfur content 692 ppm) was charged into a four-necked flask (2 L) and heated to 180° C. under a nitrogen atmosphere. After the rosin was completely melted, the resulting solution was mechanically stirred. Pentaerythritol technical grade (150.42 g, commercially available at Perstorp, typical OH value; 1615 mg KOH/g, typical pentaerythritol content; 90%, typical dipentaerythritol content; 7.5%, data taken from Perstorp product brochure), 1,4-cyclohexanedicarboxylic acid (99% purity, CAS Number 1076-97-7, commercially available from Sigma-Aldrich) (55.227 g), adipic acid (24.07 g) and Irganox® 1425 (3.018 g) were added and subsequently the reaction mixture was heated to 295° C. (heating rates: 180° C. to 200° C., 10° C./hour; 200° C. to 245° C., 25° C./hour; 245° C. to 295° C., 10° C./hour). The formed water was allowed to escape as vapor during the esterification reaction. After 10 hours at 295° C., residual rosin acids and other volatiles were stripped off during one hour of nitrogen sparging and the reaction mixture was subsequently cooled to 220° C. Irganox® 565 (0.9623 g) was added and blended into the resulting mixture. The resulting product was discharged. The obtained rosin ester 45 (1132.5 g) exhibited a softening point of 114.7° C., an acid number of 5.9 mg KOH/g rosin ester, a hydroxyl number of 0.1 mg KOH/g rosin ester, an $M_z$ value of 7412 g/mol, an $M_w$ value of 3282 g/mol, an $M_n$ value of 1594 g/mol, a $T_g$ of 66.8° C., and a color of 7.2 Gardner (neat). The sulfur content of rosin ester 45 prior to Irganox® 565 antioxidant addition was determined and amounted to 460 ppm. The sulfur content of rosin ester 45 after the Irganox® 565 antioxidant addition was also determined and amounted to 562 ppm.

Example 46

Tall oil rosin SYLVAROS™ 90 (1200.1 g, acid value 174 mg KOH/g rosin, sulfur content 692 ppm) was charged into a four-necked flask (2 L) and heated to 180° C. under a nitrogen atmosphere. After the rosin was completely melted, the resulting solution was mechanically stirred. Pentaerythritol (1.44.63 g), 1,4-cyclohexanedicarboxylic acid (99% purity, CAS Number 1076-97-7, commercially available from Sigma-Aldrich) (78.01 g) and Irganox® 1425 (3.01 g) were added and subsequently the reaction mixture was heated to 295° C. (heating rates: 180° C. to 200° C., 10° C./hour; 200° C. to 245° C., 25° C./hour; 245° C. to 295° C., 10° C./hour). The formed water was allowed to escape as vapor during the esterification reaction. After 10 hours at 295° C., residual rosin acids and other volatiles were stripped off during one hour of nitrogen sparging and the reaction mixture was subsequently cooled to 220° C. Irganox® 565 (0.9615 g) was added and blended into the resulting mixture. The resulting product was discharged. The obtained rosin ester 46 (1145.1 g) exhibited a softening point of 115.3° C., an acid number of 7.6 mg KOH/g rosin ester, a hydroxyl number of 0.2 mg KOH/g rosin ester, an $M_z$ value of 6556 g/mol, an $M_w$ value of 3030 g/mol, an $M_n$ value of 1495 g/mol, a $T_g$ value of 69° C. and a color of 6.9 Gardner (neat). The sulfur content of rosin ester 46 prior to Irganox® 565 antioxidant addition was determined and amounted to 495 ppm. The sulfur content of rosin ester 46 after the Irganox® 565 antioxidant addition was also determined and amounted to 584 ppm.

Preparation of Hot-Melt Adhesive Formulations HMA1 Type and HMA2 Type

Hot-melt adhesive formulations were prepared using the rosin esters as synthesized in Examples 1, 2, 3, 4, 5, 6, 7 and 21, respectively. Two different types of hot-melt adhesive compositions, HMA1 type and HMA2 type were prepared by blending the components by weight percentage according to the data as provided in Table 1 and Table 2, respectively. Seven different hot-melt adhesive formulations of the HMA1 type were prepared (Hot-melt 1, Hot-melt 2, Hot-melt 5, Hot-melt 6, Hot-melt 7, Hot-melt 8, and Hot-melt 9) and two different hot-melt adhesive formulations of the HMA2 type (Hot-melt 3 and Hot-melt 4). IRGANOX® 1010 (Pentaerythritol tetrakis(3-(3,5-di-tert-butyl-4-hydroxyphenyl) propionate), commercially available from BASF was applied. EVATANE® 28-800, commercially available from Arkema was applied. Sasolwax® 6805, commercially available from Sasol Wax was applied. LOTRYL® 35BA320, commercially available from Arkema, Inc. was applied.

TABLE 1

Composition by Weight % of Hot-Melt Formulation HMA1 Type.

| HMA1 | % |
|---|---|
| EVATANE ® 28-800 | 40 |
| Rosin ester | 34.5 |
| Sasolwax ® 6805 | 25 |
| Irganox ® 1010 | 0.5 |

TABLE 2

Composition by Weight % of Hot-Melt Formulation HMA2 Type.

| HMA2 | % |
|---|---|
| EVATANE ® 28-800 | 24 |
| LOTRYL ® 35BA320 | 16 |
| Rosin ester | 34.5 |
| Sasolwax ® 6805 | 25 |
| Irganox ® 1010 | 0.5 |

Viscosity Determination of Hot-Melt Adhesive Formulations HMA1 Type and HMA2 Type.

Viscosities of two HMA1 type and two HMA2 type hot-melt formulations were determined with plate-plate rheometry at 145° C. All reported viscosities were measured at a constant temperature of 145° C. using a parallel-plate rheometer (Anton Paar-Physica MCR101, plate-plate diameter was 25 mm with a gap of 1 mm). The shear rate was varied linearly from 1 to 50 $s^{-1}$ and backwards to 1 $s^{-1}$. The resulting stable viscosity at a shear rate of 50 $s^{-1}$ to 1 $s^{-1}$ was recorded. Three independent viscosity determinations were conducted per sample. The arithmetical mean of the obtained viscosity results per hot-melt formulation was calculated. The results are reported in Tables 3 and Table 4, respectively. The standard error of the mean (SEM) represents the standard deviation of the sample-mean's estimate of a population mean. SEM was estimated by the sample estimate of the population standard deviation (sample standard deviation) divided by the square root of three.

The viscosity stabilities of the two HMA2 type hot-melt adhesive formulations Hot-melt 3 and Hot-melt 4 were measured using a thermal stability test adapted from the test methods described in ASTM D4499-07, entitled "Standard Test Method for Heat Stability of Hot-Melt Adhesives," which is incorporated by reference in its entirety. The test methods described in ASTM D4499-07 were performed using adapted cylindrical glass jar dimensions (inside diameter of 38 mm, internal height of 65 mm and an opening with a diameter of 31 mm, external diameter of 44 mm, external height of 70 mm, glass thickness of 3 mm, 50 mL content, commercially available from Fisher Scientific, part of Thermo Fisher Scientific), which allowed testing to be performed using smaller amounts of hot-melt adhesive (30 g). The aging temperature was 177° C. The samples were aged for 96 hours. The thermal viscosity stability results are reported in Table 4.

TABLE 3

Viscosity of HMA1 Type Hot-Melt Adhesive Formulations Hot-melts 1 and 2, Containing the Rosin Esters Prepared in Examples 1 and 2, Respectively.

| Hot-melt formulation | Applied Rosin ester | Viscosity (Pa · s) |
|---|---|---|
| Hot-melt 1 | Rosin ester 1 | 1.483 |
| Hot-melt 2 | Rosin ester 2 | 1.507 |

TABLE 4

Thermal Viscosity Stability of HMA2 Type Hot-Melt Adhesive Formulations Hot-melts 3 and 4, Containing the Rosin Esters Prepared in Examples 3 and 5, Respectively.

| Hot-melt formulation | Applied Rosin ester | Acid number (mg KOH/g) | Hydroxyl number (mg KOH/g) | η Initial (Pa · s) | η Aged (Pa · s) | Δ Viscosity (%) |
|---|---|---|---|---|---|---|
| Hot-melt 3 | Rosin ester 3 | 5.2 | 0.7 | 1.65 | 1.84 | +11 |
| Hot-melt 4 | Rosin ester 5 | 25.3 | 16.4 | 1.74 | 2.32 | +33 |

η denotes at viscosity. Δ Viscosity denotes the relative difference, expressed as a percent, between the initial viscosity and the viscosity after aging in the thermal stability test adapted from the test methods described in ASTM D4499-07. Hot-melt 3: Calculated SEM value of η Initial amounted to 0.02. Hot-melt 3: Calculated SEM value of η Aged amounted to 0.02. Hot-melt 4: Calculated SEM value of η Initial amounted to 0.003. Hot-melt 4: Calculated SEM value of η Aged amounted to 0.01.

TABLE 5

Composition of HMA1 Type Hot-Melt Adhesive Formulations Hot-melts 1, 2, 5, 6, 7, and 8, Containing the Rosin Esters Prepared in Examples 1, 2, 3, 4, 6, and 7, Respectively and Hot-melt 9 Containing the Rosin Ester Prepared in Example 21.

| Hot-melt formulation | Applied Rosin ester |
|---|---|
| Hot-melt 1 | Rosin ester 1 |
| Hot-melt 2 | Rosin ester 2 |
| Hot-melt 5 | Rosin ester 3 |
| Hot-melt 6 | Rosin ester 4 |
| Hot-melt 7 | Rosin ester 6 |
| Hot-melt 8 | Rosin ester 7 |
| Hot-melt 9 | Rosin ester 21 (SYLVALITE™ RE 118) |

Compatibility Determination of Hot-Melt Adhesive Formulation HMA1 Type

The compatibilities of the seven hot-melt adhesive formulations of the HMA1 type (Hot-melt 1, Hot-melt 2, Hot-melt 5, Hot-melt 6, Hot-melt 7, 1-lot-melt 8, and Hot-melt 9) were measured by using turbidimetry equipment. The hot-melt adhesive samples were aged according to a thermal stability test adapted from the test methods described in ASTM D4499-07, entitled "Standard Test Method for Heat Stability of Hot-Melt Adhesives," which is incorporated by reference in its entirety. The test methods described in ASTM D4499-07 were performed using adapted cylindrical glass jar dimensions (inside diameter of 38 mm, internal height of 65 mm and an opening with a diameter of 31 mm, external diameter of 44 mm, external height of 70 mm, glass thickness of 3 mm, 50 mL content, commercially available from Fisher Scientific, part of Thermo Fisher Scientific), which allowed testing to be performed using smaller amounts of hot-melt adhesive (45 g). The aging temperature was 177° C. The samples were aged for 10 hours (in the cases of Hot-melts 1, 2, 5, and 6) or the samples were aged for 16 hours (in the cases of Hot-melt 7 and Hot-melt 8), or the samples were aged for 10 hours as well as 16 hours (in the case of Hot-melt 9). The resulting aged hot-melt adhesive material was used for turbidity comparison against an initial (i.e. not aged) hot-melt adhesive sample. CHEMOTRONIC HighVise Automatic Turbidimetry Analyzer equipment from Novomatics GmbH, Germany, was applied.

Each hot-melt adhesive sample (30 g) was placed in a test tube with a height of 200 mm, an outer diameter of 21.25 mm, an inner diameter of 18.75 mm and a total volume of 53 mL (commercially available from Verrerie Soufflée Mécanique S.A.). The samples were heated to 180° C. by the CHEMOTRONIC device and subsequently cooled to 80° C. Table 6 shows the applied equipment settings.

TABLE 6

Applied CHEMOTRONIC Automatic Turbidimetry Analyzer Equipment Settings.

| Temperature Phase 1 (-->180° C.) | |
|---|---|
| External stirrer speed | 15 rpm |
| Start temp external stirrer | 100° C. |
| Final Temperature | 180° C. |
| Temp. dev before dwell | 1.0° C. |
| Dwell time | 300 s |
| Temperature Phase 2 (180° C. --> 80° C.) | |
| External stirrer speed | 15 rpm |
| Stop temp. external stirrer | 100° C. |
| Final Temperature | 80° C. |
| Temperature Ramp | 5.0 K/min |
| Temp. dev. Before dwell | 0.1° C. |

The turbidity detection system of the CHEMOTRONIC equipment is based on light transmission. In principle, turbidity is detected by the absorption due to suspended particles in the liquid and can be associated to a cloud point and qualitatively to a degree of incompatibility. The degree of light transmission through a molten hot-melt adhesive sample versus temperature was measured across a temperature range of 80° C. to 180° C. The resulting relationship is represented as a graphical representation (See FIGS. 1-7). The light transmission is given as % transmitted light and the temperature is provided as ° C. A lower light transmission percentage relates to a higher degree of turbidity and thereby served as an indicator for a higher cloud point temperature and a lower degree of compatibility of the measured hot-melt adhesive sample at a given temperature value, or across a given temperature range. It is apparent that rosin esters of the present invention lead to higher hot-melt adhesive light transmission percentages and thereby the resulting hot-melt adhesives can be considered relatively more compatible.

Heat Stress Pass Temperature Determination of Hot-Melt Adhesive Formulations

Heat Stress Test Method Description

Heat stress or heat stress resistance is defined as being the temperature at which a stressed bond fails. A cleavage heat stress was measured by the following protocol which has some similarity with the method as described in U.S. Pat. No. 8,076,407 B2 to Ellis. Herein the ability of a hot-melt to withstand elevated temperature under cleavage forces is used to measure heat resistance. Reference is also made to related heat stress method descriptions as published by the Institute of Packaging Professionals (IoPP) which are referred to hereinabove in the Detailed Description section.

1. Sample Preparation

A) A tube was filled with adhesive hot-melt formulation and pre-heated in an oven at 177° C. for 30 minutes and then immediately transferred into a pre-heated adhesives hot-melt gun. Applied hot-melt gun settings: Tube temperature: 177° C. Nozzle temperature: 190° C. Nozzle size: 0.8 mm. Pressure: 2.5 bar.

Figure 8:
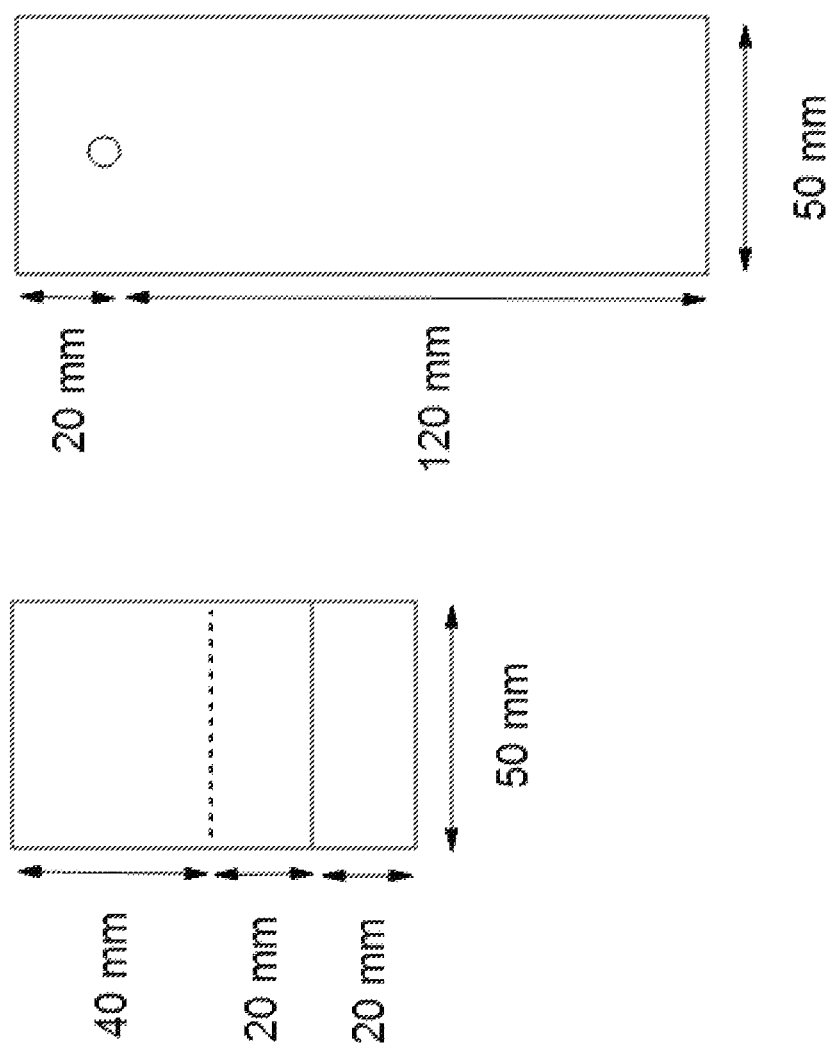
FIG. 8 shows the applied cardboard dimensions in the heat stress resistance test.

B) Corrugated cardboard consisting of an inner liner (170 g/m$^2$), C-flute (Wellenstoff/'waved surface', 100 g/m$^2$), central liner (170 g/m$^2$), B-flute (Wellenstoff/'waved surface', 100 g/m$^2$) and outer liner (115 g/m$^2$), respectively, was applied. Five sets of two cardboard pieces with the fluting running parallel to the longest edge were used per applied adhesive formulation. The adhesive was applied on the smaller piece (80×50 mm) and the larger piece (140×50 mm, with a punched hole 2 cm offset from the short edge) was applied on top of the smaller piece during the test (see FIG. 8 and FIG. 9). The inner liner cardboard sides are bonded together in this test. A line was drawn with a pencil on the smaller piece 2 cm offset from the short edge on the side on which the adhesive was applied.

Figure 9:
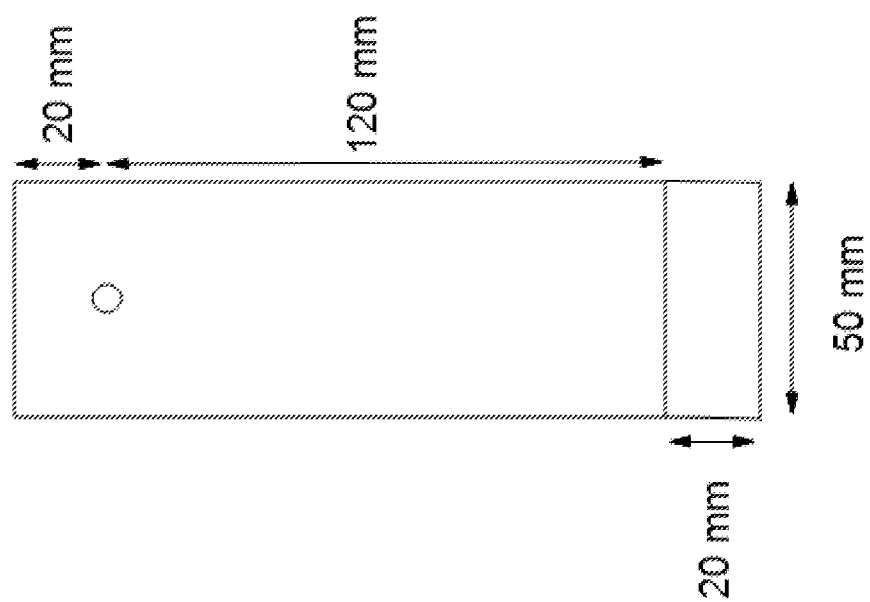
FIG. 9 shows the glued cardboard pieces in the heat stress resistance test. The larger cardboard piece partly covers the smaller cardboard piece.

C) An adhesive was applied on the cardboard surface from the hot-melt gun having an offset from the cardboard edge of 40 mm (dashed line in FIG. 9). An adhesive bead width of 3 mm was produced along the 40 mm line. The larger cardboard piece was immediately applied on top with the hole directed towards the operator. An 100 g weight was put onto the bond and kept for 1 minute. This procedure was repeated for all test samples. The samples were conditioned in a climate-conditioned room (average conditioning temperature 23° C.+/−1° C. (22° C. to 24° C., with total permitted variability of 23° C.+/−2° C. (21° C. to 25° C.) for temperature and of 50+/−5% (45% to 55%) for relative humidity) and average relative humidity of 50+/−2% (48% to 52%) for at least 24 hours prior to running the heat stress resistance test.

2. Heat Stress Resistance Test Method Procedure

Figure 10:
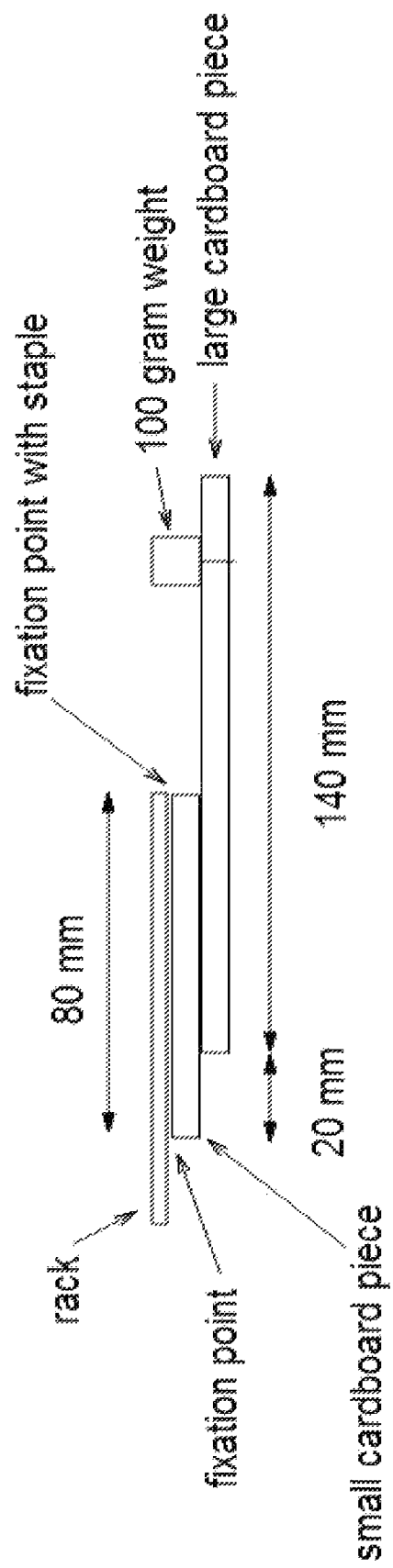
FIG. 10 shows a side view of glued cardboard pieces and 100 g weight in the Binder climate chamber during the heat stress resistance test.

A climate chamber (Binder GmbH, Tuttlingen, Germany) was applied. The shorter cardboard part of the two glued cardboard pieces (see FIG. 9) was bound to the rack by using a clamp on one side and a staple at the opposite side (see FIG. 10). This action was performed for all samples to be tested in one test run. The rack with the attached samples was turned upside down and put carefully into the climate chamber. 100 g weights were carefully inserted into the holes of the larger pieces. The climate chamber door was closed. The climate chamber was allowed to heat up to the set point temperature (38° C.) and temperature was then left constant for 10 minutes. The oven temperature after the initial 10 minutes was raised by 1° C./3 minutes, and left constant for 10 minutes, etc., i.e. every heating step lasted 13 minutes except the first step, which lasted 10 minutes. The test continued until all the samples had failed. The highest temperature at which 80% (4 out of 5) samples of each formulation still passed the test is reported as the heat stress resistance pass temperature result.

Heat Stress Pass Temperature Results of Hot-Melt Adhesive Formulations

Hot-melt adhesive formulations of type HMA3 were made having the composition as outlined in Table 7.

The heat stress pass temperatures of hot-melt adhesive compositions 1-8 were determined according to the method described above. The test results are depicted in Table 8.

SYLVALITE™ RE 118, SYLVALITE™ RE 110L, and SYLVALITE™ RE 105L are included in Table 8 for comparison.

Five samples of each adhesive formulation of the HMA3 type were tested in one run which delivered the heat stress resistance pass temperature result as explained above. Three runs were performed per adhesive formulation, except for hot-melt formulation number 9 where 13 runs were performed, hot-melt formulation numbers 1 and 2 where 4 runs were performed, and hot-melt formulation number 8 where 2 runs were performed. The arithmetical mean of the obtained heat stress resistance pass temperature results per hot-melt formulation was calculated and is reported as the heat stress resistance pass temperature of the formulation, together with the standard error in the right column of Table 8.

TABLE 7

Hot-melt Adhesive Composition of Type HMA3 Overview.

| Material Type | Name | Weight % |
| --- | --- | --- |
| EVA 28% VA content | EVATANE ™ 28-800 | 43 |
| Antioxidant | Irganox ™ 1010 | 0.5 |
| Wax | Sasolwax ™ C80 | 20 |
| Rosin ester | | 36.5 |

TABLE 8

Heat Stress Pass Temperatures Overview of the Tested Hot-melt Adhesive Formulations of Type HMA3 Having the Chemical Compositions of Table 7.

| HMA3 Hot-melt formulation number | Applied rosin ester | Heat stress pass temperature Arithmetical mean ± standard error (° C.) |
| --- | --- | --- |
| 1 | Example 28 | 54.3 ± 1.5 |
| 2 | Example 29 | 51.5 ± 1.7 |
| 3 | Example 30 | 54.7 ± 1.2 |
| 4 | Example 31 | 54.3 ± 1.2 |
| 5 | Example 32 | 55.3 ± 2.5 |
| 6 | Example 33 | 54.0 ± 0.0 |
| 7 | Example 34 | 54.3 ± 1.2 |
| 8 | Example 36 | 49.5 ± 0.7 |
| 9 | Example 21 (SYLVALITE ™ RE 118) | 52.9 ± 1.0 |
| 10 | SYLVALITE ™ RE 110L | 50.0 ± 1.0 |
| 11 | SYLVALITE ™ RE 105L | 50.3 ± 6.6 |

All documents and DIN and ASTM procedures cited herein are incorporated in their entireties by reference.

Many modifications and variations of this invention can be made without departing from its spirit and scope, as will be apparent to those skilled in the art. The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

All documents cited herein are incorporated in their entireties by reference.

It may be evident to those of ordinary skill in the art upon review of the exemplary embodiments herein that further modifications, equivalents, and variations are possible. All parts and percentages in the examples, as well as in the remainder of the specification, are by weight unless otherwise specified. Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R=R_L+k(R_U-R_L)$, where k is a variable ranging from 1% to 100% with a 1% increment, e.g., k is 1%, 2%, 3%, 4%, 5%, . . . 50%, 51%, 52%, . . . 95%, 96%, 97%, 98%, 99%, or 100%. Moreover, any numerical range represented by any two values of R, as calculated above are also specifically disclosed. Any modifications of the invention, in addition to those shown and described herein, will become apparent to those skilled in the art from the foregoing description and accompanying drawings. Such modifications are intended to fall within the scope of the appended claims. All publications cited herein are incorporated by reference in their entirety.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other, than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

Additional Disclosure

The following enumerated aspects of the present disclosure are provided as non-limiting examples.

Claim 1: A composition comprising, (a) a polymer derived from ethylene polymer derived from at least one polar monomer with one or more ester groups, which polymerize with ethylene, and (b) a rosin ester having a hydroxyl number and an $M_z$ value and a sulfur content, wherein the rosin ester has a hydroxyl number of seven or less, and wherein the rosin ester has a $M_z$ value between 2500 and 12000, wherein the obtained stripped rosin ester after the esterification reaction, prior to adding any sulfur-containing antioxidant or sulfur containing additive, has a first sulfur ppm content value, and wherein the rosin has a second sulfur ppm content value, and wherein the first sulfur ppm content value minus the second sulfur ppm content value is lower than 200.

Claim 2: The composition of claim 1, wherein the first sulfur ppm content value minus the second sulfur ppm content value is lower than 100.

Claim 3: The composition of claim 1 or 2, wherein the first sulfur ppm content value is equal or lower than the second sulfur ppm content value.

Claim 4: The composition of claim 1-3, wherein the first sulfur ppm content value divided by the second sulfur ppm content value is equal or lower than 0.92.

Claim 5: The composition of claim 1-4, wherein the first sulfur ppm content value divided by the second sulfur ppm content value is equal or lower than 0.82.

Claim 6: The composition of claim 1-5, wherein the first sulfur ppm content value divided by the second sulfur ppm content value is equal or lower than 0.75.

Claim 7: The composition of claim 1-6, wherein the final reactant mixture prior to the start of the rosin ester synthesis contains a stoichiometric excess of carboxylic acid functionality as compared to the total stoichiometric amount of hydroxyl functionality.

Claim 8: The composition of claim 1-7, wherein the obtained rosin ester has a first sum of palladium, nickel and platinum ppm content value, and wherein the rosin has a second sum of palladium, nickel and platinum ppm content value, and wherein first sum of palladium, nickel and platinum ppm content value is lower or equal to the second sum of palladium, nickel and platinum ppm content value.

Claim 9: The composition of claim 1-8, wherein the obtained rosin ester has a first iodine ppm content value, and wherein the rosin has a second iodine ppm content value, and wherein first iodine ppm content value is lower or equal to the second iodine ppm content value.

Claim 10: The composition of claim 1-9, wherein the rosin ester has a hydroxyl number of five or less.

Claim 11: The composition of claim 1-10, wherein the rosin ester has a hydroxyl number of three or less.

Claim 12: The composition of claim 1-11, wherein the rosin ester has an acid number of fifteen or less.

Claim 13: The composition of any of claims 1-12, wherein the rosin ester has an acid number of ten or less.

Claim 14: The composition of any of claims 1-13, wherein the rosin ester has an acid number of five or less.

Claim 15: The composition of any of claims 1-14, wherein the sum of the hydroxyl number and the acid number is eighteen or less.

Claim 16: The composition of any of claims 1-15, wherein the sum of the hydroxyl number and the acid number is twelve or less.

Claim 17: The composition of any of claims 1-16, wherein the sum of the hydroxyl number and the acid number is eight or less.

Claim 18: The composition of any of claims 1-17, wherein the rosin ester has a PAN number of twenty-five or less.

Claim 19: The composition of any of claims 1-18, wherein the rosin ester has a PAN number in between eight and twenty-two.

Claim 20: The composition of any of claims 1-19, wherein the rosin ester has a PAN number in between eight and twenty.

Claim 21: The composition of any of claims 1-20, wherein the rosin ester is derived from tall oil rosin, gum rosin, wood rosin, or a combination thereof.

Claim 22: The composition of any of claims 1-21, wherein the rosin ester is derived from tall oil rosin.

Claim 23: The composition of any of claims 1-22, wherein the rosin ester is derived from gum rosin.

Claim 24: The composition of any of claims 1-23, wherein the rosin ester has a Gardner color of ten or less.

Claim 25: The composition of any of claims 1-24, wherein the rosin ester has a Gardner color of six or less.

Claim 26: The composition of any of claims 1-25, wherein the rosin ester is derived from a polyhydric alcohol having 2 to 30 carbon atoms and having two to ten average hydroxyl functionality, including ethylene glycol, propylene glycol, diethylene glycol, triethylene glycol, tetraethylene glycol, trimethylene glycol, 4,4'-isopropylidenedicyclohexanol, 1,4-cyclohexanedimethanol, 2,2,4,4-tetramethyl-1,3-cyclobutanediol, 4,8-bis(hydroxymethyl)tricyclo[$5.2.1.0^{2,6}$] decane, glycerol, diglycerol, polyglycerol, polyglycerol-2, polyglycerol-3, polyglycerol-4, trimethylolpropane, trimethylolethane, pentaerythritol, dipentaerythritol, tripentaerythritol, mannitol, sorbitol, xylitol, and combinations thereof.

Claim 27: The composition of any of claims 1-26, wherein the rosin ester is derived from a polyhydric alcohol comprising ethylene glycol, propylene glycol, diethylene glycol, triethylene glycol, tetraethylene glycol, trimethylene glycol, glycerol, diglycerol, polyglycerol, trimethylolpropane, trimethylolethane, pentaerythritol, dipentaerythritol, tripentaerythritol, mannitol, and combinations thereof.

Claim 28: The composition of any of claims 1-27, wherein the rosin ester is derived from a polyhydric alcohol comprising, glycerol, diglycerol, polyglycerol, trimethylolpropane, pentaerythritol, dipentaerythritol, tripentaerythritol, and combinations thereof.

Claim 29: The composition of any of claims 1-28, wherein the rosin ester is derived from pentaerythritol.

Claim 30: The composition of any of claims 1-29, wherein the rosin ester is derived from an alcohol, a rosin and more than zero up to 10 weight %, by weight of all reactants, of one or more carboxylic acid functional organic compounds.

Claim 31: The composition of any of claims 1-30, wherein the rosin ester is derived from an alcohol, a rosin and more than zero up to 10 weight %, by weight of all reactants, of one or more carboxylic acid functional organic compounds, wherein the rosin ester is not derived from a dienophile or enophile fortified rosin, and wherein the rosin ester is not derived from a fortified rosin which is derived from an unsaturated carboxylic acid functional organic compound which can thermally isomerize into a dienophile or enophile, and wherein the more than zero up to 10 weight %, by weight of all reactants, of one or more carboxylic acid functional organic compounds does neither include a dienophile, nor an enophile, nor an unsaturated carboxylic acid functional organic compound which thermally isomerizes into a dienophile or enophile.

Claim 32: The composition of any of claims 1-31, wherein the rosin ester is derived from an alcohol, a rosin and more than zero up to 10 weight %, by weight of all reactants, of one or more carboxylic acid functional organic compounds wherein the one or more carboxylic acid functional organic compounds have an average number of rotatable bonds of twelve or less than twelve.

Claim 33: The composition of any of claims 1-32, wherein the rosin ester is derived from an alcohol, a rosin and more than zero up to 10 weight %, by weight of all reactants, of one or more carboxylic acid functional organic compounds and wherein the sum of one or more applied carboxylic acid monofunctional organic compounds is less than 1 weight %, by weight of all reactants.

Claim 34: The composition of any of claims 1-33, wherein the rosin ester is derived from an alcohol, a rosin and from 2.5 to 10 weight %, by weight of all reactants, of one or more carboxylic acid functional organic compounds.

Claim 35: The composition of any of claims 1-34, wherein the rosin ester is derived from an alcohol, a rosin and from 3 to 10 weight %, by weight of all reactants, of one or more carboxylic acid functional organic compounds.

Claim 36: The composition of any of claims 1-35, wherein the rosin ester is derived from an alcohol, a rosin and from 3.5 to 10 weight %, by weight of all reactants, of one or more carboxylic acid functional organic compounds.

Claim 37: The composition of any of claims 1-36, wherein the rosin ester is derived from an alcohol, a rosin and from 4 to 10 weight %, by weight of all reactants, of one or more carboxylic acid functional organic compounds.

Claim 38: The composition of any of claims 1-37, wherein the rosin ester is derived from an alcohol, a rosin and from 4.5 to 10 weight %, by weight of all reactants, of one or more carboxylic acid functional organic compounds.

Claim 39: The composition of any of claims 1-38, wherein the rosin ester is derived from an alcohol, a rosin and from 5 to 10 weight %, by weight of all reactants, of one or more carboxylic acid functional organic compounds.

Claim 40: The composition of any of claims 1-39, wherein the rosin ester is derived from an alcohol, a rosin and more than zero up to 10 weight %, by weight of all reactants, of one or more carboxylic acid functional organic compounds wherein one of the applied carboxylic acid functional organic compounds is a dicarboxylic acid or polycarboxylic acid.

Claim 41: The composition of any of claims 1-40, wherein the rosin ester is derived from an alcohol, a rosin and more than zero up to 10 weight %, by weight of all reactants, of one or more dicarboxylic acid functional organic compounds.

Claim 42: The composition of any of claims 1-41, wherein the rosin ester is derived from an alcohol, a rosin and more than zero up to 10 weight %, by weight of all reactants, of one or more dicarboxylic acids in which dicarboxylic acid molecular formulas the number of hydrogen atoms is higher than the number of carbon atoms, or wherein one of the dicarboxylic acids represents oxalic acid.

Claim 43: The composition of any of claims 1-42, wherein the rosin ester is derived from an alcohol, a rosin and more than zero up to 10 weight %, by weight of all reactants of one or more aliphatic dicarboxylic acids or cycloaliphatic dicarboxylic acids.

Claim 44: The composition of any of claims 1-43, wherein the rosin ester is derived from an alcohol, a rosin and more than zero up to 10 weight %, by weight of all reactants, of one or more aliphatic dicarboxylic acids or cycloaliphatic dicarboxylic acids, in which dicarboxylic acid molecular formulas the number of carbon atoms is in between 2 and 22 or in which dicarboxylic acid molecular formulas the number of carbon atoms is 40.

Claim 45: The composition of any of claims 1-44, wherein the rosin ester is derived from an alcohol, a rosin and more than zero up to 10 weight %, by weight of all reactants of malonic acid, succinic acid, glutaric acid, adipic acid, pimelic acid, suberic acid, azelaic acid, sebacic acid, undecanedioic acid, dodecanedioic acid, hexadecanedioic acid, 1,2-cyclohexanedicarboxylic acid, 1,3-cyclohexanedicarboxylic acid, 1,4-cyclohexanedicarboxylic acid, 3-methyladipic acid, polymerized rosin, rosin dimer, mercusic acid, or combinations of these acids.

Claim 46: The composition of any of claims 1-45, wherein the rosin ester is derived from an alcohol, a rosin and more than zero up to 10 weight %, by weight of all reactants of malonic acid, succinic acid, glutaric acid, adipic acid, pimelic acid, suberic acid, azelaic acid, sebacic acid, undecanedioic acid, dodecanedioic acid, hexadecanedioic acid, 1,2-cyclohexanedicarboxylic acid, 1,3-cyclohexanedicarboxylic acid, 1,4-cyclohexanedicarboxylic acid, or combinations of these acids.

Claim 47: The composition of any of claims 1-46, wherein the rosin ester is derived from an alcohol, a rosin and more than zero up to 10 weight %, by weight of all reactants of succinic acid, glutaric acid, adipic acid, sebacic acid, or 1,4-cyclohexanedicarboxylic acid, or combinations of these acids.

Claim 48: The composition of any of claims 1-47, wherein the rosin ester is derived from an alcohol, a rosin and more than zero (or at least 2, or 2.5 or 3 or 4 up to 10 weight %), by weight of all reactants of adipic acid or 1,4-cyclohexanedicarboxylic acid, or combinations of these acids.

Claim 49: The composition of any of claims 1-48, wherein the rosin ester is derived from an alcohol, a rosin and more than zero up to 10 weight %, by weight of all reactants of adipic acid.

Claim 50: The composition of any of claims 1-49, wherein the rosin ester is derived from an alcohol, a rosin and in between 2.5 and 8 weight %, by weight of all reactants of adipic acid.

Claim 51: The composition of any of claims 1-50, wherein the rosin ester is derived from an alcohol, a rosin and in between 3.5 and 7 weight %, by weight of all reactants of adipic acid.

Claim 52: The composition of any of claims 1-51 wherein the rosin ester $M_z$ value is in between 2500 and 12000 g/mol.

Claim 53: The composition of any of claims 1-52, wherein the rosin ester $M_z$ value is in between 3000 and 8000 g/mol.

Claim 54: The composition of any of claims 1-53, wherein the rosin ester $M_z$ value is in between 4000 and 7500 g/mol.

Claim 55: The composition of any of claims 1-54, wherein the rosin ester $M_w$ value is in between 1700 and 4000 g/mol.

Claim 56: The composition of any of claims 1-55, wherein the rosin ester $M_w$ value is in between 2000 and 3500 g/mol.

Claim 57: The composition of any of claims 1-56, wherein the rosin ester $M_w$ value is in between 2100 and 3300 g/mol.

Claim 58: The composition of any of claims 1-57, wherein the rosin ester $M_n$ value is in between 1100 and 2000 g/mol.

Claim 59: The composition of any of claims 1-58, wherein the rosin ester $M_n$ value is in between 1400 and 1800 g/mol.

Claim 60: The composition of any of claims 1-59, wherein the rosin ester $M_n$ value is in between 1450 and 1700 g/mol.

Claim 61: The composition of any of claims 1-60, wherein the rosin ester is not based on a fumaric acid or maleic acid or citraconic acid or mesaconic acid or itaconic acid or maleic anhydride or acrylic acid fortified rosin.

Claim 62: The composition of any of claims 1-61, wherein the rosin ester is not based on an aromatic diacid or phenol or formaldehyde as one of the applied reactants.

Claim 63: The composition of any of claims 1-62, wherein the rosin hydrolysate as obtained from the rosin ester has a tetrahydroabietic acid content of less than 10% by weight, based upon the weight of the rosin ester.

Claim 64: The composition of any of claims 1-63, wherein the rosin hydrolysate as obtained from the rosin ester has a tetrahydroabietic acid content of less than 5% by weight, based upon the weight of the rosin ester.

Claim 65: The composition of any of claims 1-64, wherein the rosin hydrolysate as obtained from the rosin ester has a dehydroabietic acid content of less than 40% by weight, based upon the weight of the rosin ester.

Claim 66: The composition of any of claims 1-65, wherein the rosin hydrolysate as obtained from the rosin ester has a dehydroabietic acid content of less than 30% by weight, based upon the weight of the rosin ester.

Claim 67: The composition of any of claims 1-66, wherein the rosin ester has a softening point higher than 100° C.

Claim 68: The composition of any of claims 1-67, wherein the rosin ester has a softening point higher than 100° C. and lower than 116° C.

Claim 69: The composition of any of claims 1-68, wherein the rosin ester has a softening point higher than 105.3° C. and lower than 113° C.

Claim 70: The composition of any of claims 1-69, wherein the rosin ester has a softening point higher than 105.3° C. and lower than 110° C.

Claim 71: The composition of any of claims 1-70, wherein the polar monomer comprises a vinyl alkanoate monomer, acrylate ester monomer, methacrylate ester monomer, or mixtures thereof.

Claim 72: The composition of any of claims 1-71, wherein the polymer derived from ethylene polymer, derived from at least one polar monomer with one or more ester groups, which polymerize with ethylene, has a melt index value of 400 grams/10 minutes or higher.

Claim 73: The composition of any of claims 1-72, wherein the polymer derived from ethylene polymer, derived from at least one polar monomer with one or more ester groups, which polymerize with ethylene, has a melt index value of 750 grams/10 minutes or higher.

Claim 74: The composition of any of claims 1-73, wherein the polymer derived from ethylene polymer, derived from at least one polar monomer with one or more ester groups, which polymerize with ethylene, has a melt index value of 900 grams/10 minutes or higher.

Claim 75: The composition of any of claims 1-74, wherein the vinyl alkanoate monomer comprises a monomer selected from the group consisting of vinyl acetate, vinyl propionate, vinyl laurate, and combinations thereof.

Claim 76: The composition of any of claims 1-75, wherein the acrylate ester monomer is derived from the reaction of acrylate esters with methanol, ethanol, propanol, butanol or other alcohols, and the methacrylate ester monomer is derived from the reaction of methacrylate esters with methanol, ethanol, propanol, butanol or other alcohols.

Claim 77: The composition of any of claims 1-76, wherein the acrylate ester monomer comprises n-butyl acrylate, methyl acrylate, ethyl acrylate, 2-ethyl hexyl acrylate or mixtures thereof, and the methacrylate ester monomer comprises methyl methacrylate, ethyl methacrylate, or mixtures thereof.

Claim 78: The composition of any of claims 1-77, wherein the acrylate ester monomer is n-butyl acrylate.

Claim 79: The composition of any of claims 1-78, wherein the polymer is a copolymer derived from 5% by weight to 75% by weight vinyl acetate, based on the total weight of all of the monomers polymerized to form the polymer.

Claim 80: The composition of any of claims 1-79, wherein the polymer is a copolymer derived from 10% by weight to 40% by weight vinyl acetate, based on the total weight of all of the monomers polymerized to form the polymer.

Claim 81: The composition of any of claims 1-80, wherein the polymer is a copolymer derived from 17% by weight to 34% by weight vinyl acetate, based on the total weight of all of the monomers polymerized to form the polymer.
Claim 82: The composition of any of claims 1-81, wherein the polymer is poly(ethylene-co-vinyl acetate).
Claim 83: The composition of any of claims 1-82, wherein the polymer is a copolymer derived from 5% by weight to 75% by weight n-butyl acrylate, based on the total weight of all of the monomers polymerized to form the polymer.
Claim 84: The composition of any of claims 1-83, wherein the polymer is a copolymer derived from 10% by weight to 50% by weight n-butyl acrylate, based on the total weight of all of the monomers polymerized to form the polymer.
Claim 85: The composition of any of claims 1-84, wherein the polymer is a copolymer derived from 30% by weight to 45% by weight n-butyl acrylate, based on the total weight of all of the monomers polymerized to form the polymer.
Claim 86: The composition of any of claims 1-85, wherein the polymer is ethylene n-butyl acrylate.
Claim 87: The composition of any of claims 1-86, wherein applied polymers are ethylene n-butyl acrylate and poly(ethylene-co-vinyl acetate).
Claim 88: The composition of any of claims 1-87, wherein applied polymers are ethylene n-butyl acrylate and poly(ethylene-co-vinyl acetate) and wherein at least one of the polymers has a melt index of at least about 750 grams/10 minutes.
Claim 89: The composition of any of claims 1-88, wherein applied polymers are ethylene n-butyl acrylate and poly(ethylene-co-vinyl acetate) and wherein at least one of the polymers has a melt index of at least about 900 grams/10 minutes.
Claim 90: The composition of any of claims 1-89, further comprising one or more waxes.
Claim 91: The composition of any of claims 1-90, further comprising one or more antioxidants.
Claim 92: The composition any of claims 1-91, wherein the neat Gardner color value of the combined molten reactants that are applied in the rosin ester synthesis is lower than the neat Gardner color value of the synthesized rosin ester.
Claim 93: The composition of any of claims 1-92, wherein the hot-melt adhesive heat resistance pass temperature as compared with a SYLVALITE™ RE 118 based composition does not differ more than 4° C.
Claim 94: The composition of any of claims 1-93, wherein the hot-melt adhesive heat resistance pass temperature as compared with a SYLVALITE™ RE 118 based composition does not differ more than 2° C.
Claim 95: The composition of any of claims 1-94, wherein the hot-melt adhesive heat resistance pass temperature is higher as compared with a SYLVALITE™ RE 118 based composition.
Claim 96: The composition of any of claims 1-95, wherein the hot-melt adhesive heat resistance pass temperature as compared with a SYLVALITE™ RE 110L based composition does not differ more than 4° C.
Claim 97: The composition of any of claims 1-96, wherein the hot-melt adhesive heat resistance pass temperature is higher as compared with a SYLVALITE™ RE 110L based composition.
Claim 98: The composition of any of claims 1-97, wherein the hot-melt adhesive heat resistance pass temperature is higher as compared with a SYLVALITE™ RE 105L based composition.
Claim 99: The composition of any of claims 1-98, wherein the rosin ester comprising 0.08% of Irganox™ 565 antioxidant based on applied rosin weight has an oxidative-induction time peak onset value greater than 10 minutes as measured at 130° C. and wherein the rosin ester has been produced without applying a disproportionation catalyst and without a dienophile or enophile as reactant.
Claim 100: The composition of any of claims 1-99, wherein the rosin ester comprising 0.08% of Irganox™ 565 antioxidant based on applied rosin weight has an oxidative-induction time peak maximum value greater than 15 minutes as measured at 130° C. and wherein the rosin ester has been produced without applying a disproportionation catalyst and without a dienophile or enophile as reactant.
Claim 101: The composition of any of claims 1-100, wherein the chemical reactants which are applied in the rosin ester synthesis are listed on the Regulation (EU) No. 10/2011 on plastic materials and articles intended to come into contact with food.
Claim 102: The composition of any of claims 1-101, wherein the rosin ester comprises less than 800 ppm sulfur.
Claim 103: The composition of any of claims 1-102, wherein the rosin ester comprises less than 600 ppm sulfur.
Claim 104: The composition of any of claims 1-103, wherein the rosin ester comprises less than 400 ppm sulfur.
Claim 105: The composition of any of claims 1-104, wherein the rosin ester comprises less than 100 ppm sulfur.
Claim 106: A composition comprising,
(a) a polymer or polymer blend wherein applied polymers are ethylene n-butyl acrylate and/or poly(ethylene-co-vinyl acetate), and
(b) a rosin ester derived from tall oil rosin wherein the rosin ester has a hydroxyl number of seven or less and the rosin ester has a $M_z$ value between 2500 and 12000 g/mol, and wherein the obtained stripped rosin ester after the esterification reaction, prior to adding any sulfur-containing antioxidant or sulfur containing additive, has a first sulfur ppm content value, and wherein the rosin has a second sulfur ppm content value, and wherein the first sulfur ppm content value is lower than the second sulfur ppm content value.
Claim 107: The composition of claim 106, wherein the rosin ester has a PAN number in between eight and twenty.
Claim 108: The composition of claim 106 or 107, wherein the rosin ester has a PAN number in between ten and fifteen.
Claim 109: The composition of any one of claims 106-108, wherein the rosin ester has a hydroxyl number of five or less.
Claim 110: The composition of any one of claims 106-109, wherein the rosin ester has a hydroxyl number of three or less.
Claim 111: The composition of any one of claims 106-110, wherein the rosin ester comprises more than one type of rosin ester.
Claim 112: A hot-melt adhesive comprising,
(a) 20% by weight to 60% by weight of a of poly(ethylene-co-vinyl acetate) or ethylene n-butylacrylate copolymer, based on the total weight of the hot-melt adhesive, and
(b) 20% by weight to 50% by weight of a rosin ester derived from tall oil rosin, based on the total weight of the hot-melt adhesive,
wherein the rosin ester has a hydroxyl number of five or less and the rosin ester has a $M_z$ value between 2500 and 12000, and wherein the obtained stripped rosin ester after the esterification reaction, prior to adding any sulfur-containing antioxidant or sulfur containing additive, has a first sulfur ppm content value, and wherein the rosin has a second sulfur ppm content value, and wherein the first sulfur ppm content value is lower than the second sulfur ppm content value.
Claim 113: The composition of claim 112, wherein the rosin ester has a PAN number in between eight and twenty-two.

Claim 114: The composition of any of claim 112 or 113, wherein the rosin ester has a PAN number in between ten and fifteen.

Claim 115: The composition of any of claims 112-104, wherein the rosin ester has a hydroxyl number of five or less.

Claim 116: The composition of claim 112-115, wherein the rosin ester has a hydroxyl number of three or less.

Claim 117: A hot-melt adhesive comprising,
(a) 20% by weight to 60% by weight of a of poly(ethylene-co-vinyl acetate) and ethylene n-butylacrylate copolymer blend, based on the total weight of the hot-melt adhesive, and
(b) 20% by weight to 50% by weight of a rosin ester derived from tall oil rosin, based on the total weight of the hot-melt adhesive,
wherein the rosin ester has a hydroxyl number of five or less and the rosin ester has a $M_z$ value between 2500 and 12000, and the obtained stripped rosin ester after the esterification reaction, prior to adding any sulfur-containing antioxidant or sulfur containing additive, has a first sulfur ppm content value, and wherein the rosin has a second sulfur ppm content value, and wherein the first sulfur ppm content value is lower than the second sulfur ppm content value.

Claim 118: The composition of claim 117, wherein the rosin ester has a PAN number in between eight and twenty.

Claim 119: The composition of any of claims 117-118, wherein the rosin ester has a PAN number in between ten and fifteen.

Claim 120: The composition of any of claims 117-119, wherein the rosin ester has a hydroxyl number of five or less.

Claim 121: The composition of any of claims 117-120, wherein the rosin ester has a hydroxyl number of three or less.

Claim 122: A thermoplastic road marking formulation comprising,
(a) up to 10% by weight of ethylene polymer derived from at least one polar monomer with one or more ester groups, which polymerize with ethylene based on the total weight of the thermoplastic road marking formulation, and
(b) 5% by weight to 25% by weight of a rosin ester derived from tall oil rosin based on the total weight of the thermoplastic road marking formulation, wherein the rosin ester has a hydroxyl number of five or less, and wherein the rosin ester has a $M_z$ value between 2500 and 12000, and wherein the obtained stripped rosin ester after the esterification reaction, prior to adding any sulfur-containing antioxidant or sulfur containing additive, has a first sulfur ppm content value, and wherein the rosin has a second sulfur ppm content value, and wherein the first sulfur ppm content value is lower than the second sulfur ppm content value.

Claim 123: The composition of claim 122, wherein the rosin ester has a PAN number in between eight and twenty.

Claim 124: The composition of any of claims 122-123, wherein the rosin ester has a PAN number in between ten and fifteen.

Claim 125: The composition of any of claims 122-124, wherein the rosin ester has a hydroxyl number of five or less.

Claim 126: The composition of any of claims 122-125, wherein the rosin ester has a hydroxyl number of three or less.

Claim 127: A method for preparing a hot-melt adhesive comprising, mixing ethylene polymer derived from at least one polar monomer with one or more ester groups, which polymerize with ethylene, and a rosin ester wherein the rosin ester has a hydroxyl number of five or less, and wherein the rosin ester has a $M_z$ value between 2500 and 12000, and wherein the obtained stripped rosin ester after the esterification reaction, prior to adding any sulfur-containing antioxidant or sulfur containing additive, has a first sulfur ppm content value, and wherein the rosin has a second sulfur ppm content value, and wherein the first sulfur ppm content value is lower than the second sulfur ppm content value.

Claim 128: The method of claim 127, wherein the rosin ester has a PAN number in between eight and twenty.

Claim 129: The method of any of claims 127-128, wherein the rosin ester has a PAN number in between ten and fifteen.

Claim 130: The method of any of claims 127-129, wherein the rosin ester has a hydroxyl number of five or less.

Claim 131: The method of any of claims 127-130, wherein the rosin ester has a hydroxyl number of three or less.

Claim 132: The method of any of claims 127-131, wherein the rosin ester comprises more than one type of rosin ester.

Claim 133: A composition comprising, (a) ethylene polymer derived from at least one polar monomer with one or more ester groups, which polymerize with ethylene, and (b) a rosin ester derived from rosin, wherein the rosin ester has a hydroxyl number of five or less and the rosin ester has a $M_z$ value between 2500 and 12000, and wherein the obtained stripped rosin ester after the esterification reaction, prior to adding any sulfur-containing antioxidant or sulfur containing additive, has a first sulfur ppm content value, and wherein the rosin has a second sulfur ppm content value, and wherein the first sulfur ppm content value is lower than the second sulfur ppm content value.

Claim 134: The composition of claim 133, wherein the rosin ester has a PAN number in between eight and twenty.

Claim 135: The composition of any of claims 133-134, wherein the rosin ester has a PAN number in between ten and fifteen.

Claim 136: The composition of any of claims 133-135, wherein the rosin ester has a hydroxyl number of five or less.

Claim 137: The composition of any of claims 133-136, wherein the rosin ester has a hydroxyl number of three or less.

Claim 138: The composition of any of claims 133-137 wherein the rosin ester comprises more than one type of rosin ester and wherein at least one of the rosin esters is derived from tall oil rosin.

Claim 139: A composition comprising a rosin ester having a hydroxyl number and an $M_z$ value, wherein the rosin ester has a hydroxyl number of nine or less, and wherein the rosin ester has a $M_z$ value between 2500 and 12000 g/mol, and wherein the obtained stripped rosin ester after the esterification reaction, prior to adding any sulfur-containing antioxidant or sulfur containing additive, has a first sulfur ppm content value, and wherein the rosin has a second sulfur ppm content value, and wherein the first sulfur ppm content value is lower than the second sulfur ppm content value and wherein the final reactant mixture prior to the start of the rosin ester synthesis contains a stoichiometric excess of carboxylic acid functionality as compared to the total stoichiometric amount of hydroxyl functionality.

Claim 140: The composition of claim 139, wherein the rosin ester has a hydroxyl number of five or less.

Claim 141: The composition of claim 139 or 140, wherein the rosin ester has a hydroxyl number of three or less.

Claim 142: The composition of any of claims 139-141, wherein the rosin ester has an acid number of fifteen or less.

Claim 143: The composition of any of claims 139-142, wherein the rosin ester has an acid number of ten or less.

Claim 144: The composition of any of claims 139-143, wherein the rosin ester has an acid number of five or less.

Claim 145: The composition of any of claims 139-144, wherein the sum of the hydroxyl number and the acid number is eighteen or less.
Claim 146: The composition of any of claims 139-145, wherein the sum of the hydroxyl number and the acid number is twelve or less.
Claim 147: The composition of any of claims 139-146, wherein the sum of the hydroxyl number and the acid number is eight or less.
Claim 148: The composition of any of claims 139-147, wherein the rosin ester has a PAN number of twenty-two or less.
Claim 149: The composition of any of claims 139-148, wherein the rosin ester has a PAN number in between eight and twenty.
Claim 150: The composition of any of claims 139-149, wherein the rosin ester has a PAN number in between ten and fifteen.
Claim 151: The composition of any of claims 139-150, wherein the rosin ester $M_z$ value is in between 2500 and 12000 g/mol.
Claim 152: The composition of any of claims 139-151, wherein the rosin ester $M_z$ value is in between 3000 and 8000 g/mol.
Claim 153: The composition of any of claims 139-152, wherein the rosin ester $M_z$ value is in between 4000 and 7500 g/mol.
Claim 154: The composition of any of claims 139-153, wherein the rosin ester $M_w$ value is in between 1700 and 4000 g/mol.
Claim 155: The composition of any of claims 139-154, wherein the rosin ester $M_w$ value is in between 2000 and 3500 g/mol.
Claim 156: The composition of any of claims 139-155, wherein the rosin ester $M_w$ value is in between 2100 and 3300 g/mol.
Claim 157: The composition of any of claims 139-156, wherein the rosin ester $M_n$ value is in between 1200 and 2000 g/mol.
Claim 158: The composition of any of claims 139-157, wherein the rosin ester $M_n$ value is in between 1400 and 1800 g/mol.
Claim 159: The composition of any of claims 139-158, wherein the rosin ester $M_n$ value is in between 1450 and 1700 g/mol.
Claim 160: The composition of any of claims 139-159, wherein the rosin ester comprises less than 800 ppm sulfur.
Claim 161: The composition of any of claims 139-160, wherein the rosin ester comprises less than 600 ppm sulfur.
Claim 162: The composition of any of claims 139-161, wherein the rosin ester comprises less than 400 ppm sulfur.
Claim 163: The composition of any of claims 139-162, wherein the rosin ester comprises less than 100 ppm sulfur.
Claim 164: A rosin ester composition having a hydroxyl number and an $M_z$ value and a sulfur content, wherein the rosin ester has a hydroxyl number of seven or less, and wherein the rosin ester has a $M_z$ value between 2500 and 12000 g/mol, and wherein the obtained stripped rosin ester after the esterification reaction, prior to adding any sulfur-containing antioxidant or sulfur containing additive, has a first sulfur ppm content value, and wherein the rosin has a second sulfur ppm content value, and wherein the first sulfur ppm content value minus the second sulfur ppm content value is lower than 200.
Claim 165: The composition of claim 164, wherein the first sulfur ppm content value minus the second sulfur ppm content value is lower than 100.
Claim 166: The composition of claim 164 or 165, wherein the first sulfur ppm content value is lower than the second sulfur ppm content value.
Claim 167: The composition of any of any one of claims 164-166, wherein the first sulfur ppm content value divided by the second sulfur ppm content value is equal or lower than 0.92.
Claim 168: The composition of any one of claims 164-167, wherein the first sulfur ppm content value divided by the second sulfur ppm content value is equal or lower than 0.82.
Claim 169: The composition of any one of claims 164-168, wherein the first sulfur ppm content value divided by the second sulfur ppm content value is equal or lower than 0.75.
Claim 170: The composition of any one of claims 164-169, wherein the final reactant mixture prior to the start of the reaction contains a stoichiometric excess of carboxylic acid functionality as compared to the total stoichiometric amount of hydroxyl functionality.
Claim 171: The composition of any one of claims 164-170, wherein the obtained rosin ester has a first sum of palladium, nickel and platinum ppm content value, and wherein the rosin has a second sum of palladium, nickel and platinum ppm content value, and wherein first sum of palladium, nickel and platinum ppm content value is lower or equal to the second sum of palladium, nickel and platinum ppm content value.
Claim 172: The composition of any one of claims 164-171, wherein the obtained rosin ester has a first iodine ppm content value, and wherein the rosin has a second iodine ppm content value, and wherein first iodine ppm content value is lower or equal to the second iodine ppm content value.
Claim 173: The composition of any one of claims 164-172, wherein the rosin ester is produced from an alcohol, a rosin and more than zero up to 10 weight %, by weight of all reactants, of one or more carboxylic acid functional organic compounds.
Claim 174: The composition of any one of claims 164-173, wherein the neat Gardner color value of the combined molten reactants that are applied in the rosin ester synthesis is lower than the neat Gardner color value of the synthesized rosin ester.
Claim 175: The composition of any one of claims 164-174, wherein the rosin ester has a hydroxyl number of five or less.
Claim 176: The composition of any one of claims 164-175, wherein the rosin ester has a hydroxyl number of three or less.
Claim 177: The compositions of any one of claims 164-176, wherein the rosin ester has an acid number of fifteen or less.
Claim 178: The composition of any one of claims 164-177, wherein the rosin ester has an acid number of ten or less.
Claim 179: The composition of any of claims 164-178, wherein the rosin ester has a PAN number in between eight and twenty.
Claim 180: The composition of any of claims 164-179, wherein the rosin ester has a PAN number in between ten and fifteen.
Claim 181: The composition of any of claims 164-180, the rosin ester comprises less than 800 ppm sulfur.
Claim 182: The composition of any of claims 164-181, the rosin ester comprises less than 600 ppm sulfur.
Claim 183: The composition of any of claims 164-182, the rosin ester comprises less than 400 ppm sulfur.
Claim 184: The composition of any of claims 164-183, the rosin ester comprises less than 100 ppm sulfur.
Claim 185: The composition of any of claims 164-184, wherein the rosin ester comprises less than 50 ppm sulfur.

Claim 186: The composition of any of claims 164-185, wherein the rosin ester comprises less than 20 ppm sulfur.
Claim 187: The composition of any of claims 164-186, wherein the rosin ester is derived from gum rosin.
Claim 188: The composition of any of claims 164-187, wherein the rosin ester is derived from hydrogenated gum rosin.
Claim 189: A method of making a rosin ester comprising; contacting a rosin and other optional reactants which contain at least one carboxylic acid moiety with an alcohol at a temperature of at least 170° C. and esterifying at a maximum temperature of 290-300° C. in the absence or presence of an esterification catalyst and in the absence of a disproportionation catalyst, or with a maximum amount of 0.05% by weight of all reactants of a disproportionation catalyst.
Claim 190: The method of claim 189, wherein the rosin ester is derived from tall oil rosin, gum rosin, wood rosin, or a combination thereof.
Claim 191: The method of any of claims 189-190, wherein the rosin ester is derived from tall oil rosin comprising SYLVAROS® 85, SYLVAROS® 90, SYLVAROS® HYR and SYLVAROS® NCY.
Claim 192: The method of any of claims 189-191, wherein the rosin ester is derived from gum rosin comprising *Pinus* species, including *Pinus elliottii, Pinus merkusii, Pinus tropicana*, and *Pinus massoniana*.
Claim 193: The method of any of claims 189-192, wherein the rosin ester is derived from hydrogenated gum rosin.
Claim 194: The method of any one of claims 189-193, wherein the final reactant mixture prior to the start of the rosin ester synthesis contains a stoichiometric excess of carboxylic acid functionality as compared to the total stoichiometric amount of hydroxyl functionality.
Claim 195: The method of any one of claims 189-194, wherein the esterifying is conducted in the presence of Irganox® 1425 as the esterification catalyst.
Claim 196: The method of any one of claims 189-195, wherein the at least one carboxylic acid moiety comprises at least one aliphatic dicarboxylic acid or at least one cycloaliphatic dicarboxylic acid.
Claim 197: The method of any one of claims 189-196, wherein the at least one carboxylic acid moiety with alcohol comprises at least adipic acid with pentaerythritol, or at least 1,4-cyclohexanedicarboxylic acid with pentaerythritol, or at least polymerized rosin with pentaerythritol.
Claim 198: The method of any one of claims 189-197, wherein the at least one carboxylic acid moiety comprises at least adipic acid with pentaerythritol, or at least 1,4-cyclohexanedicarboxylic acid with pentaerythritol.
Claim 199: A rosin ester composition comprising, esterified dehydroabietic acid in an amount of 40% or less by weight based upon the weight of the rosin ester, and wherein the rosin ester has a PAN number between 8 and 25.
Claim 200: The composition of claim 199, wherein the rosin ester has a PAN number in between 8.5 and 25.
Claim 201: The composition of any of claims 199-200, wherein the rosin ester has a PAN number in between 9 and 25.
Claim 202: The composition of any of claims 199-201, wherein the rosin ester has a PAN number in between 9.5 and 25.
Claim 203: The composition of any of claims 199-202, wherein the rosin ester has a PAN number in between 10 and 25.
Claim 204: The composition of any of claims 199-203, wherein the rosin hydrolysate as obtained from the rosin ester has a dehydroabietic acid content of less than 35% by weight, based upon the weight of the rosin ester.
Claim 205: The composition of any of claims 199-204, wherein the rosin hydrolysate as obtained from the rosin ester has a dehydroabietic acid content of less than 30% by weight, based upon the weight of the rosin ester.
Claim 206: The composition of any of claims 199-205 wherein the rosin hydrolysate as obtained from the rosin ester has a dehydroabietic acid content of less than 25% by weight, based upon the weight of the rosin ester.
Claim 207: The composition of any of claims 199-206 wherein the applied rosin is tall oil rosin.
Claim 208: A rosin ester composition having an $M_z$ value and a turbidity light transmission, wherein the rosin ester has a $M_z$ value between 2500 and 12000 g/mol, and wherein the rosin ester composition has a turbidimetric light transmission percentage that exceeds 75% within a temperature range of 80° C. to 180° C., after thermal aging at 177° C. for 10 hours.
Claim 209: The composition of claim 208, wherein the rosin ester $M_z$ value is in between 3000 and 8000 g/mol.
Claim 210: The composition of any of claims 208-209, wherein the rosin ester $M_z$ value is in between 4000 and 7500 g/mol.
Claim 211: The composition of any of claims 208-210, wherein the rosin ester $M_w$ value is in between 1700 and 4000 g/mol.
Claim 212: The composition of any of claims 208-211, wherein the rosin ester $M_w$ value is in between 2000 and 3500 g/mol.
Claim 213: The composition of any of claims 208-212 wherein the rosin ester $M_w$ value is in between 2100 and 3300 g/mol.
Claim 214: The composition of any of claims 208-213, wherein the rosin ester $M_n$ value is in between 1100 and 2000 g/mol.
Claim 215: The composition of any of claims 208-214, wherein the rosin ester $M_n$ value is in between 1400 and 1800 g/mol.
Claim 216: The composition of any of claims 208-215, wherein the rosin ester $M_n$ value is in between 1450 and 1700 g/mol.
Claim 217: The composition of any of claims 208-216, wherein the turbidimetric light transmission percentage exceeds 90% within a temperature range of 80° C. to 180° C., after thermal aging at 177° C. for 10 hours.
Claim 218: The composition of any of claims 208-217, wherein the turbidimetric light transmission percentage exceeds 75% at a temperature of 120° C., after thermal aging at 177° C. for 10 hours, or after thermal aging at 177° C. for 16 hours.
Claim 219: A rosin ester composition comprising, esterified dehydroabietic acid, wherein the rosin ester has a PAN number and the ratio of the amount of esterified dehydroabietic acid to the PAN number is less than 5.
Claim 220: The composition of claim 219, wherein the ratio of the amount of esterified dehydroabietic acid to the PAN number is less than 4.
Claim 221: The composition of any one of claim 219 or 220, wherein the ratio of the amount of esterified dehydroabietic acid to the PAN number is less than 3.
Claim 222: The composition of any one of claims 219-221, wherein the rosin ester has a PAN number in between 8 and 25.
Claim 223: The composition of any of claims 219-222, wherein the rosin ester has a PAN number in between 9 and 25.

Claim 224: The composition of any of claims 219-223, wherein the rosin ester has a PAN number in between 9.5 and 25.

Claim 225: The composition of any of claims 219-224, wherein the rosin ester has a PAN number in between 10 and 25.

Claim 226: The composition of any of claims 219-225, wherein the rosin hydrolysate as obtained from the rosin ester has a dehydroabietic acid content of less than 40% by weight, based upon the weight of the rosin ester.

Claim 227: The composition of any of claims 219-226, wherein the rosin hydrolysate as obtained from the rosin ester has a dehydroabietic acid content of less than 35% by weight, based upon the weight of the rosin ester.

Claim 228: The composition of any of claims 219-227, wherein the rosin hydrolysate as obtained from the rosin ester has a dehydroabietic acid content of less than 30% by weight, based upon the weight of the rosin ester.

Claim 229: The compositions or methods of claims 1-228, wherein the rosin ester is derived from tall oil rosin, gum rosin, wood rosin, or a combination thereof.

Claim 230: The compositions or methods of claim 229, wherein the rosin ester is derived from hydrogenated tall oil rosin, hydrogenated gum rosin, hydrogenated wood rosin, or a combination thereof.

Claim 231: The compositions or methods of claim 229 or 230, wherein the rosin ester is derived from hydrogenated gum rosin, or a combination of hydrogenated gum rosins.

Claim 232: An adhesive composition comprising the rosin esters of claims 139-188 and claims 199-231.

Claim 233: A composition comprising a rosin ester, wherein the composition heat resistance pass temperature as compared with a SYLVALITE™ RE 118 rosin ester based composition does not differ more than 4° C., and wherein the rosin reactant has not been reacted by means of a Diels-Alder reaction or Ene reaction prior to esterification, and wherein the rosin ester has an acid number of ten or less, and wherein the rosin ester has a hydroxyl number of nine or less, and wherein the rosin ester is derived from an alcohol, a rosin and more than 2 weight %, by weight of all reactants, of one or more dicarboxylic acid functional organic compounds, and wherein dicarboxylic acid molecular formulas the number of hydrogen atoms is higher than the number of carbon atoms.

Claim 234: The composition of claim 233, wherein the composition has a higher heat resistance pass temperature as compared with a SYLVALITE™ RE 110L rosin ester based composition.

Claim 235: The composition of claim 233 or 234, wherein the composition has a higher heat resistance pass temperature as compared with a SYLVALITE™ RE 118 rosin ester based composition.

Claim 236: The composition of any of claims 233-235, wherein the rosin ester is derived from an alcohol, a rosin and in between 2 and 25 weight %, by weight of all reactants, of one or more dicarboxylic acid functional organic compounds.

Claim 237: The composition of any of claims 233-236, wherein the rosin ester is derived from an alcohol, a rosin and in between 2 and 25 weight %, by weight of all reactants, of one or more dicarboxylic acid functional organic compounds wherein the one or more dicarboxylic acid functional organic compounds have an average number of rotatable bonds of twelve or less than twelve.

Claim 238: The composition of any of claims 233-237, wherein the rosin ester is derived from an alcohol, a rosin and in between 2 and 25 weight %, by weight of all reactants, of one or more dicarboxylic acid functional organic compounds wherein the one or more dicarboxylic acid functional organic compounds have two to twelve rotatable bonds.

Claim 239: The composition of any of claims 233-238, wherein the rosin ester is derived from in between 2 and 10 weight %, by weight of all reactants, of one or more dicarboxylic acid functional organic compounds.

Claim 240: The composition of any of claims 233-239, wherein the rosin reactant has not been reacted with formaldehyde and phenol prior to esterification.

Claim 241: The composition of any of claims 233-240, wherein the rosin ester has a $M_z$ value between 2500 and 12000.

Claim 242: The composition of any of claims 233-241, wherein the final reactant mixture prior to the start of the rosin ester synthesis contains a stoichiometric excess of carboxylic acid functionality as compared to the total stoichiometric amount of hydroxyl functionality.

Claim 243: The composition of any of claims 233-242, wherein the rosin ester has a softening point higher than 106° C.

Claim 244: The composition of any of claims 233-243, wherein the neat Gardner color value of the combined molten reactants that are applied in the rosin ester synthesis is lower than the neat Gardner color value of the synthesized rosin ester.

Claim 245: The composition of any of claims 233-244, wherein the obtained stripped rosin ester after the esterification reaction, prior to adding any sulfur-containing antioxidant or sulfur containing additive, has a first sulfur ppm content value, and wherein the rosin has a second sulfur ppm content value, and wherein the first sulfur ppm content value is equal to or lower than the second sulfur ppm content value.

Claim 246: The composition of any of claims 233-245, wherein the dicarboxylic acid is selected from succinic acid, adipic acid, 3-methyladipic acid, sebacic acid, polymerized rosin, rosin dimer, mercusic acid, 1,2-cyclohexanedicarboxylic acid, 1,3-cyclohexanedicarboxylic acid and 1,4-cyclohexanedicarboxylic acid.

Claim 247: The composition of any of claims 233-246, wherein the dicarboxylic acid is selected from adipic acid, 3-methyladipic acid, polymerized rosin, rosin dimer, and 1,4-cyclohexanedicarboxylic acid.

Claim 248: The composition of any of claims 233-247, wherein the rosin ester is derived from tall oil rosin.

Claim 249: The composition of any of claims 233-248, wherein the rosin ester is derived from a polyhydric alcohol having 2 to 30 carbon atoms and having two to ten average hydroxyl functionality, including ethylene glycol, propylene glycol, diethylene glycol, triethylene glycol, tetraethylene glycol, trimethylene glycol, 4,4'-isopropylidenedicyclohexanol, 1,4-cyclohexanedimethanol, 2,2,4,4-tetramethyl-1,3-cyclobutanediol, 4,8-bis(hydroxymethyl)tricyclo[5.2.1.0$^{2,6}$]decane, glycerol, diglycerol, polyglycerol, polyglycerol-2, polyglycerol-3, polyglycerol-4, trimethylolpropane, trimethylolethane, pentaerythritol, dipentaerythritol, tripentaerythritol, mannitol, sorbitol, xylitol, and combinations thereof.

Claim 250: The composition of any of claims 233-249, wherein the rosin ester is derived from pentaerythritol.

Claim 251: The composition of any of claims 233-250, which further comprises a polymer.

Claim 252: The composition of any of claims 233-251, which further comprises a wax.

Claim 253: The composition of any of claims 233-252, wherein the composition is a thermoplastic road marking formulation, a tire formulation or an adhesive formulation.

Claim 254: The composition of any of claims 233-253, wherein the composition is a hot-melt adhesive formulation.

Claim 255: A composition comprising a rosin ester, wherein the final reactant mixture prior to the start of the rosin ester synthesis contains a stoichiometric excess of carboxylic acid functionality as compared to the total stoichiometric amount of hydroxyl functionality, and
wherein the rosin reactant has not been fortified by means of a Diels-Alder reaction or Ene reaction prior to esterification, and wherein the rosin ester has an acid number of ten or less, and
wherein the rosin ester has a hydroxyl number of nine or less, and wherein the rosin ester is derived from an alcohol, a rosin and more than 2 weight %, by weight of all reactants, of one or more dicarboxylic acid functional organic compounds, and wherein the dicarboxylic acid molecular formulas the number of hydrogen atoms is higher than the number of carbon atoms.

Claim 256: The composition of claim 255, wherein the rosin ester is derived from in between 2 and 25 weight %, by weight of all reactants, of one or more dicarboxylic acid functional organic compounds.

Claim 257: The composition of claim 255 or 256, wherein the rosin ester is derived from an alcohol, a rosin and in between 2 and 25 weight %, by weight of all reactants, of one or more dicarboxylic acid functional organic compounds wherein the one or more dicarboxylic acid functional organic compounds have an average number of rotatable bonds of twelve or less than twelve.

Claim 258: The composition of any of claims 255-257, wherein the rosin ester is derived from an alcohol, a rosin and in between 2 and 25 weight %, by weight of all reactants, of one or more dicarboxylic acid functional organic compounds wherein the one or more dicarboxylic acid functional organic compounds have two to twelve rotatable bonds.

Claim 259: The composition of any of claims 255-258, wherein the rosin ester is derived from in between 2 and 10 weight %, by weight of all reactants, of one or more dicarboxylic acid functional organic compounds.

Claim 260: The composition of any of claims 255-259, wherein the rosin ester has a softening point higher than 106° C.

Claim 261: The composition of any of claims 255-260, wherein the neat Gardner color value of the combined molten reactants that are applied in the rosin ester synthesis is lower than the neat Gardner color value of the synthesized rosin ester.

Claim 262: The composition of any of claims 255-261, wherein n the rosin reactant has not been fortified by means of a reaction with formaldehyde and phenol prior to esterification.

Claim 263: The composition of any of claims 255-262, wherein the rosin ester has a $M_z$ value between 2500 and 12000 g/mol.

Claim 264: The composition of any of claims 255-263, wherein the obtained stripped rosin ester after the esterification reaction, prior to adding any sulfur-containing antioxidant or sulfur containing additive, has a first sulfur ppm content value, and wherein the rosin has a second sulfur ppm content value, and wherein the first sulfur ppm content value is equal to or lower than the second sulfur ppm content value.

Claim 265: The composition of any of claims 255-264, wherein the dicarboxylic acid is selected from succinic acid, adipic acid, 3-methyladipic acid, sebacic acid, polymerized rosin, rosin dimer, mercusic acid, 1,2-cyclohexanedicarboxylic acid, 1,3-cyclohexanedicarboxylic acid and 1,4-cyclohexanedicarboxylic acid.

Claim 266: The composition of any of claims 255-265, wherein the dicarboxylic acid is selected from adipic acid, 3-methyladipic acid, polymerized rosin, rosin dimer, and 1,4-cyclohexanedicarboxylic acid.

Claim 267: The composition of any of claims 255-266, wherein the rosin ester is derived from tall oil rosin.

Claim 268: The composition of any of claims 255-267, wherein the rosin ester is derived from a polyhydric alcohol having 2 to 30 carbon atoms and having two to ten average hydroxyl functionality, including ethylene glycol, propylene glycol, diethylene glycol, triethylene glycol, tetraethylene glycol, trimethylene glycol, 4,4'-isopropylidenedicyclohexanol, 1,4-cyclohexanedimethanol, 2,2,4,4-tetramethyl-1,3-cyclobutanediol, 4,8-bis(hydroxymethyl)tricyclo[5.2.1.0$^{2,6}$]decane, glycerol, diglycerol, polyglycerol, polyglycerol-2, polyglycerol-3, polyglycerol-4, trimethylolpropane, trimethylolethane, pentaerythritol, dipentaerythritol, tripentaerythritol, mannitol, sorbitol, xylitol, and combinations thereof.

Claim 269: The composition of any of claims 255-268, wherein the rosin ester is derived from pentaerythritol.

Claim 270: The composition of any of claims 255-269, which further comprises a polymer.

Claim 271: The composition of any of claims 255-270, which further comprises a wax.

Claim 272: The composition of any of claims 255-271, wherein the composition is a thermoplastic road marking formulation, a tire formulation or an adhesive formulation.

Claim 273: The composition of any of claims 255-272, wherein the composition is a hot-melt adhesive formulation.

Claim 274: A composition having a turbidity light transmission comprising a rosin ester having an $M_z$ value and an acid value, wherein the rosin ester has a $M_z$ value between 2500 and 12000 g/mol, and wherein the rosin ester has an acid value of 10 or less, and wherein the rosin ester has a hydroxyl number of nine or less, and wherein the rosin ester is derived from an alcohol, a rosin and more than 2 weight %, by weight of all reactants, of one or more dicarboxylic acid functional organic compounds, and wherein the dicarboxylic acid molecular formulas the number of hydrogen atoms is higher than the number of carbon atoms, and wherein the composition has an initial turbidimetric light transmission percentage which is higher than a similar composition based on SYLVALITE™ RE 118 as the rosin ester within a temperature range of 80° C. to 180° C.

Claim 275: The composition of claim 274, wherein the composition has a turbidimetric light transmission percentage which is higher than a similar composition based on SYLVALITE™ RE 118 as the rosin ester within a temperature range of 80° C. to 180° C., after thermal aging at 177° C. for 10 hours.

Claim 276: The composition of claim 274 or 275, wherein the composition has a turbidimetric light transmission percentage which is higher than a similar composition based on SYLVALITE™ RE 118 as the rosin ester within a temperature range of 80° C. to 180° C., after thermal aging at 177° C. for 16 hours.

Claim 277: The composition any of claims 274-276, wherein the rosin ester is derived from in between 2 and 25 weight %, by weight of all reactants, of one or more dicarboxylic acid functional organic compounds.

Claim 278: The composition of any of claims 274-277, wherein the rosin ester is derived from an alcohol, a rosin and in between 2 and 25 weight %, by weight of all reactants, of one or more dicarboxylic acid functional organic compounds wherein the one or more dicarboxylic acid functional organic compounds have an average number of rotatable bonds of twelve or less than twelve.

Claim 279: The composition of any of claims 274-278, wherein the rosin ester is derived from an alcohol, a rosin and in between 2 and 25 weight %, by weight of all reactants, of one or more dicarboxylic acid functional organic compounds wherein the one or more dicarboxylic acid functional organic compounds have two to twelve rotatable bonds.

Claim 280: The composition any of claims 274-279, wherein the rosin ester is derived from in between 2 and 10 weight %, by weight of all reactants, of one or more dicarboxylic acid functional organic compounds.

Claim 281: The composition of any of claims 274-280, wherein the rosin ester has a softening point higher than 106° C.

Claim 282: The composition any of claims 274-281, wherein the dicarboxylic acid is selected from succinic acid, adipic acid, 3-methyladipic acid, sebacic acid, polymerized rosin, rosin dimer, mercusic acid, 1,2-cyclohexanedicarboxylic acid, 1,3-cyclohexanedicarboxylic acid and 1,4-cyclohexanedicarboxylic acid.

Claim 283: The composition any of claims 274-282, wherein the dicarboxylic acid is selected from adipic acid, 3-methyladipic acid, polymerized rosin, rosin dimer, and 1,4-cyclohexanedicarboxylic acid.

Claim 284: The composition any of claims 274-273, wherein the rosin ester is derived from tall oil rosin.

Claim 285: The composition of any of claims 274-284, wherein the rosin ester is derived from a polyhydric alcohol having 2 to 30 carbon atoms and having two to ten average hydroxyl functionality, including ethylene glycol, propylene glycol, diethylene glycol, triethylene glycol, tetraethylene glycol, trimethylene glycol, 4,4'-isopropylidenedicyclohexanol, 1,4-cyclohexanedimethanol, 2,2,4,4-tetramethyl-1,3-cyclobutanediol, 4,8-bis(hydroxymethyl)tricyclo[5.2.1.02,6]decane, glycerol, diglycerol, polyglycerol, polyglycerol-2, polyglycerol-3, polyglycerol-4, trimethylolpropane, trimethylolethane, pentaerythritol, dipentaerythritol, tripentaerythritol, mannitol, sorbitol, xylitol, and combinations thereof.

Claim 286: The composition of any of claims 274-285, wherein the rosin ester is derived from pentaerythritol.

Claim 287: The composition any of claims 274-286, which further comprises a polymer.

Claim 288: The composition of any of claims 274-287, which further comprises a wax.

Claim 289: The composition any of claims 274-288, wherein the composition is a thermoplastic road marking formulation, a tire formulation or an adhesive formulation.

Claim 290: The composition of any of claims 274-289, wherein the composition is a hot-melt adhesive formulation.

What is claimed is:

1. A composition comprising,
   (a) a polymer derived from ethylene polymer derived from at least one polar monomer with one or more ester groups, which polymerize with ethylene, and
   (b) a rosin ester having a hydroxyl number of seven or less, an $M_z$ value between 2500 and 12000 and less than 800 ppm sulfur,
   wherein the rosin ester is obtained by
      esterifying a rosin and
      stripping off volatiles.

2. The composition of claim 1, wherein the rosin ester has a first sum of palladium, nickel and platinum ppm content value (A1), and a first iodine ppm content value (B1); and the rosin has a second sum of palladium, nickel and platinum ppm content value (A2), and a second iodine ppm content ppm value (B2); wherein A1 is lower than or equal to A2; and B1 is lower than or equal to B2.

3. The composition of claim 1, wherein the rosin ester has an acid number of fifteen or less.

4. The composition of claim 3, wherein the sum of the hydroxyl number and the acid number is eighteen or less.

5. The composition of claim 1, wherein the rosin ester has a PAN number of twenty-five or less.

6. The composition of claim 1, wherein the rosin ester has a Gardner color of ten or less.

7. The composition of claim 1, wherein the rosin ester is derived from a polyhydric alcohol.

8. The composition of claim 1, wherein the rosin ester is derived from an alcohol, a rosin, and up to 10 weight %, by weight of all reactants, of one or more carboxylic acid functional organic compounds; wherein the one or more carboxylic acid functional organic compounds have an average number of rotatable bonds of twelve or less than twelve.

9. The composition of claim 8, wherein the one or more carboxylic acid functional organic compounds includes a dicarboxylic acid or a polycarboxylic acid.

10. The composition of claim 1, wherein the rosin ester has a Mw value of 1700 to 4000 g/mol, and a $M_n$ value of 1100 to 2000 g/mol.

11. The composition of claim 1, wherein the rosin ester has a softening point higher than 100° C.

12. The composition of claim 1, wherein the polar monomer comprises a vinyl alkanoate monomer, acrylate ester monomer, methacrylate ester monomer, or mixtures thereof.

13. The composition of claim 1, further comprising one or more waxes.

14. The composition of claim 1, further comprising one or more antioxidants.

15. The composition of claim 1 wherein the rosin is tall oil rosin.

16. The composition of claim 1, wherein the rosin ester has a turbidimetric light transmission percentage that exceeds 75% within a temperature range of 80° C. to 180° C., after thermal aging at 177° C. for 10 hours.

17. The composition of claim 1, wherein the rosin ester is derived from an alcohol, a rosin, and from 2 to 25 weight %, by weight of all reactants, of one or more dicarboxylic acid functional organic compounds, wherein the one or more dicarboxylic acid functional organic compounds have two to twelve rotatable bonds.

18. The composition of claim 1, which is a thermoplastic road marking formulation, a tire formulation, or an adhesive formulation.

19. The composition of claim 1, which is a hot-melt adhesive formulation.

* * * * *